(12) United States Patent
Ikeda et al.

(10) Patent No.: US 10,996,797 B2
(45) Date of Patent: May 4, 2021

(54) INFORMATION PROCESSING DEVICE, INFORMATION PROCESSING METHOD, AND COMPUTER PROGRAM

(71) Applicant: SONY CORPORATION, Tokyo (JP)

(72) Inventors: Tetsuo Ikeda, Tokyo (JP); Takayuki Sakamoto, Kanagawa (JP); Tomohiro Ishii, Tokyo (JP); Takuo Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/470,757

(22) PCT Filed: Dec. 6, 2017

(86) PCT No.: PCT/JP2017/043857
§ 371 (c)(1),
(2) Date: Jun. 18, 2019

(87) PCT Pub. No.: WO2018/123485
PCT Pub. Date: Jul. 5, 2018

(65) Prior Publication Data
US 2019/0346967 A1 Nov. 14, 2019

(30) Foreign Application Priority Data
Dec. 27, 2016 (JP) .............................. JP2016-253841

(51) Int. Cl.
G06F 3/045 (2006.01)
G06F 3/042 (2006.01)
(Continued)

(52) U.S. Cl.
CPC ....... *G06F 3/0425* (2013.01); *G06K 9/00375* (2013.01); *G08B 21/18* (2013.01)

(58) Field of Classification Search
USPC ..... 345/156, 158, 174, 175, 179; 178/19.01; 463/37; 715/849
See application file for complete search history.

(56) References Cited

U.S. PATENT DOCUMENTS 5,900,863 A * 5/1999 Numazaki ............... G06F 3/011
345/156
5,903,229 A * 5/1999 Kishi .................. G06F 3/04883
178/19.01
(Continued)

FOREIGN PATENT DOCUMENTS

JP 2015-090524 A 5/2015
WO WO 2015/098189 A1 7/2015

*Primary Examiner* — Thuy N Pardo
(74) *Attorney, Agent, or Firm* — Paratus Law Group, PLLC

(57) ABSTRACT

There is provided an information processing device capable of appropriately performing processing even in a state in which bodies are piled, the information processing device including: a detection unit that detects a feature amount of an object and an operation object in a sensing-possible region; and an attribute processing unit that decides, on the basis of the detection unit having detected a change in the feature amount of the object in a depth direction of sensing using the operation object, an attribute to be associated with the object after the change in the future amount using an attribute associated with the object before the change.

14 Claims, 83 Drawing Sheets

(51) Int. Cl.
*G06K 9/00* (2006.01)
*G08B 21/18* (2006.01)

(56) References Cited

U.S. PATENT DOCUMENTS

| | | | | |
|---|---|---|---|---|
| 7,690,994 B2* | 4/2010 | Dohta | ................... | G06F 3/0325 |
| | | | | 463/37 |
| 2011/0261016 A1* | 10/2011 | Huang | ................... | G06F 3/0428 |
| | | | | 345/175 |
| 2014/0129990 A1* | 5/2014 | Xin | ..................... | G06K 9/6201 |
| | | | | 715/849 |
| 2015/0062004 A1* | 3/2015 | Rafii | ...................... | G06F 3/017 |
| | | | | 345/156 |
| 2016/0267395 A1* | 9/2016 | Julian | ................... | G06K 9/6269 |
| | | | | 345/175 |
| 2017/0052632 A1* | 2/2017 | Kamamori | ............ | G06F 3/0425 |
| | | | | 345/174 |
| 2017/0235372 A1* | 8/2017 | Song | ................... | G03H 1/2286 |
| | | | | 345/158 |
| 2017/0242488 A1* | 8/2017 | Levesque | ................ | G06F 3/011 |
| | | | | 345/179 |
| 2017/0336918 A1* | 11/2017 | Holman | ................ | G06F 3/0421 |
| | | | | 345/174 |

* cited by examiner

FIG. 6A
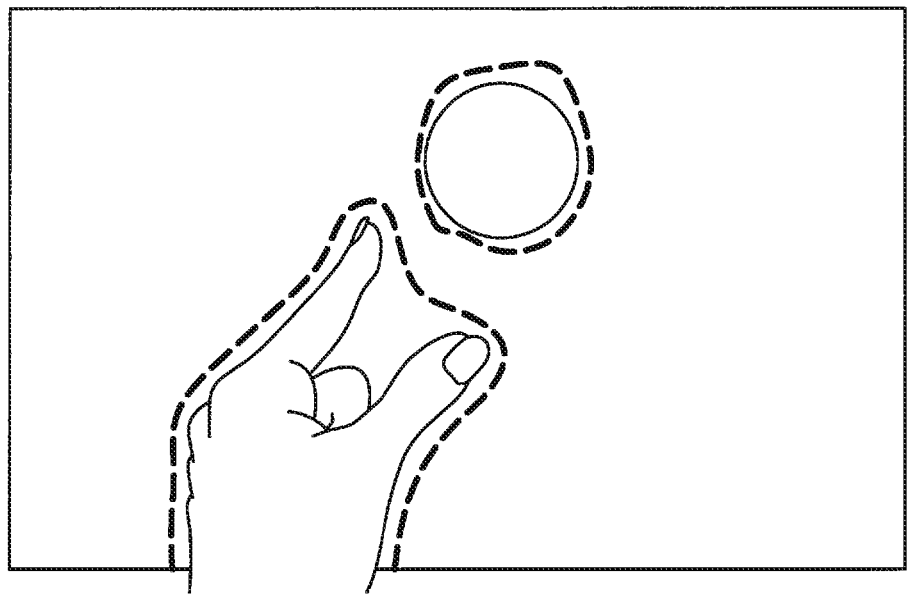
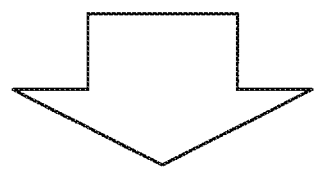
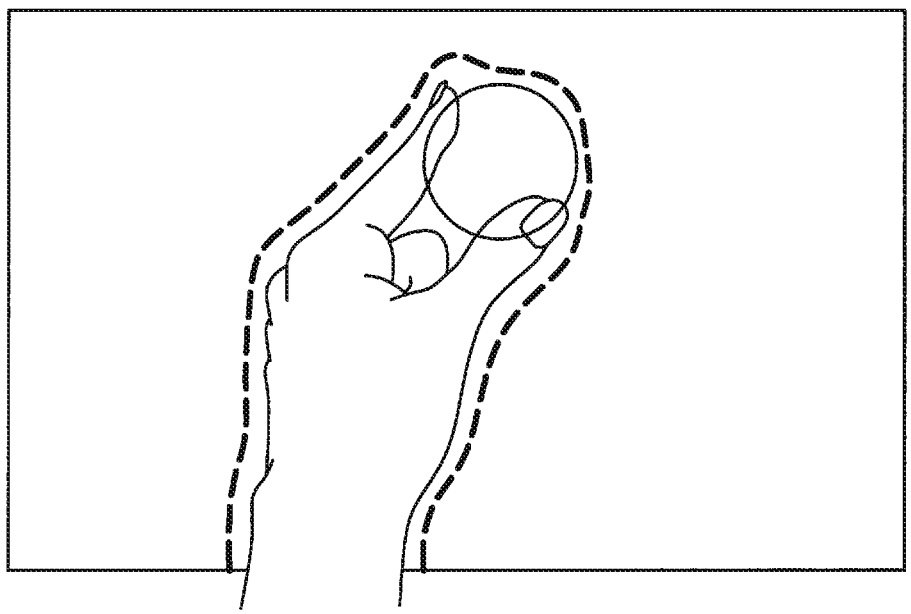

FIG. 6B
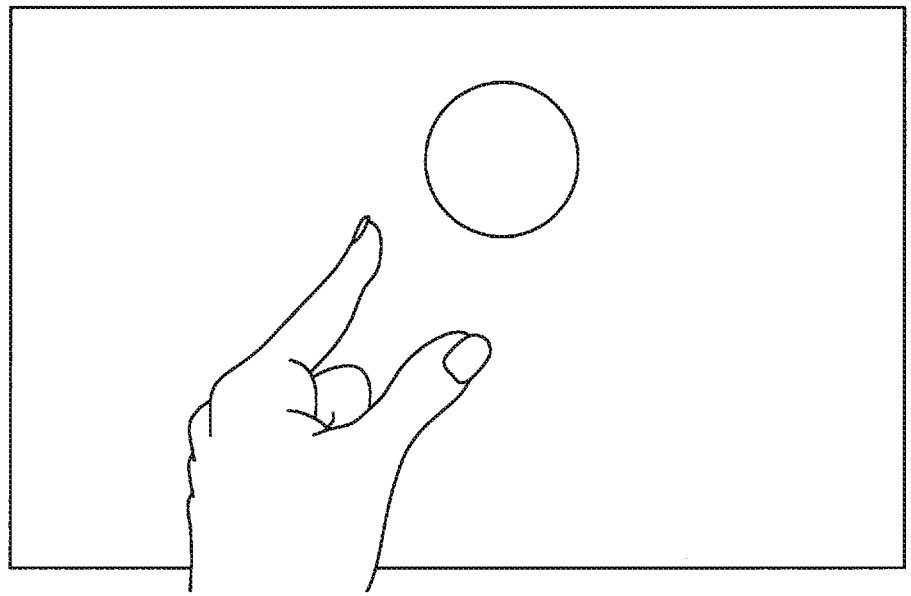
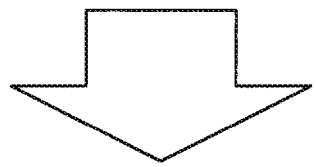
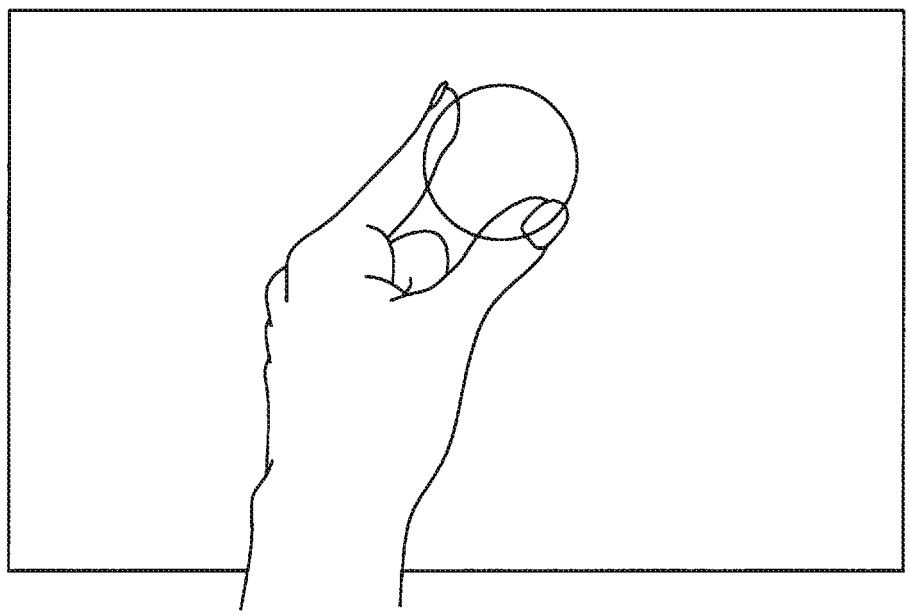

FIG. 6C
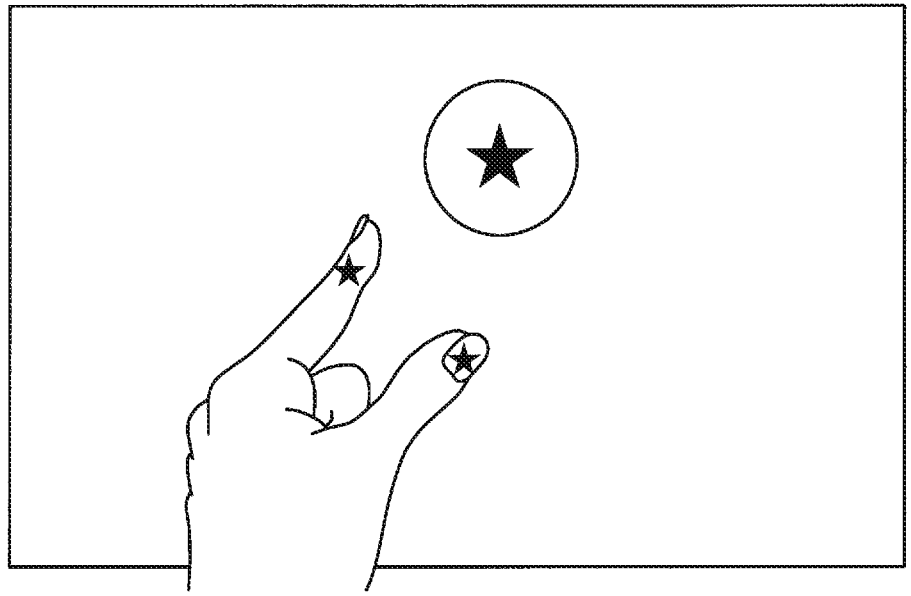
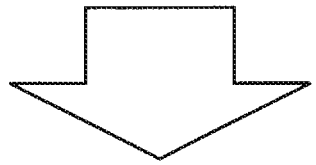
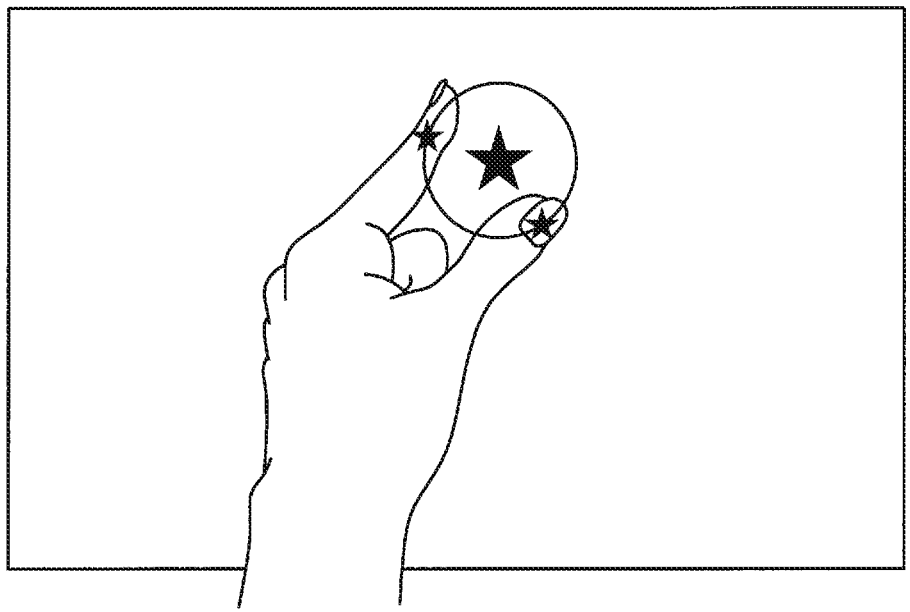

| OBJECT ID | RECOGNITION ID ALIGNMENT | HEIGHT | PROCESSING FLAG |
|---|---|---|---|
|  |  |  |  |

| FINGER ID | RECOGNITION ID ALIGNMENT |
|---|---|
|  |  |

| RECOGNITION ID | ATTRIBUTE |
|---|---|
|  |  |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
|  |  |

| RECOGNITION ID | ATTRIBUTE |
|---|---|
| A | UNKNOWN |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 1 | A | 1cm | false |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
|  |  |  |  |

| FINGER ID | RECOGNITION ID ALIGNMENT |
|---|---|
| a | A |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
|  |  |  |  |

| FINGER ID | RECOGNITION ID ALIGNMENT |
|---|---|
| a | A |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
|  |  |  |  |

| FINGER ID | RECOGNITION ID ALIGNMENT |
|---|---|
|  |  |

| RECOGNITION ID | ATTRIBUTE |
|---|---|
|  |  |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
|  |  |  |  |

| FINGER ID | RECOGNITION ID ALIGNMENT |
|---|---|
| a | A |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| | | | |

| FINGER ID | RECOGNITION ID ALIGNMENT |
|---|---|
| (a) | A |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
|  |  |  |  |

| FINGER ID | RECOGNITION ID ALIGNMENT |
|---|---|
| a | A |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 1 | ?,A | 2cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 1 | ?,A | 2cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 2 | A | 1cm | true |

| FINGER ID | RECOGNITION ID ALIGNMENT |
|---|---|
| a | A |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 2 | A | 1cm | true |
| 3 | A | 1cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 1 | A | 1cm | true |
| 2 | B | 1cm | true |

| FINGER ID | RECOGNITION ID ALIGNMENT |
|---|---|
| | |
| | |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 2 | B | 1cm | true |
| 1 | A | 1cm | true |

| FINGER ID | RECOGNITION ID ALIGNMENT |
|---|---|
|  |  |
|  |  |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 2 | B | 1cm | true |

| FINGER ID | RECOGNITION ID ALIGNMENT |
|---|---|
| a | A |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
|  |  |  |  |

| FINGER ID | RECOGNITION ID ALIGNMENT |
|---|---|
| a | A,B |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 3 | B | 1cm | true |

| FINGER ID | RECOGNITION ID ALIGNMENT |
|---|---|
| a | A |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 3 | B | 1cm | true |
| 4 | A | 1cm | true |

| FINGER ID | RECOGNITION ID ALIGNMENT |
|---|---|
|  |  |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 2 | A,? | 2cm | true |

| FINGER ID | RECOGNITION ID ALIGNMENT |
|---|---|
|  |  |

| RECOGNITION ID | ATTRIBUTE |
|---|---|
| A | ATTRIBUTE 1 |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
| a | B |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 1 | A | 1cm | true |

| FINGER ID | RECOGNITION ID ALIGNMENT |
|---|---|
| a | B |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 2 | A,?,B | 3cm | true |

| FINGER ID | RECOGNITION ID ALIGNMENT |
|---|---|
|  |  |

| RECOGNITION ID | ATTRIBUTE |
|---|---|
| A | ATTRIBUTE 1 |
| B | ATTRIBUTE 2 |

| OBJECT ID | RECOGNITION ID ALIGNMENT | HEIGHT | PROCESSING FLAG |
|---|---|---|---|
| 2 | A,B,B | 3cm | true |

| FINGER ID | RECOGNITION ID ALIGNMENT |
|---|---|
| a | A,B |

| RECOGNITION ID | ATTRIBUTE |
|---|---|
| A | ATTRIBUTE 1 |
| B | ATTRIBUTE 2 |

$CO_2$
Carbon dioxide

CO₂
Carbon dioxide

CO₂
Carbon dioxide

CO₂
Carbon dioxide

FIG. 38D

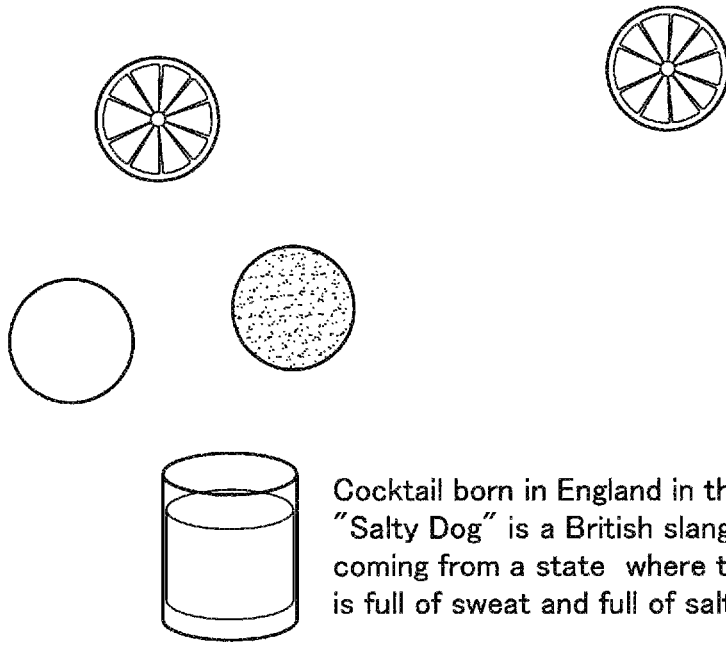

Cocktail born in England in the 1940s.
"Salty Dog" is a British slang meaning "a deck member".
coming from a state where the deck member
is full of sweat and full of salt on the deck.

FIG. 39A

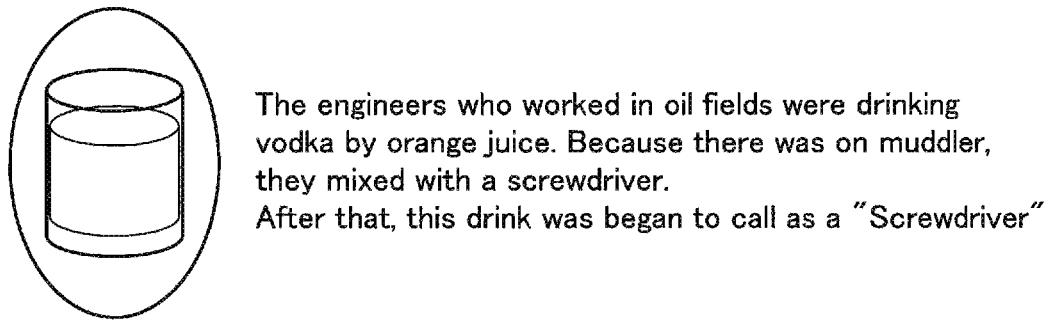

The engineers who worked in oil fields were drinking
vodka by orange juice. Because there was on muddler,
they mixed with a screwdriver.
After that, this drink was began to call as a "Screwdriver"

FIG. 39B

This combination has never tried by anyone.
You can name this cocktail !

The engineers who worked in oil fields were drinking vodka by orange juice. Because there was on muddler, they mixed with a screwdriver.
After that, this drink was began to call as a "Screwdriver"

500

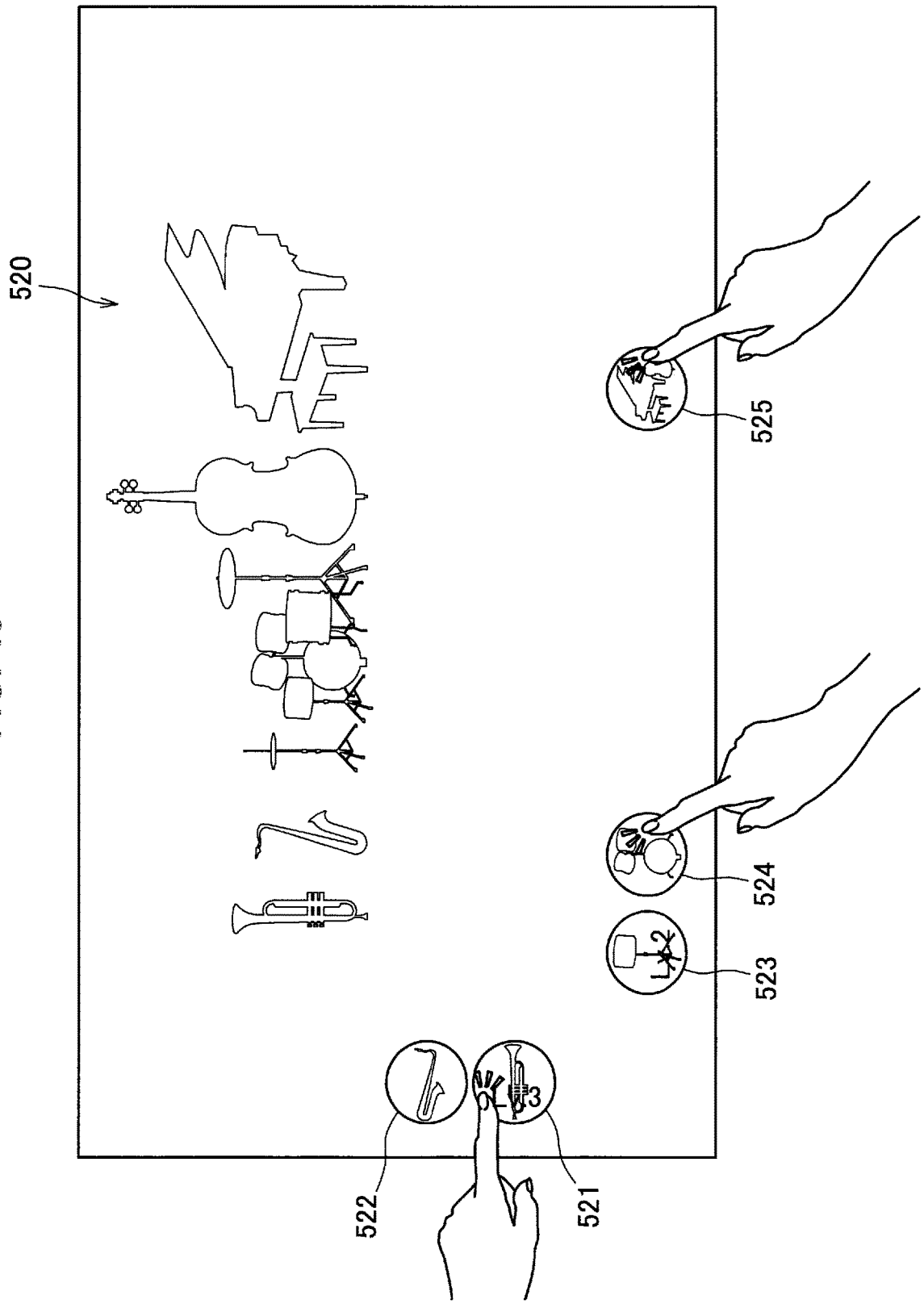

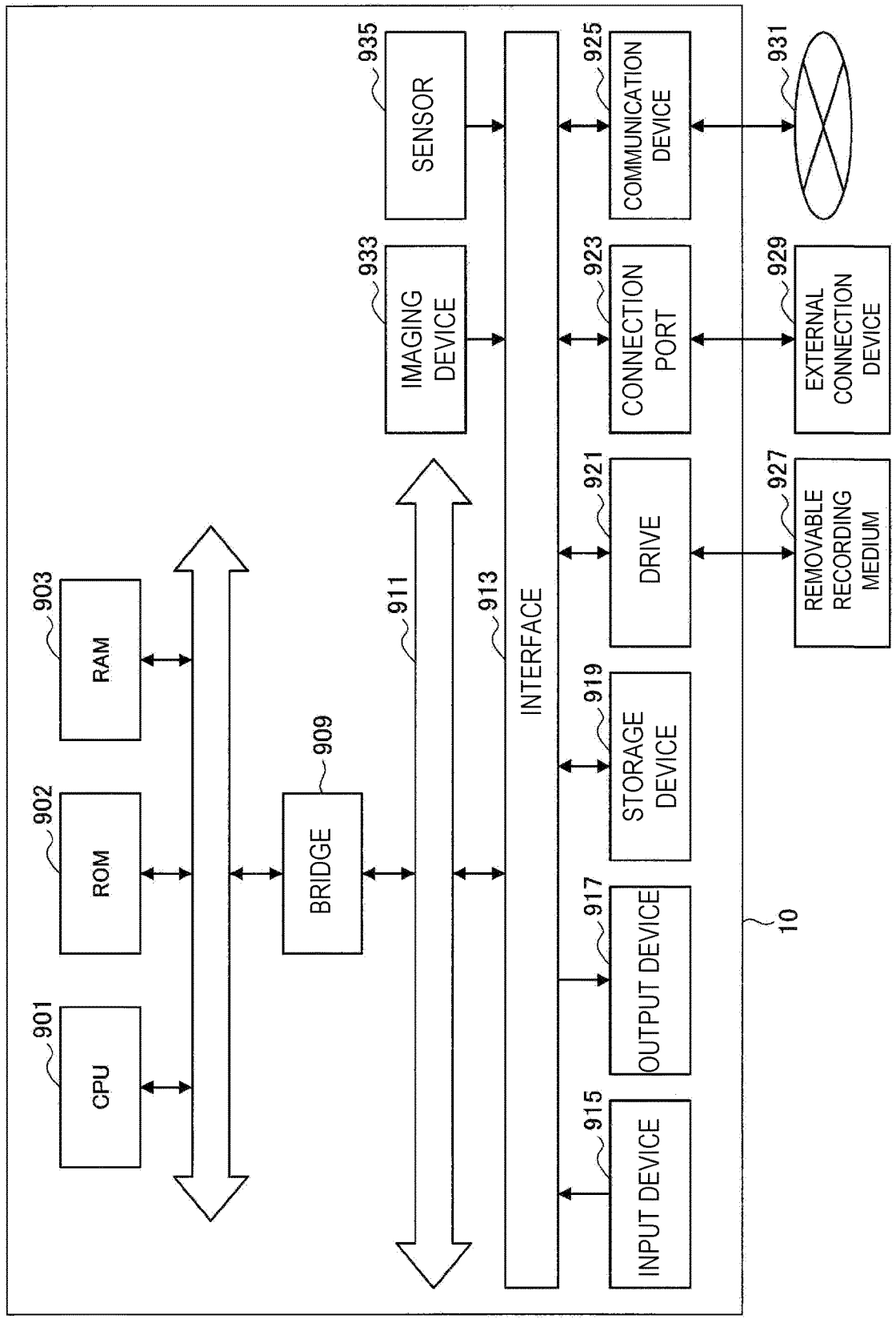

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2017/043857 (filed on Dec. 6, 2017) under 35 U.S.C. § 371, which claims priority to Japanese Patent Application No. 2016-253841 (filed on Dec. 27, 2016), which are all hereby incorporated by reference in their entirety.

TECHNICAL FIELD

The present disclosure relates to an information processing device, an information processing method, and a computer program.

BACKGROUND ART

A technology of recognizing an object placed on a table or the like and projecting an application related to the recognized object is disclosed in Patent Literature 1, for example.

CITATION LIST

Patent Literature

Patent Literature 1: JP 2015-90524A

DISCLOSURE OF INVENTION

Technical Problem

However, if a state of an object changes for some reason due to piling up of another object thereon, or in a state in which the object cannot be recognized, the object may be missed, and it may become difficult to appropriately process an application in some cases.

Thus, the present disclosure provides a new and improved information processing device, information processing method, and computer program capable of appropriately performing processing even in a state in which bodies are piled.

Solution to Problem

According to the present disclosure, there is provided an information processing device including: a detection unit that detects a feature amount of an object and an operation object in a sensing-possible region; and an attribute processing unit that decides, on the basis of the detection unit having detected a change in the feature amount of the object in a depth direction of sensing using the operation object, an attribute to be associated with the object after the change in the future amount using an attribute associated with the object before the change.

In addition, according to the present disclosure, there is provided an information processing method including, by a processor: detecting a feature amount of an object and an operation object in a sensing-possible region; and deciding, on the basis of a change in the feature amount of the object having been detected in the sensing-possible region, an attribute to be associated with the object after the change using an attribute associated with the object before the change.

In addition, according to the present disclosure, there is provided a computer program that causes a computer to execute: detecting a feature amount of an object and an operation object in a sensing-possible region; and deciding, on the basis of a change in the feature amount of the object having been detected in the sensing-possible region, an attribute to be associated with the object after the change using an attribute associated with the object before the change.

Advantageous Effects of Invention

According to the present disclosure, it is possible to provide a new and improved information processing device, information processing method, and computer program capable of appropriately performing processing even in a state in which bodies are piled as described above.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6A is an explanatory diagram illustrating a technology for detecting fingers and an object.

FIG. 6B is an explanatory diagram illustrating a technology for detecting fingers and an object.

FIG. 6C is an explanatory diagram illustrating a technology for detecting fingers and an object.

FIG. 38D is an explanatory diagram illustrating an operation example of a cocktail ordering application.
FIG. 39A is an explanatory diagram illustrating an operation example of a cocktail ordering application.
FIG. 39B is an explanatory diagram illustrating an operation example of a cocktail ordering application.
FIG. 43 is an explanatory diagram illustrating an operation example of a music playing application.
FIG. 45 is an explanatory diagram illustrating a hardware configuration example.

MODE(S) FOR CARRYING OUT THE INVENTION

Figure 1:
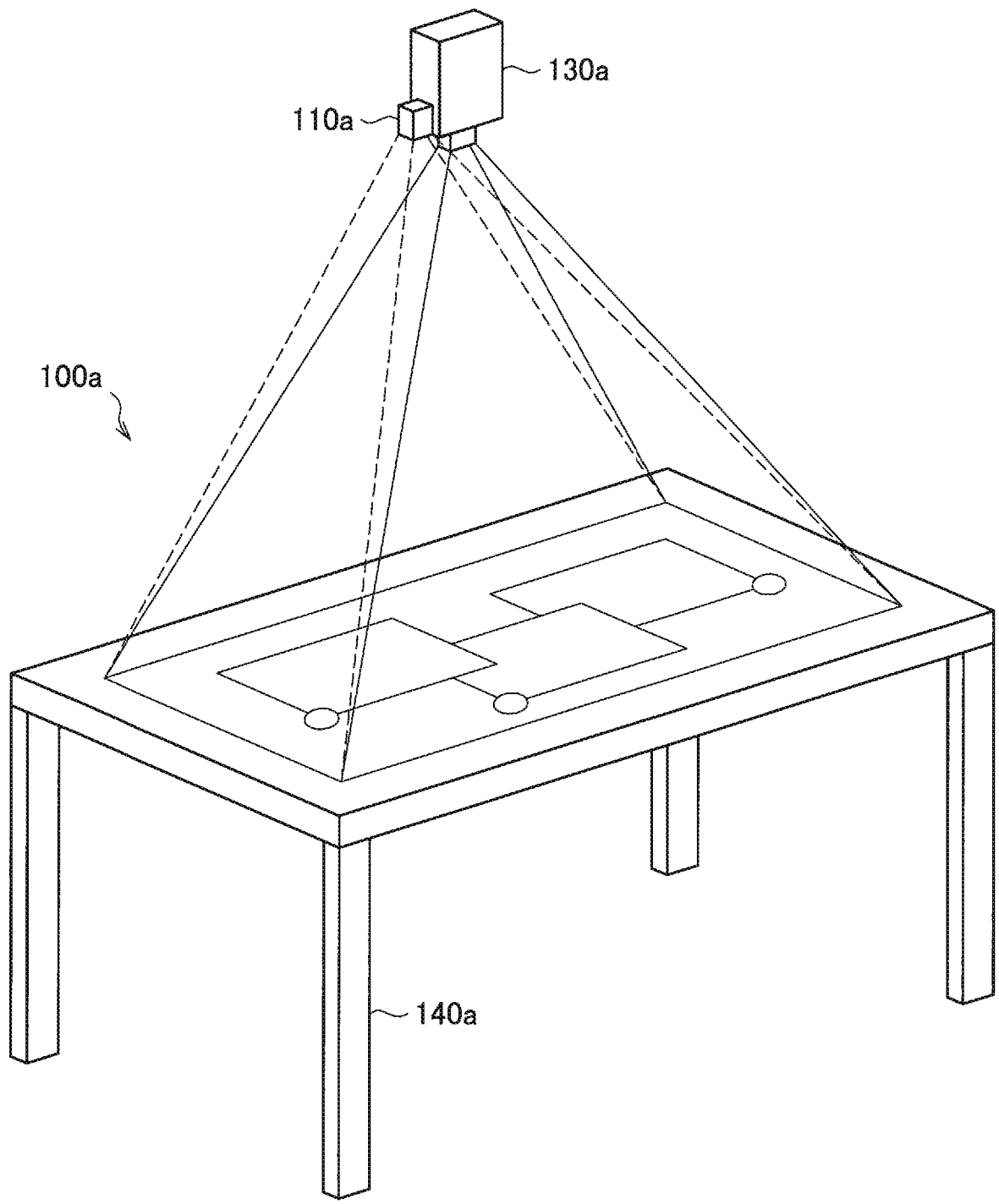
FIG. 1 is an explanatory diagram illustrating a configuration example of an information processing system according to an embodiment of the disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Embodiment of the Disclosure
1.1. System Configuration Example
1.2. Functional Configuration Example
1.3. Operation Example
2. Hardware Configuration Example
3. Conclusion

1. EMBODIMENT OF THE DISCLOSURE

1.1. System Configuration Example

First, a configuration example of an information processing system according to an embodiment of the disclosure will be described.

FIG. 1 is an explanatory diagram illustrating a configuration example of an information processing system according to an embodiment of the disclosure. Note that in the specification, the system may mean a configuration that executes predetermined processing, and the entire system can be regarded as one device, or it is also possible to conceive that the system includes a plurality of devices. It is only necessary for the information processing system according to the embodiment illustrated in FIG. 1 to be configured to be able to execute predetermined processing as a whole, and which constituent in the information processing system is to be regarded as one device may be arbitrarily decided.

Referring to FIG. 1, an information processing system 100a according to an embodiment of the disclosure includes an input unit 110a and an output unit 130a.

The output unit 130a provides a visual notification of various kinds of information to a user by displaying the information in a table 140a. As the output unit 130a, a projector is used, for example. As illustrated in the drawing, the output unit 130a is disposed above the table 140a at a predetermined distance away from the table 140a in a state in which the output unit 130a is suspended from a ceiling, for example, and projects information on a top surface of the table 140a. Such a scheme of displaying information on the top surface of the table 140a from above is also referred to as a "projection type".

Note that in the following description, an entire region in which the information is displayed by the output unit 130a is also referred to as a display screen. For example, the output unit 130a displays, on the display screen, information to be presented to the user in response to execution of an application by the information processing system 100a. The information to be displayed is, for example, an operation screen for each application. Hereinafter, each display region on the display screen in which such an operation screen for an application is displayed will also be referred to as a window. Also, the output unit 130a displays so-called graphical user interface (GUI) components (widgets) that receive various user's operations such as selection and input through a button, a slider, a check box, a text box, and a keyboard on the display screen, for example. Although it is possible to regard the window as one of the GUI components, the window will not be included in the GUI components, and display elements other than the window will be referred to as the GUI components in this specification for convenience in order to distinguish the window from the other GUI components.

Here, in a case in which the information processing system 100a is of a projection type, the output unit 130a may include an illumination device. In a case in which an illumination device is included in the output unit 130a, the information processing system 100a may control a state of the illumination device, such as ON and OFF, on the basis of content of information input by the input unit 1 IOa and/or content of information displayed by the output unit 130a.

Also, the output unit 130a may include a speaker and output various kinds of information as sound. In a case in which the output unit 130a is formed as a speaker, the number of speakers may be one, or a plurality of speakers may be provided. In a case in which the output unit 130a includes a plurality of speakers, the information processing system 100a may limit the speakers that output sound or may adjust a direction in which the sound is output.

The input unit 110a is a device that inputs content of an operation performed by the user who uses the information processing system 100a. In the example illustrated in FIG. 1, the input unit 110a includes a sensor and the like and is provided above the table 140a in a state in which the input unit 110a is suspended from the ceiling, for example. In this manner, the input unit 110a is provided away from the table 140a that is a target on which information is displayed. The input unit 110a can include an imaging device capable of imaging the top surface of the table 140a, that is, the display screen. As the input unit 110a, a camera that images the table 140a with one lens, a stereo camera capable of imaging the table 140a with two lenses and recording information in the perspective direction, or the like can be used, for example. In a case in which the input unit 110a is a stereo camera, a visible light camera, an infrared camera, or the like can be used.

In a case in which a camera that images the table 140a with one lens is used as the input unit 110a, the information processing system 100a can detect the position of an existing physical object, for example, a user's hand located on the table 140a by analyzing an image (captured image) captured by the camera. Also, in a case in which a stereo camera is used as the input unit 110a, the information processing system 100a can acquire depth information of an object located on the table 140a in addition to position information of the object by analyzing an image captured by the stereo camera. The information processing system 100a can detect contact or approach of the user's hand relative to the table 140a in a height direction and separation of the hand from the table 140a on the basis of the depth information. Note that in the following description, the user's action of bringing an operation object such as his/her hand into contact with the information on the display screen or causing the operation object to approach the information on the screen will also simply and collectively referred to as "contact".

In the embodiment, the position of the operation object, for example, the user's hand on the display screen (that is, on the top surface of the table 140a) is detected on the basis of the image captured by the input unit 110a, and various kinds of information are input on the basis of the detected position of the operation object. That is, the user can input various operations by moving the operation object on the display screen. For example, an operation may be input to the window or another GUI component by contact of the user's hand with the window or another GUI component being detected. Note that in the following description, although a case in which the user's hand is used as the operation object will be described below as an example, the embodiment is not limited to such an example, and various operation objects, such as a stylus or a robot arm, may be used as the operation object. Note that it is assumed that the operation object is an object capable not only of inputting an operation to a GUI component but also of causing an object placed on the table 140a or the like to be moved.

Also, in a case in which the input unit 110a includes an imaging device, the input unit 110a may image not only the top surface of the table 140a but also a user who is present in the surroundings of the table 140a. For example, the information processing system 100a can detect the position of a user in the surroundings of the table 140a on the basis of the captured image. Also, the information processing system 100a may perform individual recognition for the user by extracting object features with which individual users can be identified, such as a size of a user's face or object included in the captured image.

Here, the embodiment is not limited to such an example, and the user's operation input may be executed by another method. For example, the input unit 110a may be provided as a touch panel on the top surface of the table 140a, and the user's operation input may be detected by contact of a user's finger or the like with the touch panel. Also, the user's operation input may be detected using a gesture performed with respect to the imaging device that forms the input unit 110a. Alternatively, the input unit 110a may include a sound input device such as a microphone that collects speech that the user generates or ambient sound from the surrounding environment. As the sound input device, a microphone array for collecting sound in a specific direction may suitably be used. In addition, the microphone array may be configured such that the sound collecting direction can be adjusted to an arbitrary direction. In a case in which a sound input device is used as the input unit 110a, an operation may be input through the collected sound. Also, the information processing system 100a may recognize an individual on the basis of the sound by analyzing the collected sound. Alternatively, the input unit 110a may include a remote control device (a so-called remote). The remote may be configured such that a predetermined command is input by operating a predetermined button disposed on the remote, or may be configured such that a predetermined command is input through a user's operation of moving the remote by detecting motion and an attitude of the remote with a sensor such as an acceleration sensor or a gyro sensor mounted on the remote. Further, the information processing system 100a may include other input devices, such as a mouse, a keyboard, a button, a switch, and a lever, which are not illustrated in the drawing, as the input unit 110a, and user's operations may be input through such input devices.

The configuration of the information processing system 100a according to the embodiment has been described above with reference to FIG. 1. Note that although not illustrated in FIG. 1, other devices may be connected to the information processing system 10a. For example, an illumination device for illuminating the table 140a may be connected to the information processing system 100a. The information processing system 100a may control an ON state of the illumination device in accordance with a state of the display screen.

Figure 2:
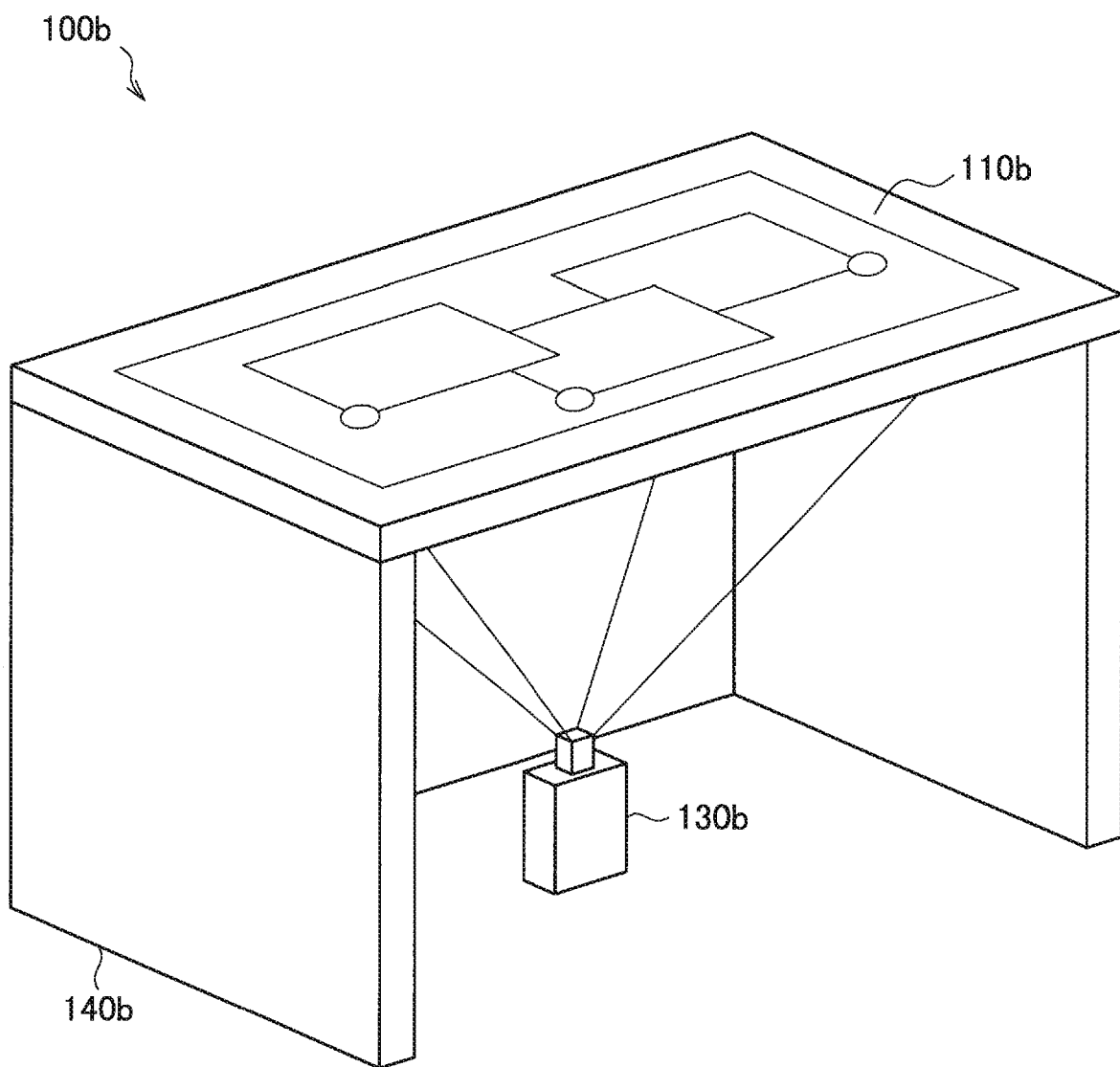
FIG. 2 illustrates another configuration example of the information processing system according to the embodiment.
Figure 3:
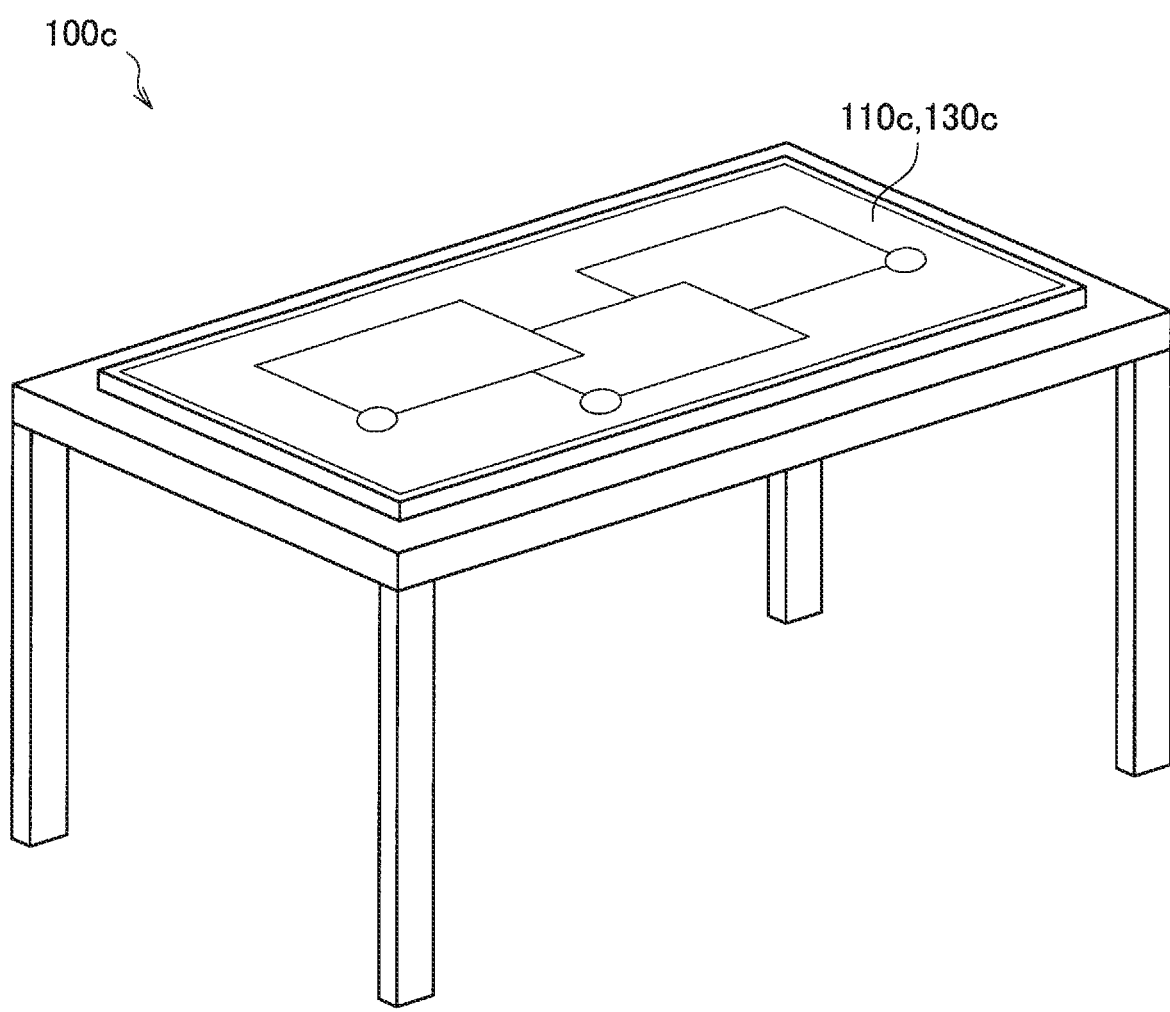
FIG. 3 illustrates another configuration example of the information processing system according to the embodiment.
Figure 4:
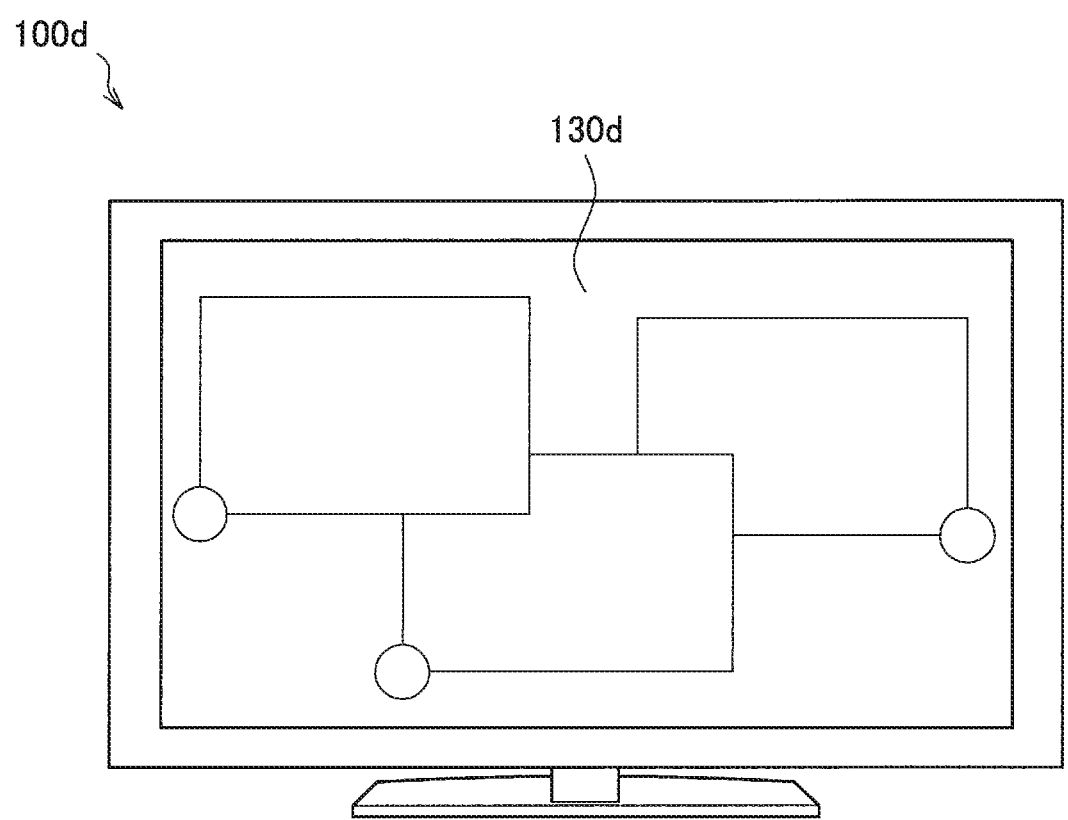
FIG. 4 illustrates another configuration example of the information processing system according to the embodiment.

Here, the configuration of the information processing system is not limited to that illustrated in FIG. 1 in the embodiment. It is only necessary for the information processing system according to the embodiment to include the output unit that displays various kinds of information on the display screen and the input unit capable of receiving at least an operation input performed on the displayed information, and a specific configuration thereof is not limited. Referring to FIGS. 2 to 4, other configuration examples of the information processing system according to the embodiment will be described. FIGS. 2 to 4 are diagrams illustrating other configuration examples of the information processing system according to the embodiment.

In an information processing system 100b illustrated in FIG. 2, an output unit 130a is provided below a table 140b. The output unit 130a is a projector, for example, and projects information from the lower side toward the top plate of the table 140b. The top plate of the table 140b includes a transparent material, such as a glass plate or a transparent plastic plate, for example, and information projected by the output unit 130a is displayed on the top surface of the table 140b. Such a scheme of projecting information from the side below the table 140b to the output unit 130a and displaying information on the top surface of the table 140b will also be referred to as a "rear projection type".

In the example illustrated in FIG. 2, an input unit 110b is provided on the top surface (front surface) of the table 140b. The input unit 110b includes a touch panel, for example, and a user inputs an operation by contact of an operation object with the display screen on the top surface of the table 140b being detected by the touch panel. Note that the configuration of the input unit 110b is not limited to such an example, and the input unit 110b may be provided away from the table 140b below the table 140b similarly to the information processing system 100a illustrated in FIG. 1. In this case, the input unit 110b includes an imaging device, for example, and can detect the position of the operation object on the top surface of the table 140b through the top plate including the transparent material. Also, in this case, the input unit 110b is configured of a sensor capable of sensing the length of a shadow and the weight and can sense the weight and the size of the object placed on a top surface of the table 140b.

In the information processing system 100c illustrated in FIG. 3, a touch panel-type display is mounted on the table in a state in which the display surface thereof is directed upward. In the information processing system 100c, the input unit 110c and the output unit 130c may be integrally formed as a display of the touch panel type. That is, the user inputs an operation 1w various kinds of information being displayed on the display screen of the display and contact of the operation object with the display screen of the display being detected through the touch panel. Note that the imaging device may also be provided as the input unit 110c above the touch panel-type display in the information processing system 100c similarly to the information processing system 100a illustrated in FIG. 1. The position or the like of the user in the surroundings of the table may be detected by the imaging device. Also, the input unit 110c is configured of a sensor (in-cell sensor) capable of sensing the length of a shadow and the weight and can sense the weight and the size of an object placed on an output unit 130c.

An information processing system 100d illustrated in FIG. 4 includes a flat panel-type display. In the information processing system 100d, the output unit 130d is formed as a flat panel-type display, and various kinds of information is displayed on a display screen of the display. An input unit includes input devices such as a mouse, a keyboard, and a touch pad, which are not illustrated in the drawing, and the user inputs an operation by operating a pointer in the display screen using these input devices. Note that the input unit in the information processing system 100d may include a touch panel provided on the flat panel-type display, and the user may input an operation through the touch panel similarly to the information processing system 100c illustrated in FIG. 3. Also, the input unit may include an imaging device capable of imaging a region that faces the display surface of the flat panel-type display. The position and the like of the user who observes the flat panel-type display may be detected using the imaging device.

Other configurations of the information processing system according to the embodiment have been described above with reference to FIGS. 2 to 4. As described above, the information processing system according to the embodiment may be realized in a variety of configurations. Here, the embodiment will be described below by exemplifying a configuration of the information processing system 100a in which the input unit 110a and the output unit 130a are provided above the table 140a as illustrated in FIG. 1. However, another configuration capable of realizing the information processing system according to the embodiment, such as the aforementioned configurations illustrated in FIGS. 2 to 4, can also realize functions that are similar to those described below. In the following description, the information processing system 100a, the input unit 110a, and the output unit 130a will simply be referred to as an information processing system 100, an input unit 110, and an output unit 130 for simplification.

The configuration examples of the information processing system 100 according to the embodiment of the disclosure have been described above. Next, functional configuration examples of the information processing system 100 according to the embodiment of the disclosure will be described.

1.2. Functional Configuration Example

Figure 5:
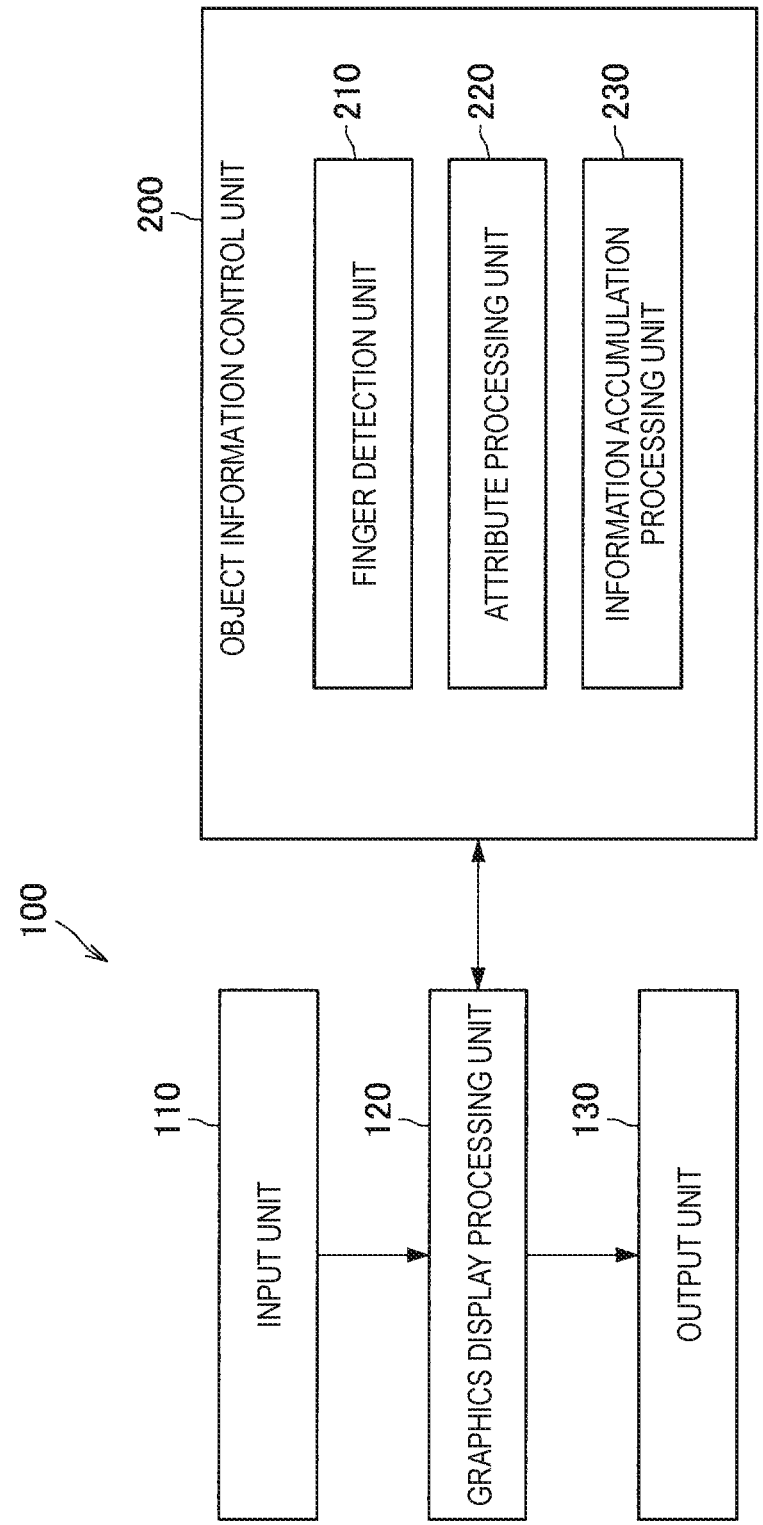
FIG. 5 is an explanatory diagram illustrating a functional configuration example of an information processing system 100 according to the embodiment.

FIG. 5 is an explanatory diagram illustrating a functional configuration example of the information processing system 100 according to the embodiment of the disclosure. Hereinafter, a functional configuration of the information processing system 100 according to the embodiment of the disclosure will be described with reference to FIG. 5.

As illustrated in FIG. 5, the information processing system 100 according to the embodiment of the disclosure includes the input unit 110, a graphics display processing unit 120, the output unit 130, and an object information control unit 200.

The input unit 110 is an input interface for inputting various kinds of information to the information processing system 100. The user can input various kinds of information to the information processing system 100 via the input unit 110. In the embodiment, the input unit 110 is configured to be able to receive at least a user's operation input to the display screen generated by the output unit 130. For example, the input unit 110 includes an imaging device including an image sensor and captures a captured image including an operation object such as a user's hand on the display screen. Also, the input unit 110 is configured of, for example, a stereo camera and a depth sensor capable of acquiring three-dimensional information of a time-of-flight scheme, a structured light scheme, or the like. Information input via the input unit 110 (information or the like regarding the captured image, for example) is provided to the object information control unit 200, which will be described later, and the user's operation input is detected by the object information control unit 200. Note that the embodiment is not limited to such an example, and the input unit 110 may include other input devices such as a touch panel, a mouse, a keyboard, a microphone, a button, a switch, and a lever, for example.

The graphics display processing unit 120 performs processing of graphics to be displayed on the output unit 130 on the basis of the user's operation input that the input unit 110 receives. The graphics display processing unit 120 performs, for example, drawing control of a variety of content in a window or the like that displays an application, provision of an event such as a user's operation input to each content, and the like. In the embodiment, the graphics display processing unit 120 provides content of the user's operation input received from the input unit 110 to the object information control unit 200. Then, the graphics display processing unit 120 receives the content of the processing performed by the object information control unit 200 and executes graphics processing based on the content. The graphics display processing unit 120 includes an image processing circuit, for example.

The output unit 130 is an output interface for providing a notification of various kinds of information processed by the information processing system 100 to the user. The output unit 130 includes a display device such as a display or a projector and displays various kinds of information on the display screen under control from the object information control unit 200, which will be described later. The output unit 130 displays the window and the GUI components on the display screen as described above. The window, the GUI components, and the like displayed on the output unit 130 are also referred to as "display objects". Note that the embodiment is not limited to such an example, and the output unit 130 may further include a sound output device such as a speaker and may output various kinds of information through sound.

The object information control unit 200 executes various kinds of processing on the basis of a user's operation input received by the input unit 110. In the embodiment, the object information control unit 200 performs processing of recognizing attribute information associated with an object on the basis of information regarding fingers and the object acquired by the input unit 110 and possession information associated with the fingers and controlling information regarding the object on the basis of the information. The object information control unit 200 is configured to include a control circuit such as a CPU and a memory that stores a program for causing the control circuit to operate, for example.

The object information control unit 200 is configured to include a finger detection unit 210, an attribute processing unit 220, and an information accumulation processing unit 230.

The finger detection unit 210 performs processing of detecting which object a user has operated, using a positional relationship between the object and the fingers included in the information acquired by the input unit 110. Details of specific processing performed by the finger detection unit 210 will be described later.

The attribute processing unit 220 performs processing related to assignment of attributes to the object and the fingers that are present in a region that the input unit 110 can sense (sensing-possible region). For example, the attribute processing unit 220 performs processing of estimating which attributes the object holds, using information regarding whether or not the object and the fingers have approached each other or are in contact with each other. Also, the attribute processing unit 220 performs processing of estimating which attributes overlapping bodies hold, using information on whether or not the bodies overlap. Details of specific processing performed by the attribute processing unit 220 will be described later.

The information accumulation processing unit 230 performs processing of accumulating information regarding the object and the fingers. The information accumulated by the information accumulation processing unit 230 is used in processing performed by the attribute processing unit 220. Examples of the information accumulated by the information accumulation processing unit 230 will be described later.

The function configuration example of the information processing system 100 according to the embodiment of the disclosure has been described above. Although the information processing system 100 according to the embodiment of the disclosure will be described below, a technology of detecting fingers and an object that is an assumption of operations performed by the information processing system 100 will be described first.

FIGS. 6A to 6C are explanatory diagrams illustrating a technology of detecting fingers and an object.

FIG. 6A illustrates an example of a detection technology based on recognition using outline information. The detection technology is a method of performing outline extraction from image information and three-dimensional information and distinguishing a hand and an object. The detection using the outline information can be used under both visible light and invisible light, and in a case in which invisible light is used, there is an advantage that a displayed object does not interfere with the hand and the object even if projection from above is performed. Meanwhile, the detection using the outline information has a disadvantage that it is not possible to distinguish the hand from the object if the object is held in the hand since outlines of the object and the hand are integrated.

FIG. 6B illustrates an example of a detection technology based on recognition using segment information. The detection technology is a method of distinguishing a hand from an object by performing segmentation using pixel values of image information. For example, it is possible to segment information acquired from a visible light camera, for example, using colors. The detection technology has an advantage that it is possible to distinguish the hand from the object even if the object is held in the hand as long as the object is not covered with the hand. Meanwhile, the detection technology assumes that there is a difference of a specific level or greater between a color of the hand and a color of the object, and the detection technology has a disadvantage that the hand and the object are recognized as being integrated in a case in which the difference is small. Also, the detection technology has a disadvantage that a probability of erroneous determination increases in a case in which projection overlaps with the hand and the object if the projection is performed from above. In addition, the detection technology has a disadvantage that it is not possible to distinguish a real object or a displayed object when colors that are similar to those of the hand and the object are displayed on a screen even if the overall configuration of the information processing system is any of those in FIGS. 1 to 4.

FIG. 6C illustrates an example of a detection technology based on recognition using a marker. The detection technology is a method of applying markers to fingers and an object (star marks in the drawing) and recognizing the fingers and the object. The detection technology has an advantage that it is possible to recognize the object even if the object is held in the hand as long as the marker of the object is not covered with the hand. Meanwhile, the detection technology has a disadvantage that it is possible to handle only registered (with markers) bodies since necessity to apply the markers to the fingers and the object in advance occurs.

Figure 7A:
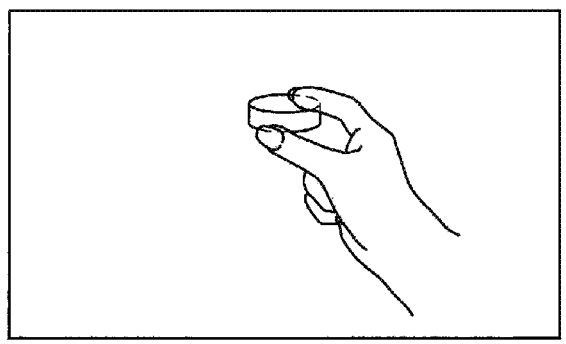
FIG. 7A is an explanatory diagram illustrating an example of a situation in which fingers and an object are placed during detection.
Figure 7B:
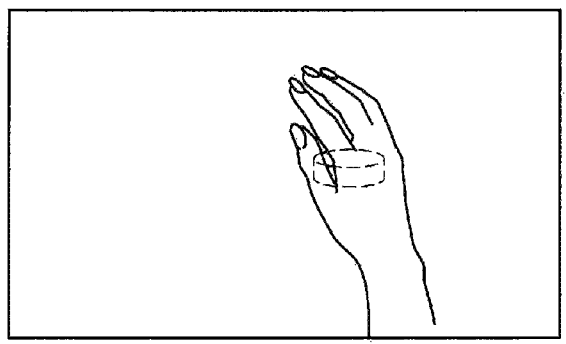
FIG. 7B is an explanatory diagram illustrating an example of a situation in which fingers and an object are placed during detection.
Figure 7C:
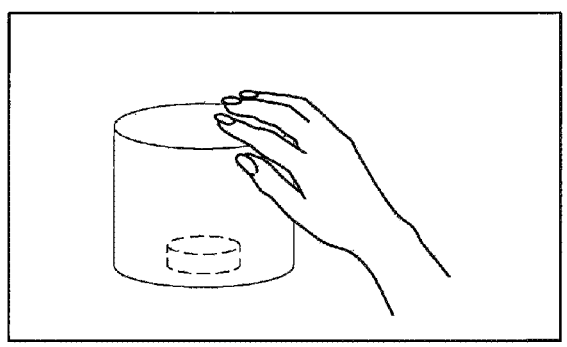
FIG. 7C is an explanatory diagram illustrating an example of a situation in which fingers and an object are placed during detection.

FIGS. 7A to 7C are explanatory diagrams illustrating examples of situations in which fingers and an object are placed during detection. FIG. 7A illustrates a state in which the object is held in the hand but the object is still visible. In this state, it is possible to distinguish the fingers from the object depending on the detection technology and the state. FIG. 7B illustrates a state in which an object is held such that a hand completely covers the object. In this state, it is not possible to distinguish the fingers from the object even if any of the aforementioned three detection technologies is used. FIG. 7C illustrates a state in which an object that is held in a hand and that is a target of detection is covered. The object held in the hand may be an operation object of the disclosure. In this state, it is also not possible to distinguish the fingers from the object even if any of the aforementioned three detection technologies is used similarly to the case illustrated in FIG. 7B.

In the embodiment, it is possible to track the object and hold attributes associated with the object even in a situation in which it is not possible to track the object and hold the attributes since it is known that it is not possible to distinguish the fingers from the object due to an environment or a state.

First, information used in the embodiment will be described. Tables 1 to 3 below illustrate information accumulated in the information accumulation processing unit 230. Table 1 is an object management table, Table 2 is a possession state management table, and Table 3 is an attribute management table. The respective tables are realized in the form of relational databases, for example.

TABLE 1

Object management table

| Object ID | Recognition ID alignment | Feature amount | Processing flag |
| --- | --- | --- | --- |

TABLE 2

Possession state management table

| Finger ID | Recognition ID alignment |
| --- | --- |

TABLE 3

Attribute management table

| Recognition ID | Attribute |
| --- | --- |

An object ID is an ID of an object that is returned by a sensor of the input unit 110. The object ID is information that is maintained as long as the sensor distinguishes fingers or the object. Since the object ID is assigned in units that the sensor can recognize, one object ID is assigned to one lump of overlapping bodies. The object ID is incremented even for the same object if the object is covered with the hand as described above.

A finger ID is an ID of fingers that is returned by a sensor of the input unit 110. One ID is assigned to one hand.

A recognition ID is an ID recognized and tracked using a recognition technology according to the embodiment. It is possible to maintain a unique recognition ID even if an object is covered with a hand according to the recognition technology. The number of present unique recognition IDs is the number of characteristics of the object.

The object management table in Table 1 is a table for managing states of an object. A recognition ID alignment holds information on which recognition ID an object group with an object ID has been recognized with, laminated bodies are expressed as an alignment of recognition IDs, and the alignment indicates that the former elements have recognition IDs of the bodies in the lower stages. Feature amounts are parameters acquired by sensors, such as the height, the weight, and the like of bodies. Processing flags are flags representing whether or not the object ID has been processed, information indicating that the object ID has been processed, such as true or "1," is stored if the object ID has been processed, and information indicating that the object ID has not yet been processed, such as false or "0," is stored if the object ID has not yet been processed.

The possession state management table in Table 2 is a table that manages what is held with which fingers. A recognition ID alignment represents which recognition ID is held with a finger through a finger ID. The recognition IDs form an alignment in a case in which a plurality of bodies is held, and former elements hold recognition IDs of bodies that are closer to the hand (later in an order of placement).

The attribute management table in Table 3 is a table that manages which recognition ID holds which attribute. Attributes are characteristics decided depending on an application.

Figure 8:
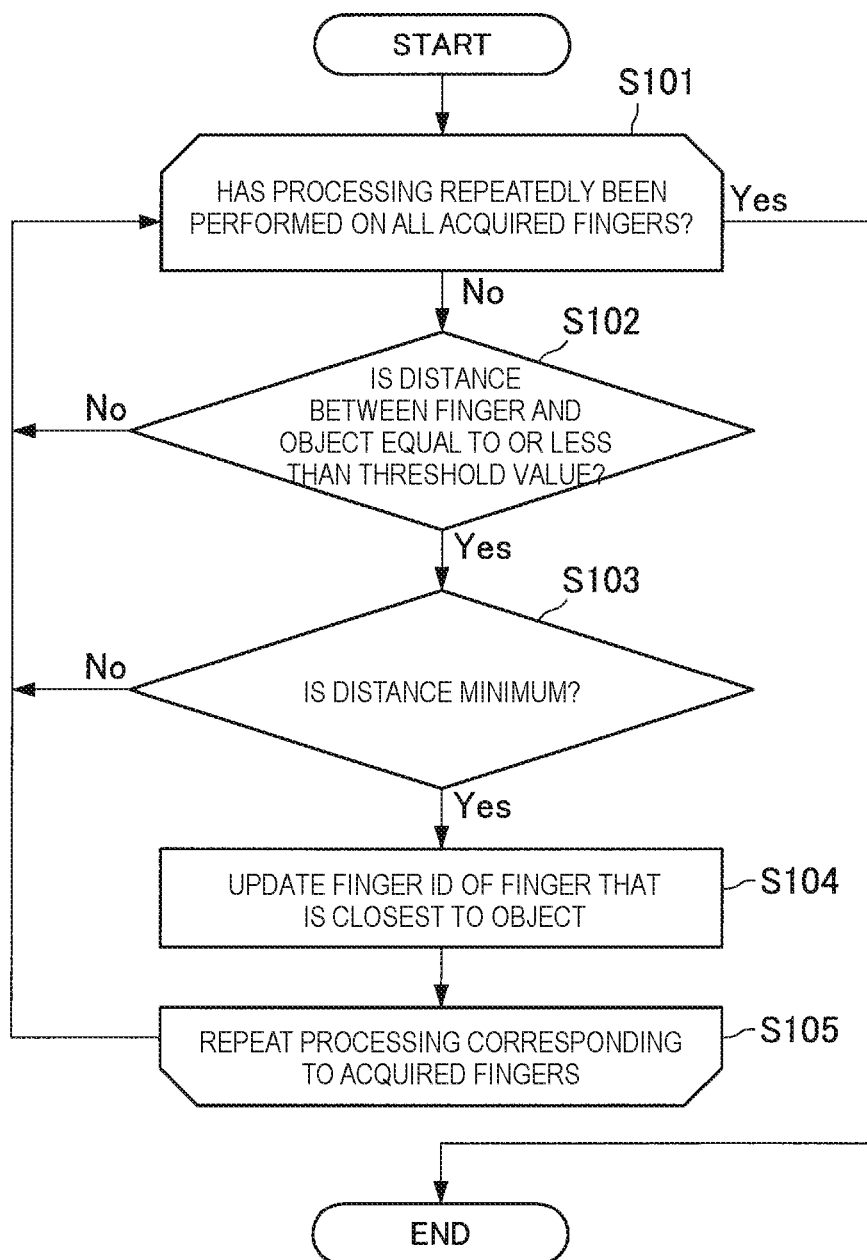
FIG. 8 is a flow diagram illustrating an operation example of a finger detection unit 210 according to the embodiment.

First, an operation example of the finger detection unit 210 will be described. FIG. 8 is a flow diagram illustrating an operation example of the finger detection unit 210 according to the embodiment and illustrates an example of processing illustrated as "closest finger detection processing" in a latter diagram.

The finger detection unit 210 acquires positions of fingers and a position of an object for all the fingers acquired from the input unit 110 (Step S101), calculates distances therebetween, and determines whether or not the distance is equal to or less than a predetermined threshold value (Step S102).

Figure 9:
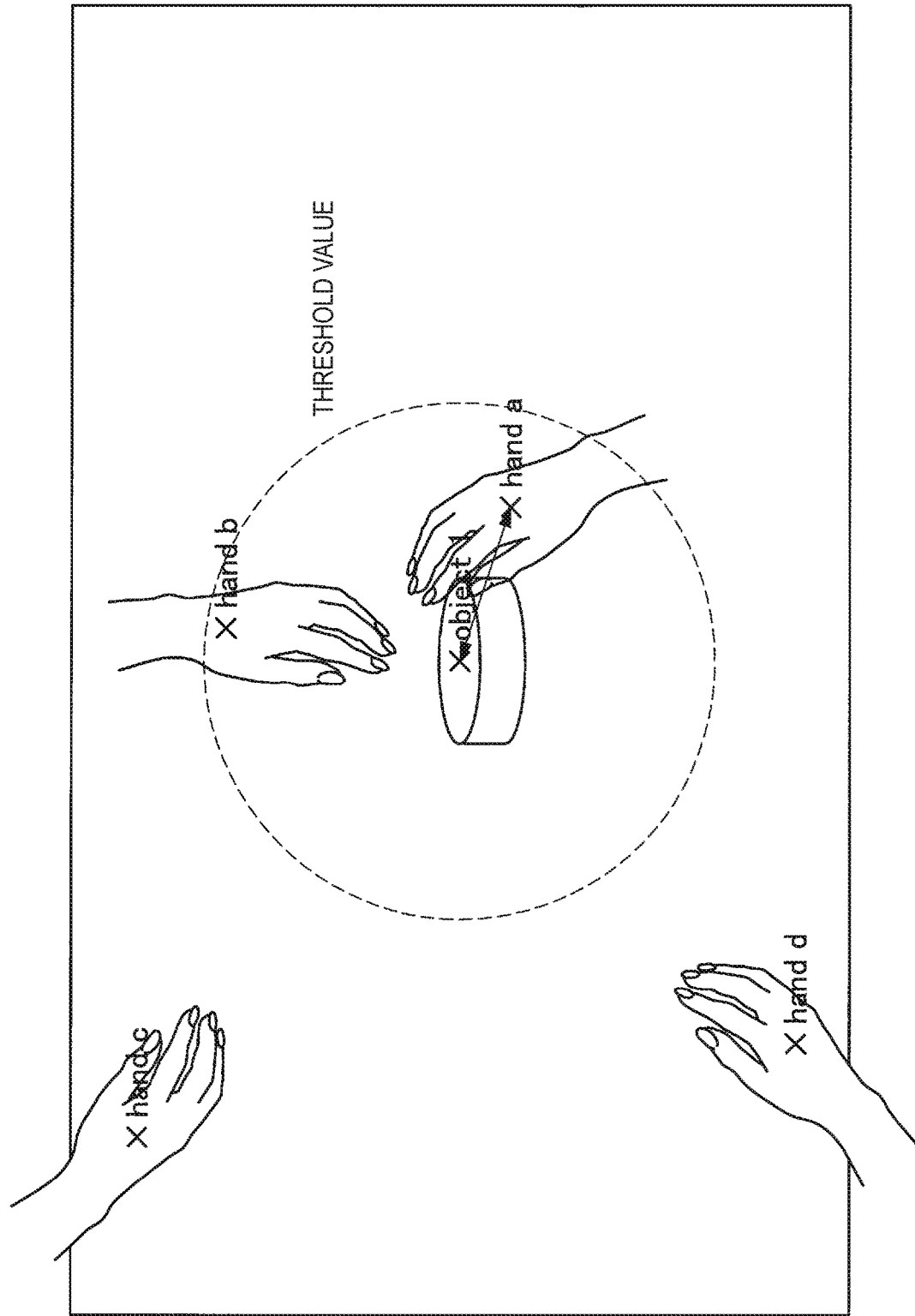
FIG. 9 is a schematic diagram when a distance from an object to each finger is calculated.

FIG. 9 is a schematic diagram when a distance from an object to each finger is calculated. Since hands c and d are greatly separated from the object (object 1) among hands a, b, c, and d illustrated in FIG. 9, and distances between the object and the hands are outside a threshold value, the hands are not regarded as hands with which the object has operated. Meanwhile, since the hands a and b are within the threshold value, the distances are compared, and the hand a with the minimum value is estimated as a hand with which the object has been operated. Note that the finger detection unit 210 can use the position of the center or the gravity center of the object as a reference and use the position of the center of the back of the hand or the position of the tip of the finger as a reference in the calculation of the distances. Also, in a case in which it is desired to more strictly measure the distances, the finger detection unit 210 may make a determination using the shape of the hand, the plane of the hand, or the like. In a case in which there is no significant difference in the distances, the finger detection unit 210 may regard a hand that has moved further as compared with that in the previous frame as a hand with which the object is operated.

In a case in which the distance is found not to be equal to or less than the threshold value (Step S102, No) as a result of the determination in Step S102, the finger detection unit 210 returns to processing for another finger. In a case in which the distance is equal to or less than the threshold value (Step S102, Yes), the finger detection unit 210 compares the distance with distances detected until that point and determines whether or not the newly calculated distance is the minimum distance (Step S103).

In a case in which the distance is found not to be the minimum distance (Step S103, No) as a result of the determination in Step S103, the finger detection unit 210 returns to processing for another finger. In a case in which the distance is the minimum distance (Step S103, Yes), the finger detection unit 210 determines that the finger is the finger that is the closest to the object and records (updates) the finger ID thereof (Step S104).

The finger detection unit 210 acquires the finger ID of the finger that is the closest to the object by repeating the aforementioned processing (Step S105).

Figure 10:
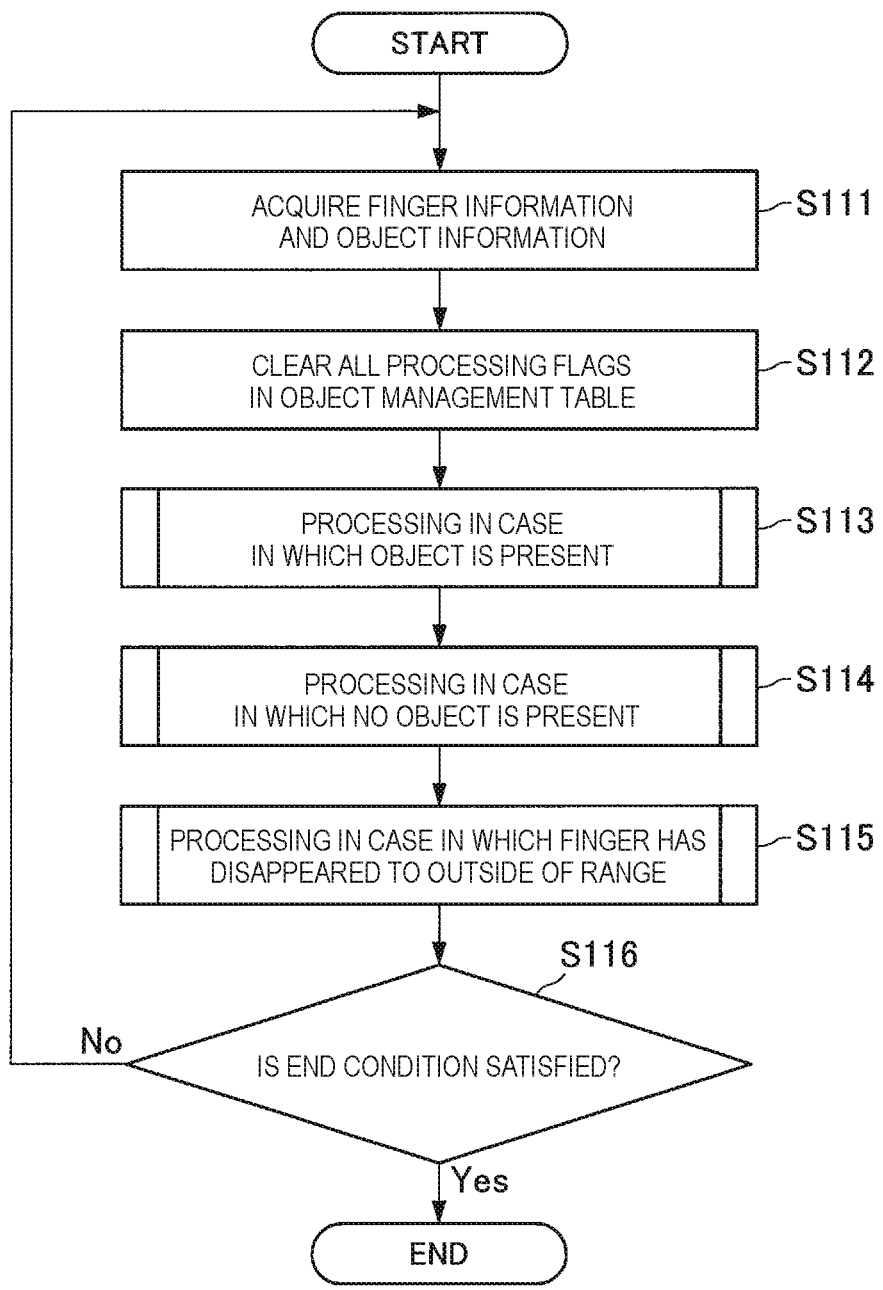
FIG. 10 is a flow diagram illustrating an operation example of an object information control unit 200 according to the embodiment.

Next, an operation example of the object information control unit 200 according to the embodiment of the disclosure will be described. FIG. 10 is a flow diagram illustrating an operation example of the object information control unit 200 according to the embodiment of the disclosure. Hereinafter, an operation example of the object information control unit 200 according to the embodiment of the disclosure will be described with reference to FIG. 10.

The object information control unit 200 first acquires finger information and object information acquired by the input unit 110 through sensing (Step S111). The following processing is repeatedly performed for each frame until an end condition such as a predetermined operation performed by the user is satisfied. The frame in this case indicates a frame in which graphic is rendering or a frame of a cycle at which sensor information is acquired from the input unit 110.

If the finger information and the object information are acquired, then the object information control unit 200 clears all the processing flags in the object management table (Step S112), All the bodies recognized in the previous frame are brought into an unprocessed state by all the processing flags in the object management table being cleared.

Next, the object information control unit 200 executes processing in a case in which an object is present (Step S113). Details of the processing in a case in which an object is present will be described later in detail.

Next, the object information control unit 200 executes processing in a case in which no object is present (Step S114). Details of the processing in a case in which an object is not present will be described later.

Next, the object information control unit 200 executes processing in a case in which the fingers have disappeared to the outside of the range of the sensing-possible region (Step S115). Details of the processing in a case in which the fingers have disappeared to the outside of the range of the sensing-possible region will be described later.

Then, the object information control unit 200 determines whether or not an end condition such as a predetermined operation performed by the user has been satisfied (Step S116). The object information control unit 200 returns to the processing in Step S111 in a case in which the end condition has not been satisfied (Step S116, No), and the object information control unit 200 ends a series of processes if the end condition has been satisfied (Step S116, Yes).

Figure 11:
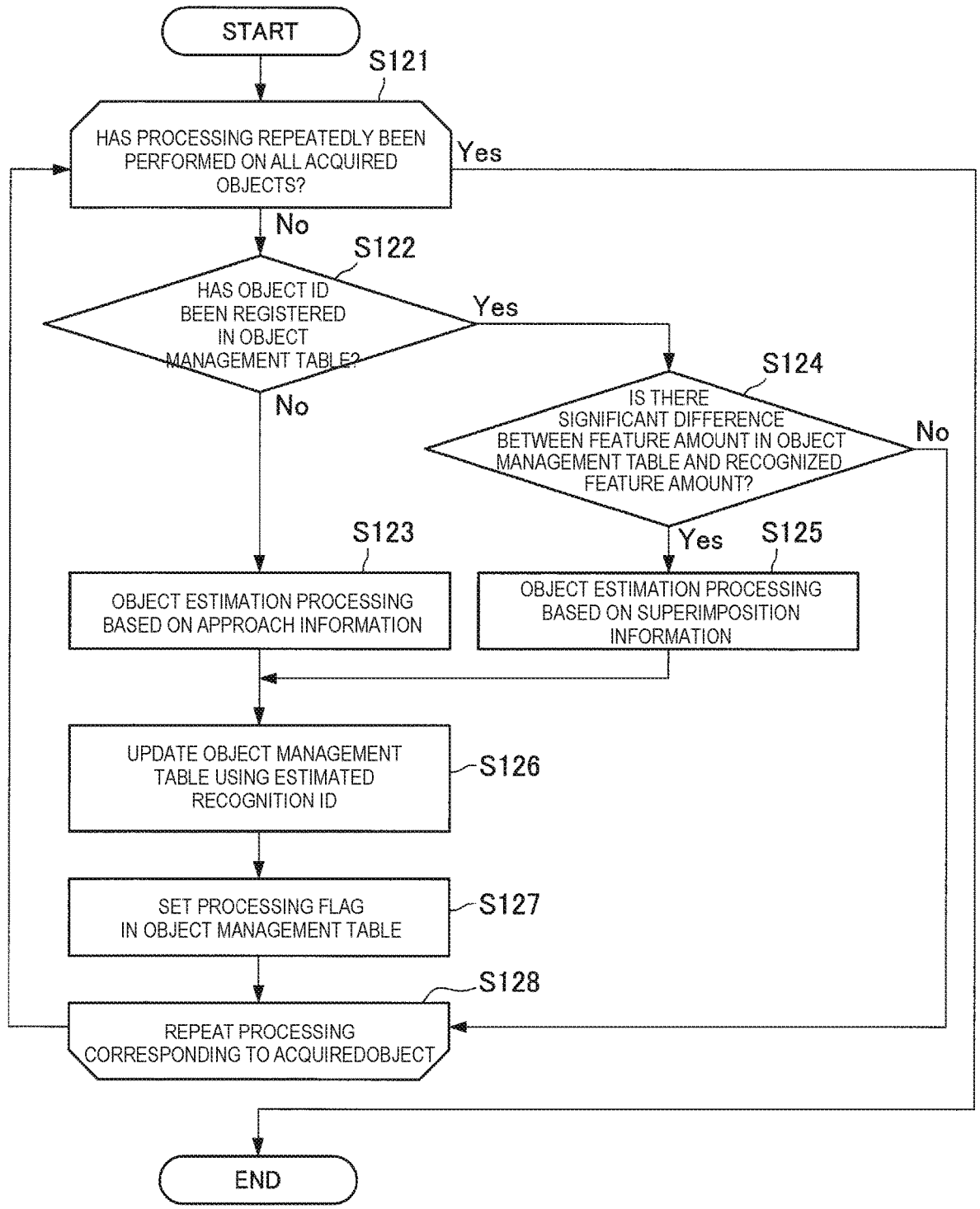
FIG. 11 is a flow diagram illustrating an operation example of an object information control unit 200 according to the embodiment.

Next, details of the processing in a case in which an object is present in the aforementioned step S113 will be described later. FIG. 11 is a flow diagram illustrating an operation example of the object information control unit 200 according to the embodiment of the disclosure and is an explanatory diagram illustrating an operation example in a case in which an object is present in the aforementioned step S113. Note that the following series of processes may be executed by the attribute processing unit 220, for example.

The object information control unit 200 repeats the following series of processes corresponding to the bodies acquired from the input unit 110 (Step S121). If the processing has not been performed on all the bodies (Step S121, No), the object information control unit 200 determines whether or not an object ID of an object as a target of processing has been registered in the object management table (Step S122). In a case in which the object ID of the object as the target of the processing has not been registered in the object management table (Step S122, No), the object is an object that is not present in the previous frame, and the object information control unit 200 then performs object estimation processing using approach information, which will be described later (Step S123). The object estimation processing using the approach information is processing of determining whether or not the object has occurred from (is placed on) fingers or has occurred without fingers and estimating a recognition ID.

Meanwhile, in a case in which the object ID of the object as the target of the processing has been registered in the object management table (Step S122, Yes), the object is an object that is also present in the previous frame, and the object information control unit 200 thus determines whether or not there are no changes in feature amounts such as the height and the weight of the object (Step S124). When the determination in Step S124 is made, which of errors due to sensor performances or significant differences the differences in the feature amounts are may be added as a determination criteria.

In a case in which there is no change in the feature amounts such as the height and the weight of the object (Step S124, No), the object information control unit 200 moves on to the processing for the next object. Meanwhile, in a case in which there is a change in the feature amounts such as the height and the weight of the object (Step S124, Yes), the object information control unit 200 performs object estimation processing using superimposition information, which will be described later (Step S125). The object estimation processing using the superimposition information is processing of determining how bodies have been overlapped and have increased or how overlapping bodies have been reduced and estimating a recognition ID.

The object information control unit 200 executes object estimation processing using the object estimation processing based on approach information or the superimposition information, then the object information control unit 200 updates the object ID, the recognition ID alignment, and the feature amounts in the object management table using the estimated recognition ID (Step S126). Then, the object information control unit 200 sets the processing flag for the object to indicate that the processing has been done (Step S127).

The object information control unit 200 repeats the aforementioned series of processes corresponding to the bodies acquired from the input unit 110 (Step S128).

Figure 12:
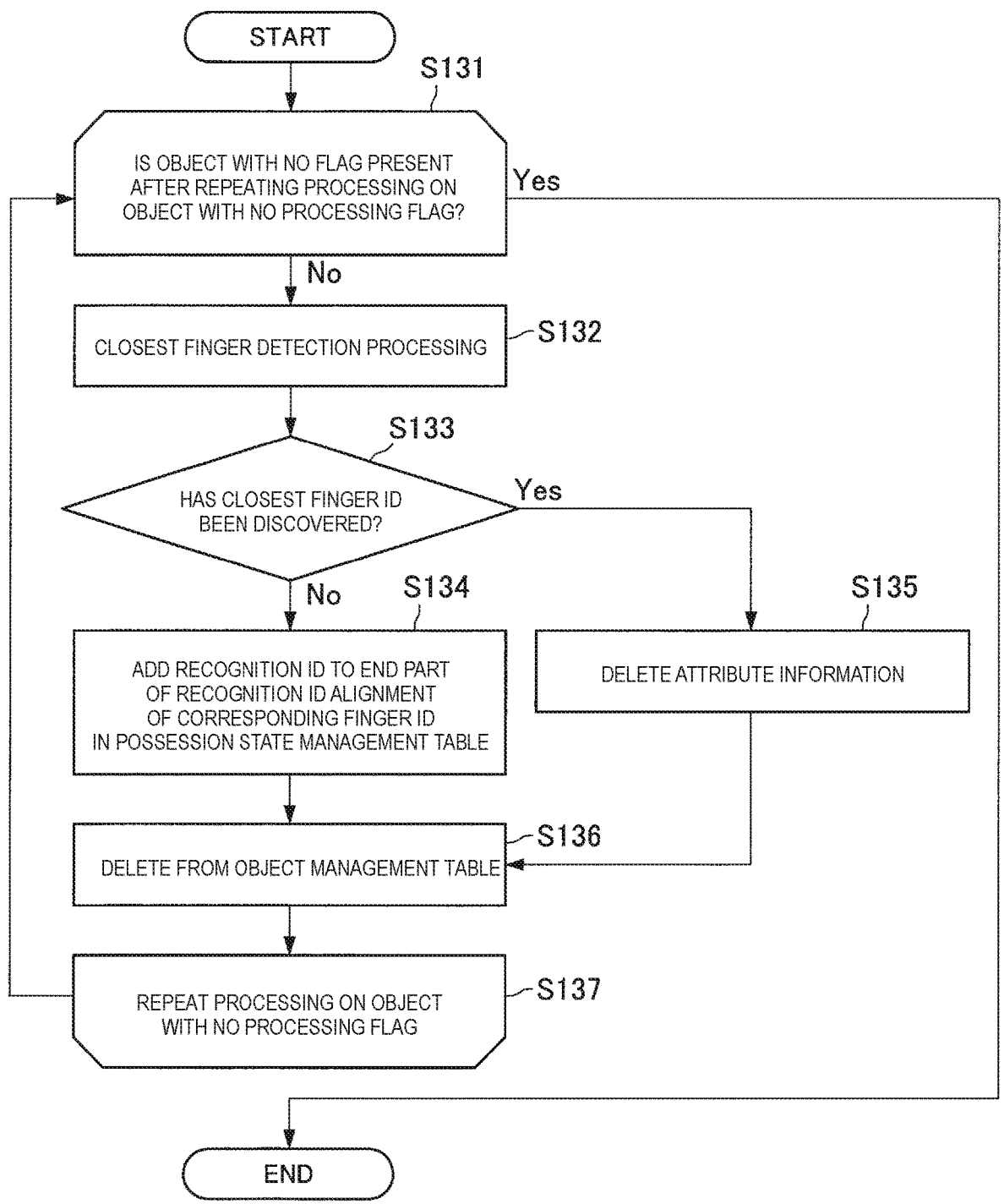
FIG. 12 is a flow diagram illustrating an operation example of an object information control unit 200 according to the embodiment.

Next, details of the processing in a case in which no object is present in the aforementioned step S114 will be described later. FIG. 12 is a flow diagram illustrating an operation example of the object information control unit 200 according to the embodiment of the disclosure and is an explanatory diagram illustrating an operation example in a case in which no object is present in the aforementioned step S114. Note that the following series of processes may be executed by the finger detection unit 210 and the attribute processing unit 220, for example.

Since bodies for which no processing flags have been applied in the processing performed until this point are present in the previous frame and are not processed in the current frame, it is possible to determine that this is a case in which the bodies have been removed or have disappeared for some reasons and are not present. The object information control unit 200 repeatedly performs the following processing corresponding to the present bodies to which no processing flags have been applied (Step S131).

The object information control unit 200 acquires a finger ID with which an object is estimated to have been removed (Step S132) and determines whether or not a finger has been able to be discovered (Step S133) through the aforementioned closest finger detection processing. In a case in which the finger ID has been able to be discovered in the closest finger detection processing (Step S133, Yes), it is considered that the object has been owned by the finger, the object information control unit 200 thus adds the recognition ID to the end of the recognition ID alignment of the corresponding finger ID in the possession state management table (Step S134). In a case in which no corresponding finger ID is present, the object information control unit 200 adds a finger ID and a recognition ID that the object has. Note that there may be a case in which the operation object such as a hand moves to a position at which the operation object blocks sensing of the object performed by the input unit 110 even if the object does not approach the operation object such as the hand in the depth direction (the height direction, for example) of the sensing. In such a case, if moving of the operation object to a position at which at least a part of sensing is blocked is detected, the object information control unit 200 may regard the object as being possessed by the operation object. Then, the object information control unit 200 may add the registered recognition ID of the object for which the sensing has been blocked to the end of the recognition ID alignment of the finger ID corresponding to the operation object that has at least partially blocked the sensing of the object, in the possession state management table.

Meanwhile, in a case in which no finger ID has been able to be discovered in the closest finger detection processing (Step S133, No), this means that the object has disappeared from the sensing-possible region for some reason such as a reason that the object has flown away due to wind, and the object information control unit 200 thus deletes attribute information from the attribute management table (Step S135).

Then, the object information control unit 200 deletes the row of the corresponding object from the object management table (Step S136).

The object information control unit 200 repeatedly performs the aforementioned series of processes corresponding to the present bodies to which no processing flags have been applied (Step S137).

Figure 13:
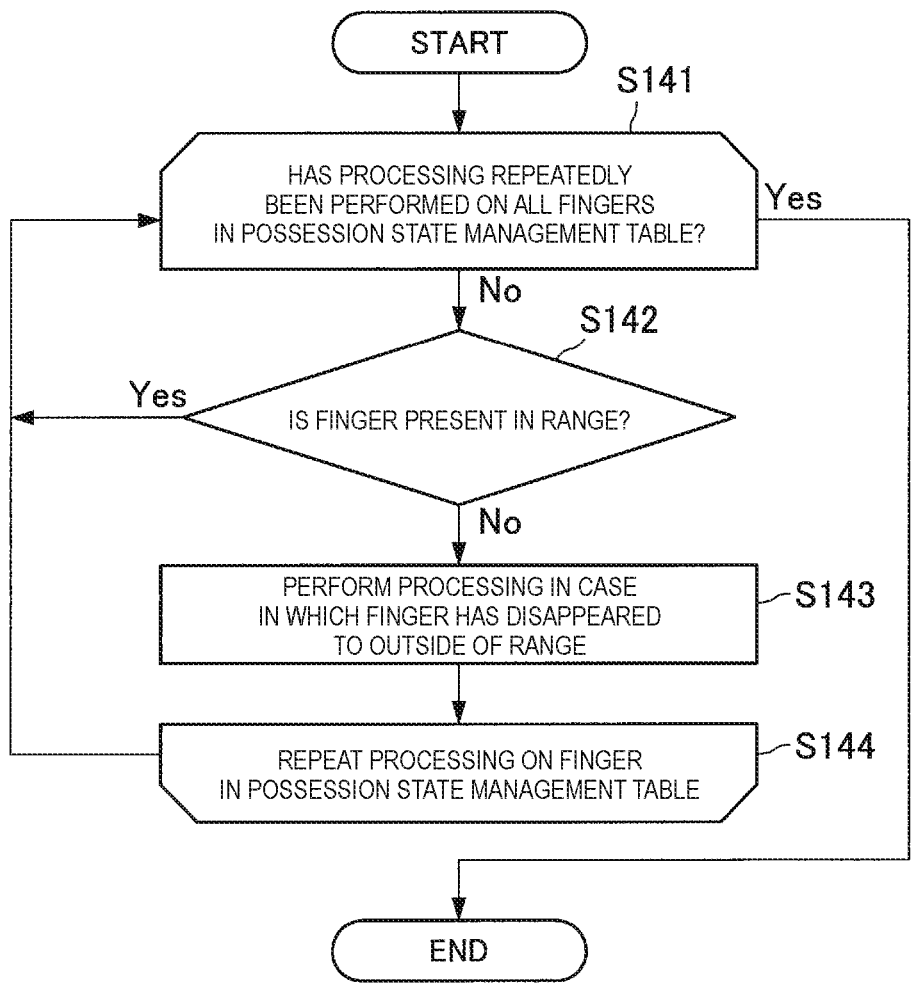
FIG. 13 is a flow diagram illustrating an operation example of an object information control unit 200 according to the embodiment.

Next, details of the processing in a case in which the fingers have disappeared to the outside of the range in the aforementioned Step S115 will be described. FIG. 13 is a flow diagram illustrating an operation example of the object information control unit 200 according to the embodiment of the disclosure and is an explanatory diagram illustrating an operation example in a case in which the fingers have disappeared to the outside of the range in the aforementioned Step S115. Note that the following series of processes may be executed by the attribute processing unit 220, for example.

The object information control unit 200 repeatedly performs the following processing corresponding to the fingers registered in the possession state table (Step S141).

The object information control unit 200 determines whether or not a corresponding finger is present in the range of the sensing-possible region on the basis of information from the input unit 110 (Step S142). In a case in which the finger is present in the range of the sensing-possible region (Step S142, Yes), the object information control unit 200 determines that the finger is continuously holding the object and moves on to the processing for the next finger without doing anything.

In a case in which the finger is not present in the range of the sensing-possible region (Step S142, No), the object information control unit 200 determines that the finger has disappeared to the outside of the range and performs processing in a case in which the finger has disappeared to the outside of the range (Step S143). The processing in the case in which the finger has disappeared to the outside of the range depends on a purpose of a function that it is desired to realize with an application that the information processing system 100 executes.

In a case in which the finger has disappeared to the outside of the range in a state in which the object is being held with the finger, for example, it is not obvious that the same object is still held when the finger appears again, and the object information control unit 200 thus deletes corresponding items from all of the object management table, the possession state management table, and the attribute management table.

Also, the object information control unit 200 maintains all items and applies a flag to the finger ID in the possession state management table and stores the flag on the assumption that the finger appears again with the same object held therewith even if the finger disappears to the outside of the range, for example. As an assumption of the case, a case in which the same ID is assigned to the finger that has appeared again or a case in which the finger with different IDs is regarded as the same finger as long as the finger has entered from the same direction is conceivable.

The object information control unit 200 can track motion of the object and the fingers and maintain attributes to be associated with the object even if the object is covered with the fingers by executing the series of processes.

Figure 14:
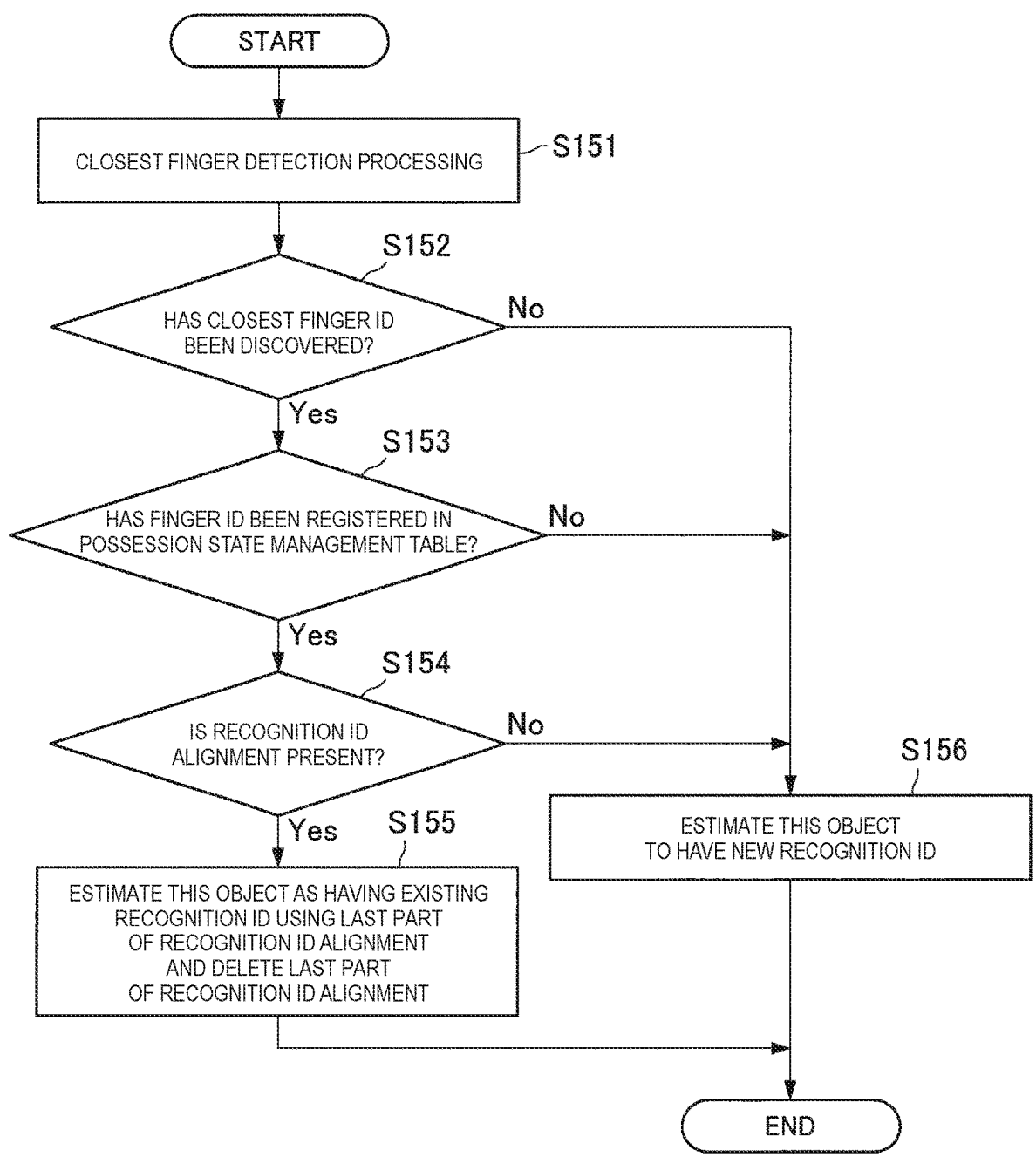
FIG. 14 is a flow diagram illustrating an operation example of an object information control unit 200 according to the embodiment.

Next, object estimation processing using approach information illustrated in Step S123 in FIG. 11 will be described. FIG. 14 is a flow diagram illustrating an operation example of the object information control unit 200 according to the embodiment of the disclosure and is a flow diagram illustrating object estimation processing using approach information illustrated in Step S123 in FIG. 11. Note that the following series of processes may be executed by the finger detection unit 210 and the attribute processing unit 220.

In a case in which the object estimation processing using the approach information is performed, the object information control unit 200 first performs closest finger detection processing (Step S151). Then, the object information control unit 200 determines whether or not a closest finger ID has been able to be discovered through the closest finger detection processing (Step S152).

In a case in which the closest finger ID has been able to be discovered (Step S152, Yes), then the object information control unit 200 determines whether or not the finger ID has been registered in the possession state management table (Step S153).

In a case in which the finger ID has been registered in the possession state management table (Step S153, Yes), then the object information control unit 200 determines whether or not a recognition ID alignment is present for the finger ID (Step S154).

If the recognition ID alignment is present for the finger ID (Step S154. Yes), what is held with the finger with the finger ID is considered to be the object at the last part of the recognition ID alignment, the object information control unit 200 thus estimates the object as an object with an existing recognition ID and deletes the last part of the recognition ID alignment used for the estimation (Step S155). The object information control unit 200 keeps the recognition ID alignment as it is in a case in which the recognition ID alignment is still present after the deletion of the last part of the recognition ID alignment or deletes the entire finger ID in a case in which no recognition ID alignment is present.

In a case in which the closest finger ID has not been able to be detected in the determination in Step S152 (Step S152, No), the object information control unit 200 determines that the object is an unknown object that has occurred for some reason and assigns a new recognition ID thereto (Step S156).

In a case in which the finger ID has not been registered in the possession state management table in the determination in Step S153 (Step S153, No), the object information control unit 200 determines that the object is an unknown object that has occurred from a new finger and assigns a new recognition ID thereto (Step S156).

In a case in which no recognition ID alignment is present in the finger ID in the determination in Step S154 (Step S154, No), the object information control unit 200 determines that the finger is known while the placed object is unknown and assigns a new recognition ID thereto (Step S156). A case in which another object is further held within the range in a state in which an object is initially held outside the range, for example, corresponds to this case.

The object information control unit 200 can determine whether or not an object is being recognized by detecting the closest finger relative to the object when the object has occurred in the sensing-possible region, by executing the series of processes.

Figure 15:
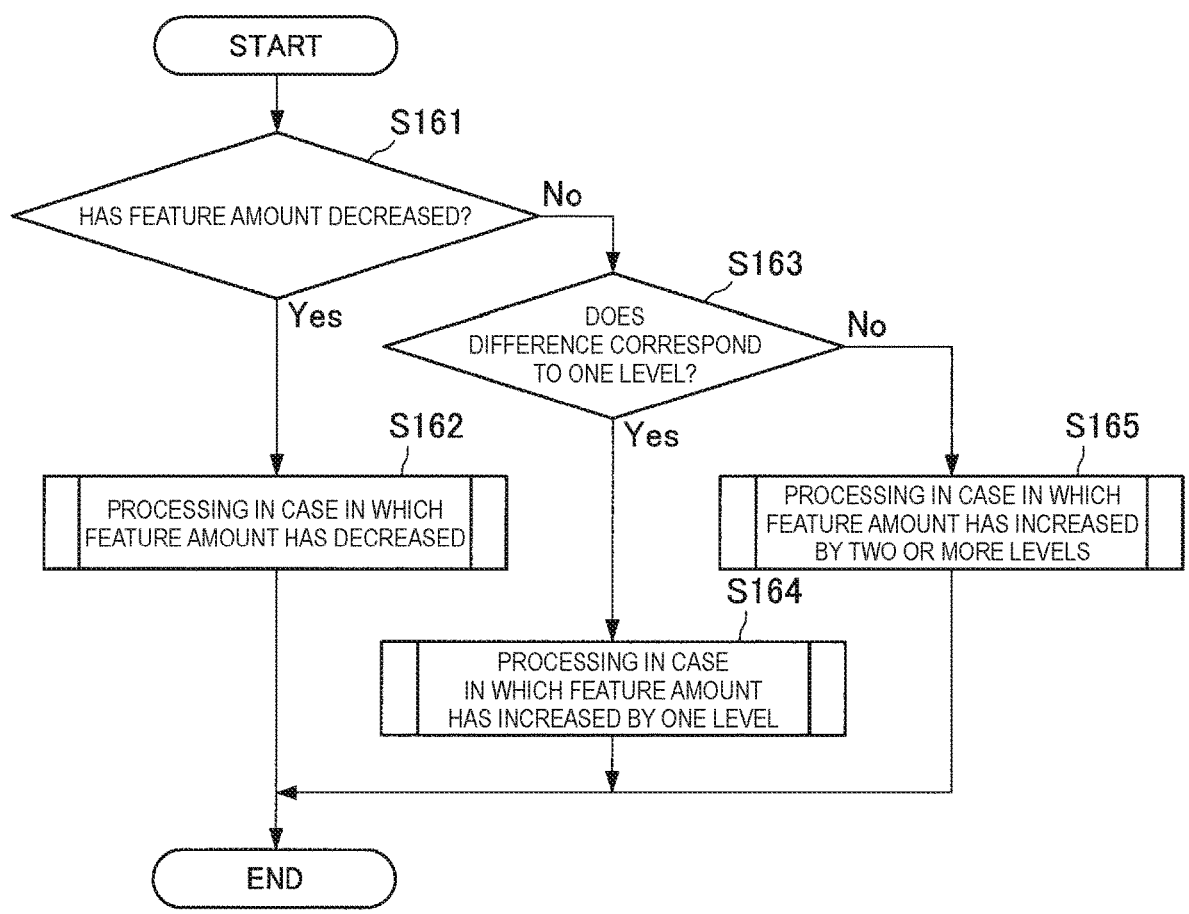
FIG. 15 is a flow diagram illustrating an operation example of an object information control unit 200 according to the embodiment.

Next, object estimation processing using superimposition processing illustrated in Step S125 in FIG. 11 will be described. FIG. 15 is a flow diagram illustrating an operation example of the object information control unit 200 according to the embodiment of the disclosure and is a flow diagram illustrating object estimation processing using superimposition information illustrated in Step S125 in FIG. 11. Note that the following series of processes may be executed by the finger detection unit 210 and the attribute processing unit 220.

The following processing will be described on the assumption that an object as a target of sensing has a unit feature amount in a predetermined height direction. For example, the object as a target of sensing is assumed to be an object with a flat columnar shape like a coin. Also, although the following description will be given on the assumption that the depth direction of sensing corresponds to the height direction and the feature amount in the depth direction of the sensing corresponds to the feature amount in the height direction (the height of the top surface of the object with reference to the surface on which the object is placed), the disclosure is not limited to such an example. In a case in which an object with magnetic force is caused to be adsorbed to a wall surface, for example, sensing and projection is performed on the wall surface. In such a case, the depth direction of the sensing is a vertical direction relative to the wall surface, and the feature amount in the depth direction of the sensing is the feature amount of the vertical direction relative to the wall surface (the height of a surface in parallel to the wall surface among surfaces of the object with reference to the wall surface). Note that information other than the height from the reference surface may be used as the feature amount in the depth direction of the sensing. Also, a position of three-dimensional information of the object in the depth direction obtained by a depth sensor (coordinate information of the depth) may be used as the feature amount in the depth direction of the sensing, for example.

The object information control unit 200 first determines whether or not the feature amount of the object has decreased (Step S161). If the feature amount has decreased (Step S161, Yes), the object information control unit 200 executes processing for the case in which the feature amount has decreased (Step S162). The processing for the case in which the feature amount has decreased will be described later in detail. If the feature amount has not decreased (Step S161, No), the object information control unit 200 determines whether or not a difference in the increase corresponds to one level (corresponding to one unit feature amount) (Step S163). If the increase corresponds to one level (Step S163, Yes), the object information control unit 200 executes processing for the case in which the feature amount has increased by one level (Step S164). The processing for the case in which the feature amount has increased by one level will be described later in detail. If the feature amount has increased by two or more levels (Step S163, No), the object information control unit 200 executes processing for the case in which the feature amount has increased by two or more levels (Step S165). The processing for the case in which the feature amount has increased by two or more levels will be described later in detail.

Figure 16:
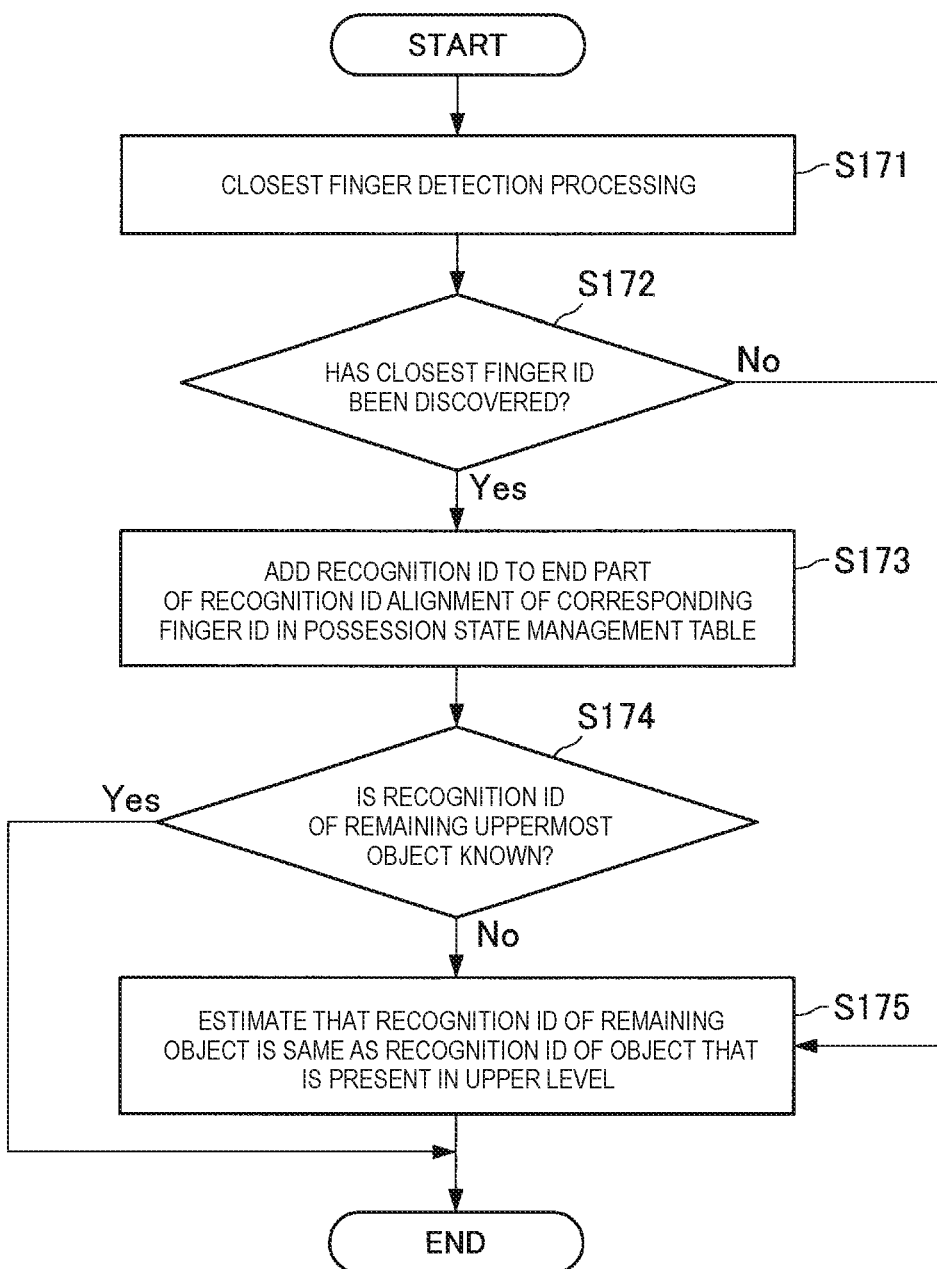
FIG. 16 is a flow diagram illustrating an operation example of an object information control unit 200 according to the embodiment.

Next, the processing for the case in which the feature amount has decreased in the aforementioned Step S162 will be described. FIG. 16 is a flow diagram illustrating an operation example of the object information control unit 200 according to the embodiment of the disclosure and is a flow diagram illustrating the processing for the case in which the feature amount has decreased in Step S162 in FIG. 15. Note that the series of processes may be executed by the finger detection unit 210 and the attribute processing unit 220.

The object information control unit 200 first performs closest finger detection processing (Step S171). Then, the object information control unit 200 determines whether or not a closest finger ID has been able to be discovered through the closest finger detection processing (Step S172).

In a case in which the closest finger ID has been able to be discovered (Step S172, Yes), the object information control unit 200 determines that the feature amount has decreased since the object has been possessed by the finger and adds a recognition ID of the possessed object to the last part of the recognition ID alignment of the corresponding finger ID in the possession state management table (Step S173). In a case in which the feature amount has decreased by two or more levels here, the object information control unit 200 adds a plurality of recognition IDs of the possessed object to the last part of the recognition ID alignment of the finger ID. In this case, the upper levels of the recognition ID alignment are added in the orders closer to the head (that is, closer to the hand).

Next, the object information control unit 200 determines whether or not the recognition ID in the uppermost level of a remaining object is known (Step S174). In a case in which the recognition ID is known (Step S174, Yes), the object information control unit 200 does not perform anything. Meanwhile, in a case in which the recognition ID is unknown (Step S174, No), the object information control unit 200 estimates that the remaining object is the object with the same characteristics as those of the object that has been brought by the fingers since the remaining object has been placed at the same time with the possessed object and assigns the recognition ID that is the same as that of the object that has been brought by the fingers (Step S175).

In a case in which the closest finger ID has not been able to be discovered in the determination in Step S172 (Step S172, Yes), the object information control unit 200 determines that the object has decreased regardless of the fingers, estimates that the remaining object is the object with the same characteristics as those of the object that has disappeared and used to be present in the upper level though the reason is not obvious, and assigns a recognition ID that is the same as that of the object that has disappeared (Step S175).

Figure 17:
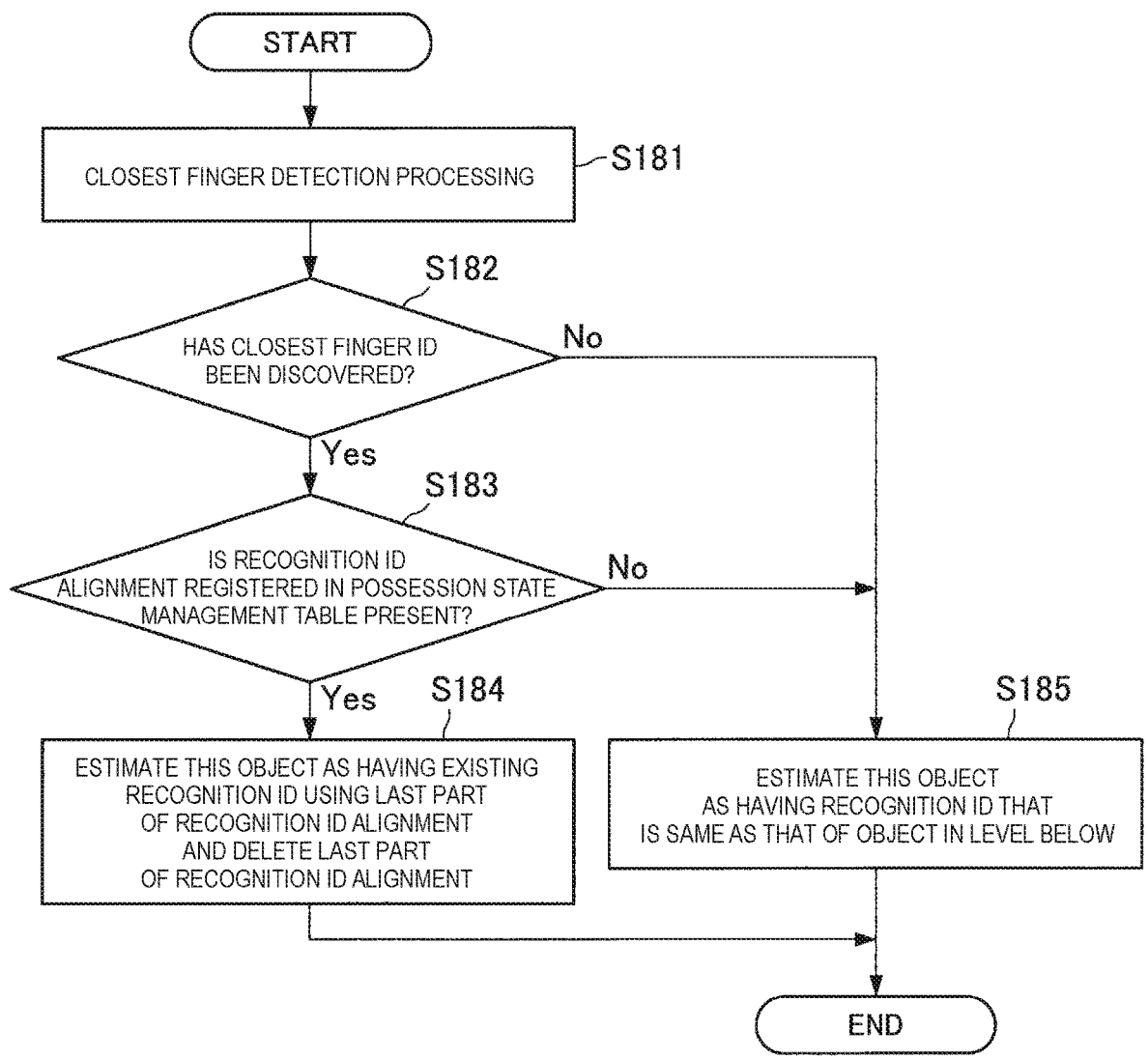
FIG. 17 is a flow diagram illustrating an operation example of an object information control unit 200 according to the embodiment.

Next, the processing for the case in which the feature amount has increased by one level in the aforementioned Step S164 will be described. FIG. 17 is a flow diagram illustrating an operation example of the object information control unit 200 according to the embodiment of the disclosure and is a flow diagram illustrating the processing for the case in which the feature amount has increased by one level in Step S164 in FIG. 15. Note that the series of processes may be executed by the finger detection unit 210 and the attribute processing unit 220.

The object information control unit 200 first performs closest finger detection processing (Step S181). Then, the object information control unit 200 determines whether or not a closest finger ID has been able to be discovered through the closest finger detection processing (Step S182).

In a case in which the closest finger ID has been able to be discovered (Step S182, Yes), then the object information control unit 200 determines whether or not the finger ID has been registered in the possession state management table and holds a recognition ID alignment (Step S183). In a case in which the finger ID has been registered in the possession state management table and holds a recognition ID alignment (Step S183, Yes), the object information control unit 200 estimates the recognition ID of the object with the feature amount, which has increased by one level, using the last part of the recognition ID alignment and further deletes the last part of the recognition ID alignment used for the estimation (Step S184). In a case in which the finger ID has not been registered in the possession state management table or does not hold the recognition ID alignment (Step S183, No), the object information control unit 200 estimates that an unknown object that has occurred from a new finger is the object with the same characteristics since the object increased by one level and has been caused to overlap at the same location and assigns a recognition ID that is the same as that of the object in a level below (Step S185).

In a case in which the closest finger ID has not been able to be discovered in the determination in Step S182 (Step S182. Yes), the object information control unit 200 estimates that the unknown object that has occurred from the new finger is the object with the same characteristics since the object increases by one level and has been caused to overlap at the same location and assigns the recognition ID that is the same as that of the object in the level below (Step S185).

Figure 18:
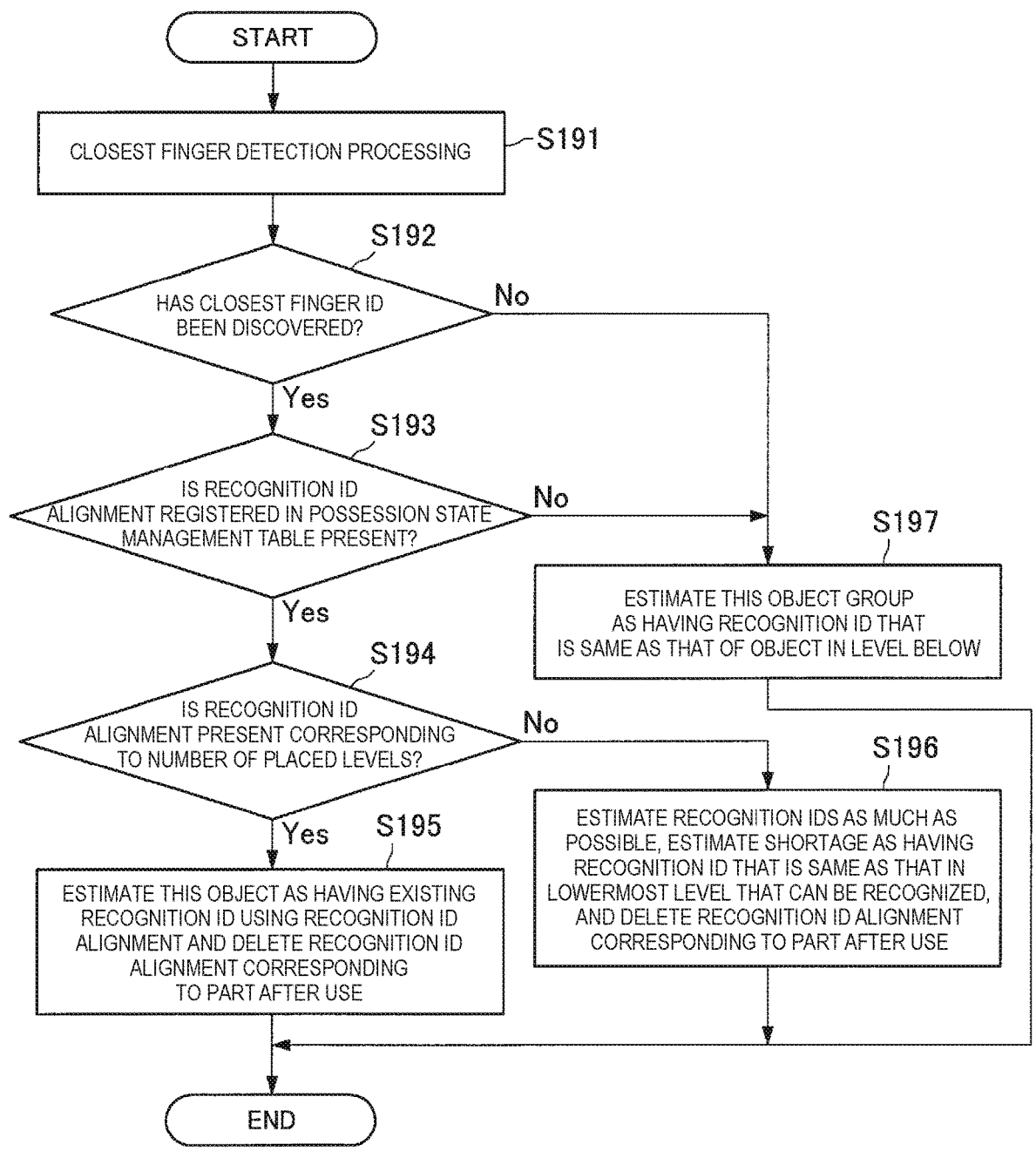
FIG. 18 is a flow diagram illustrating an operation example of an object information control unit 200 according to the embodiment.

Next, the processing for the case in which the feature amount has increased by equal to or more than two levels in the aforementioned Step S165 will be described. FIG. 18 is a flow diagram illustrating an operation example of the object information control unit 200 according to the embodiment of the disclosure and is a flow diagram illustrating the processing for the case in which the feature amount has increased by equal to or more than two levels in Step S165 in FIG. 15. Note that the series of processes may be executed by the finger detection unit 210 and the attribute processing unit 220.

The object information control unit 200 first performs closest finger detection processing (Step S191). Then, the object information control unit 200 determines whether or not a closest finger ID has been able to be discovered through the closest finger detection processing (Step S192).

In a case in which the closest finger ID has been able to be discovered (Step S192, Yes), then the object information control unit 200 determines whether or not the finger ID has been registered in the possession state management table and holds a recognition ID alignment (Step S193). In a case in which the finger ID has been registered in the possession state management table and holds the recognition ID alignment (Step S193, Yes), then the object information control unit 200 determines whether or not a recognition ID alignment is present corresponding to the number of increasing levels (Step S194). If the recognition ID alignment is present corresponding to the number of increasing levels (Step S194, Yes), all the increasing objects are known bodies, the object information control unit 200 thus assigns existing recognition IDs to the bodies using the recognition ID alignment corresponding to the number of increasing levels and deletes the recognition ID alignment corresponding to the number of increasing levels from the possession state management table (Step S195).

If the recognition ID alignment corresponding to the number of increasing levels is not present in the determination in Step S194 (Step S194, No), the object information control unit 200 determines that an unknown object is interposed between bodies corresponding to the number of increasing levels and uses available recognition IDs as much as possible. The object information control unit 200 estimates that a shorted part is an object with the same characteristics as those of the lowermost level of an object placed together and updates the attribute management table with the same recognition ID (Step S196). Also, the object information control unit 200 deletes the recognition ID alignment that has already been used.

In a case in which the finger ID has not been able to be detected in the determination in Step S192 (Step S192, No), this means that an unknown object occurring from a new finger has increased by several levels, and the object information control unit 200 estimates that the object has the same characteristics since the object has been caused to overlap at the same location. Then, the object information control unit 200 assigns a recognition ID that is the same as that of the object in a level below (Step S197).

In a case in which the finger ID has not been registered in the possession state management table or does not hold the recognition ID alignment in the determination in Step S193 (Step S193, No), the object information control unit 200 estimates the object has the same characteristics since the object has been caused to overlap at the same location. Then, the object information control unit 200 assigns a recognition ID that is the same as that of the object in a level below (Step S197).

The object information control unit 200 can track motion of the object, such as motion of the object having been caused to overlap and placed at the same time or motion of the object having been placed at the same time with the fingers, by detecting whether or not the feature amount of the object has changed in this manner. Also, the object information control unit 200 can estimate that the object with the same motion has the same characteristics and assign a recognition ID with the unknown object by such a series of processes.

Specific examples of the series of processes performed by the object information control unit 200 described above will be described. The following examples will be described by exemplifying the height of an object acquired from a three-dimensional sensor as a feature amount to be saved in the object management table. First, an example in which an unknown object appears in a sensing-possible region will be described.

Figure 19A:
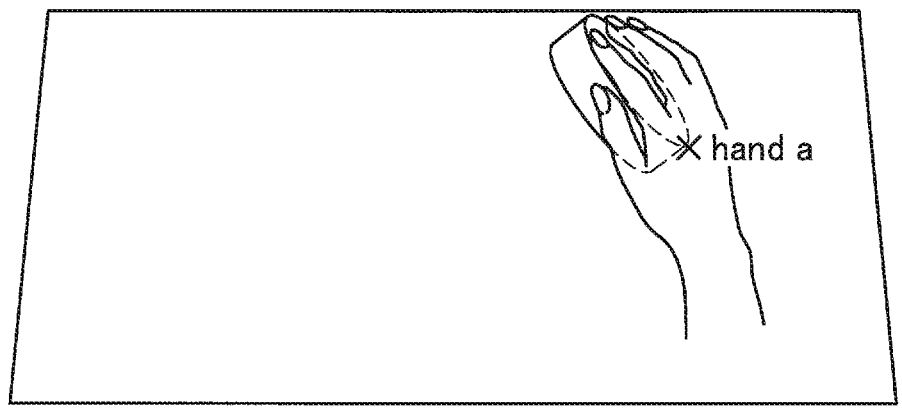
FIG. 19A is an explanatory diagram for explaining operations when an unknown object appears in a sensing-possible region.
Figure 19B:
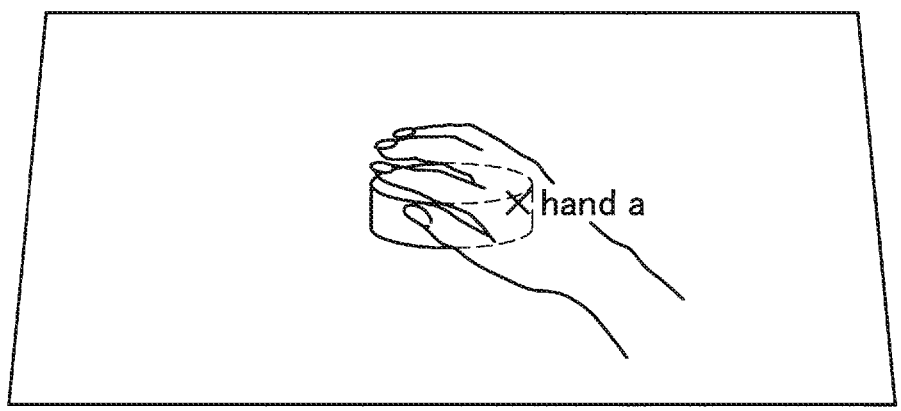
FIG. 19B is an explanatory diagram for explaining operations when an unknown object appears in a sensing-possible region.
Figure 19C:
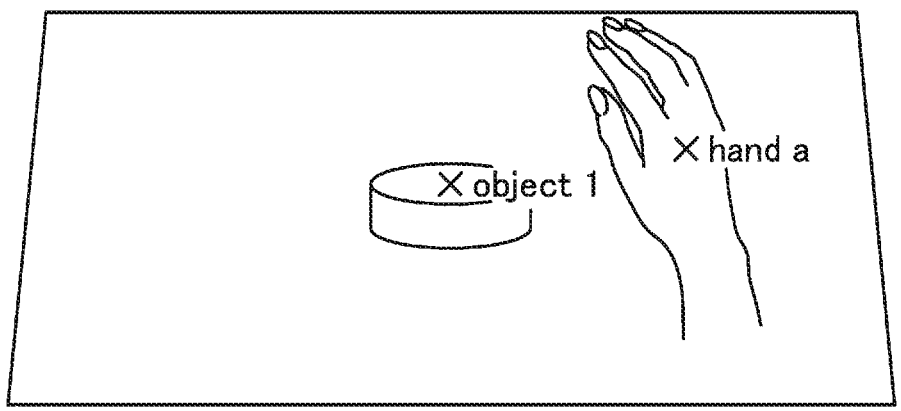
FIG. 19C is an explanatory diagram for explaining operations when an unknown object appears in a sensing-possible region.

FIGS. 19A to 19C are explanatory diagrams for explaining operations when an unknown object has appeared in a sensing-possible region. FIGS. 19A to 19C also illustrate states of the respective tables in a case in which a table corresponds to the sensing-possible region and the unknown object has appeared on the table.

FIG. 19A is a diagram illustrating a state in which a hand a holding an object has appeared. In this case, it is assumed that no information has been registered in the object management table, the possession state management table, and the attribute management table.

FIG. 19B is a diagram illustrating a state in which a hand holding an object has placed the object on the table. Even at this timing, no information has been registered yet in the object management table, the possession state management table, and the attribute management table.

FIG. 19C is a diagram illustrating a state in which a hand places an object on a table and is then separated from the object. If the object is placed on the table, and the hand is separated from the object, the object information control unit 200 recognizes the object placed on the table and registers information as illustrated in FIG. 19C for the object. The object information control unit 200 registers an object ID "1" for the object and registers "A" as a recognition ID in a recognition ID alignment. The object information control unit 200 also registers information of the recognition ID "A" in the attribute management table. Since what attributes the object has is still not obvious at this timing, the object information control unit 200 registers the object as an unknown object in the attribute management table.

Next, operations in a case in which an object with known attributes is placed in a sensing-possible region and the object is moved within the sensing-possible region will be described. FIGS. 20A to 20D are exemplary diagrams for explaining operations in a case in which an object is placed in a sensing-possible region and the object is moved within the sensing-possible region. FIGS. 20A to 20D also illustrate states of the respective tables in a case in which a table corresponds to the sensing-possible region and the object with known attributes is moved on the table.

Figure 20A:
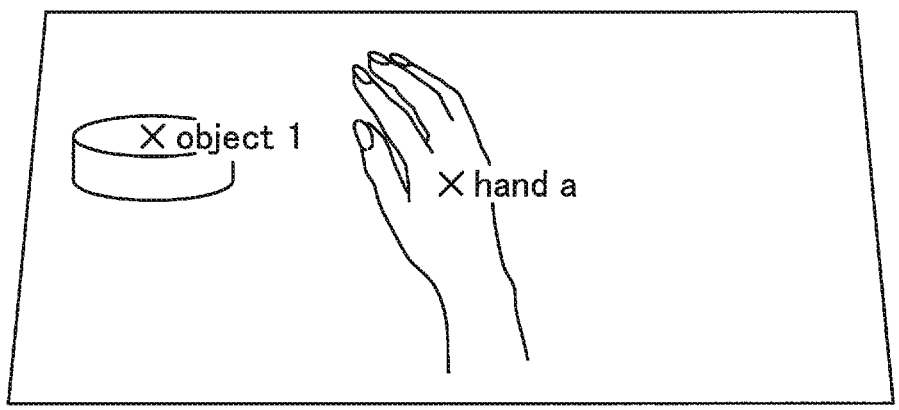
FIG. 20A is an explanatory diagram for explaining operations in a case in which an object is caused to move in the sensing-possible region.

FIG. 20A is a diagram illustrating a state in which the object with the object ID "1" is placed on the table. In this state, it is assumed that information as illustrated in FIG. 20A has been registered in the object management table, the possession state management table, and the attribute management table.

Figure 20B:
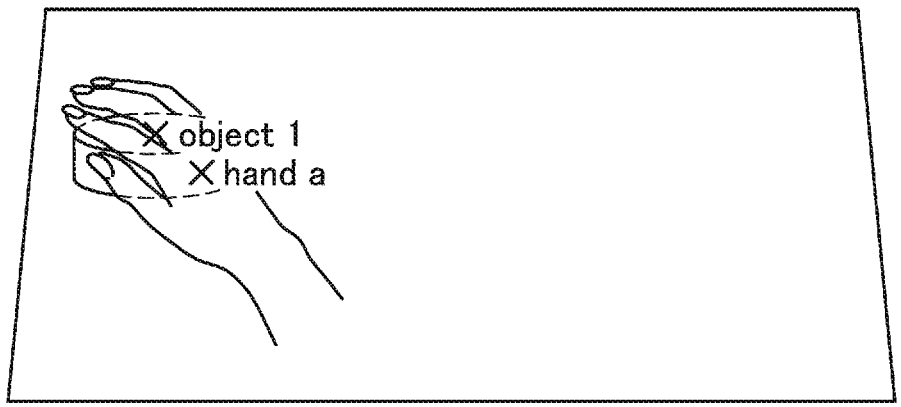
FIG. 20B is an explanatory diagram for explaining operations in a case in which an object is caused to move in the sensing-possible region.

FIG. 20B is a diagram illustrating a state in which the object with the object ID "1" is held in a hand (hand a). If covering of the object with the object ID "1" with the hand (hand a) is detected, the object information control unit 200 moves information of a recognition ID alignment corresponding to the object to the possession state management table. Also, the object information control unit 200 causes a processing flag in the object management table to change to false at this timing.

Figure 20C:
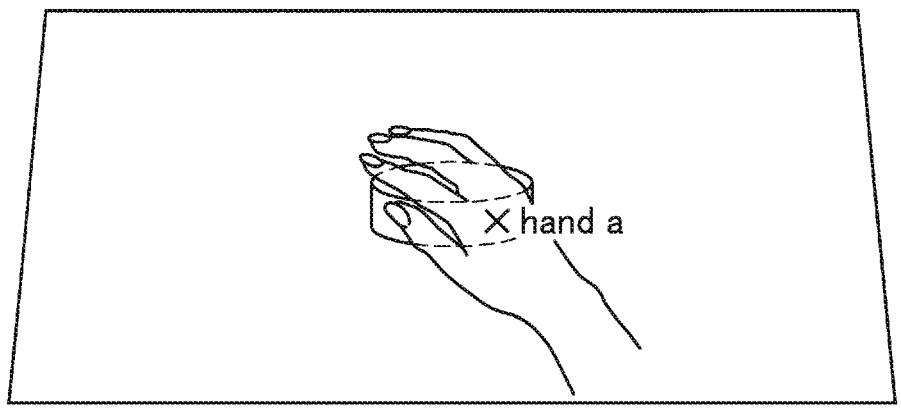
FIG. 20C is an explanatory diagram for explaining operations in a case in which an object is caused to move in the sensing-possible region.

FIG. 20C is a diagram illustrating a state in which the hand holding the object with the recognition ID alignment "A" is moving over the table. At this timing, no information has been registered in the object management table, and possession of the object with the recognition ID alignment "A" in the hand with a finger ID "a" has been registered in the possession state management table.

Figure 20D:
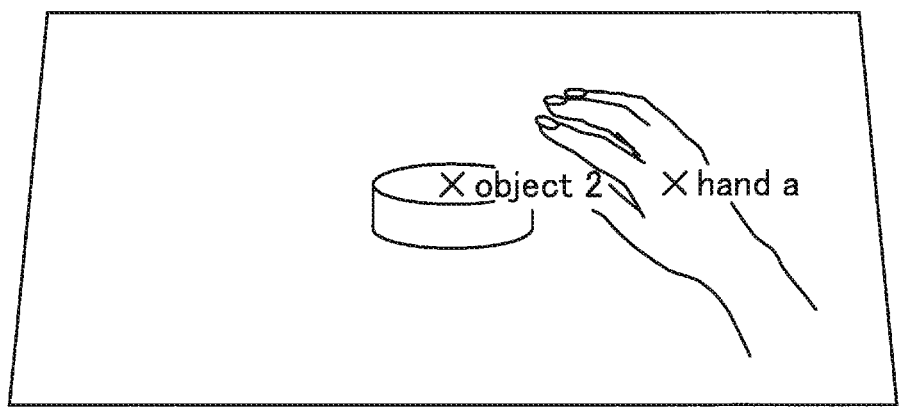
FIG. 20D is an explanatory diagram for explaining operations in a case in which an object is caused to move in the sensing-possible region.

FIG. 20D is a diagram illustrating a state in which the hand with the finger ID "a" places the object with the recognition ID alignment "A" on the table and is then separated from the object. If the object is placed on the table, and the hand is separated from the object, the object information control unit 200 recognizes the object placed on the table and registers information as illustrated in FIG. 20D for the object. The object information control unit 200 registers an object ID "2" for the object and registers "A" as a recognition ID in a recognition ID alignment.

Next, an example in which the object is moved to the outside of the sensing-possible region will be described. This is the example in which since it is not obvious that the fingers hold the same object when the fingers disappear to the outside of the range in a state in which the fingers hold the object and appears again, the object information control unit 200 deletes corresponding items from all of the object management table, the possession state management table, and the attribute management table. Next, operations in a case in which an object with known attributes is placed in a sensing-possible region and the object is moved within the sensing-possible region will be described. FIGS. 21A to 21D are exemplary diagrams for explaining operations in a case in which an object is placed in a sensing-possible region and the object is moved within the sensing-possible region. FIGS. 21A to 21D also illustrate states of the respective tables in a case in which a table corresponds to the sensing-possible region and the object with known attributes is moved on the table.

Figure 21A:
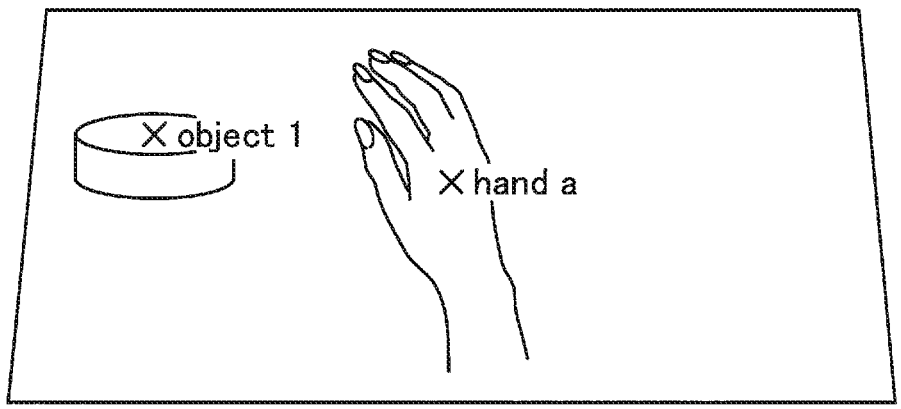
FIG. 21A is an explanatory diagram for explaining operations in a case in which an object is caused to move in the sensing-possible region.

FIG. 21A is a diagram illustrating a state in which the object with the object ID "1" is placed on the table. In this state, it is assumed that information as illustrated in FIG. 21A has been registered in the object management table, the possession state management table, and the attribute management table.

Figure 21B:
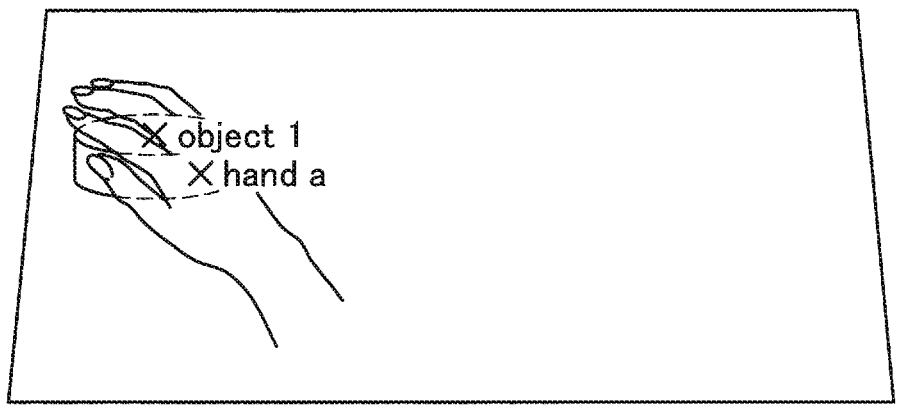
FIG. 21B is an explanatory diagram for explaining operations in a case in which an object is caused to move in the sensing-possible region.

FIG. 21B is a diagram illustrating a state in which the object with the object ID "1" is held in a hand (hand a). If covering of the object with the object ID "I" with the hand (hand a) is detected, the object information control unit 200 moves information of a recognition ID alignment corresponding to the object to the possession state management table. At this time, the object information control unit 200 registers the finger ID of the detected hand as "a". Also, the object information control unit 200 causes a processing flag in the object management table to change to false at this timing.

Figure 21C:
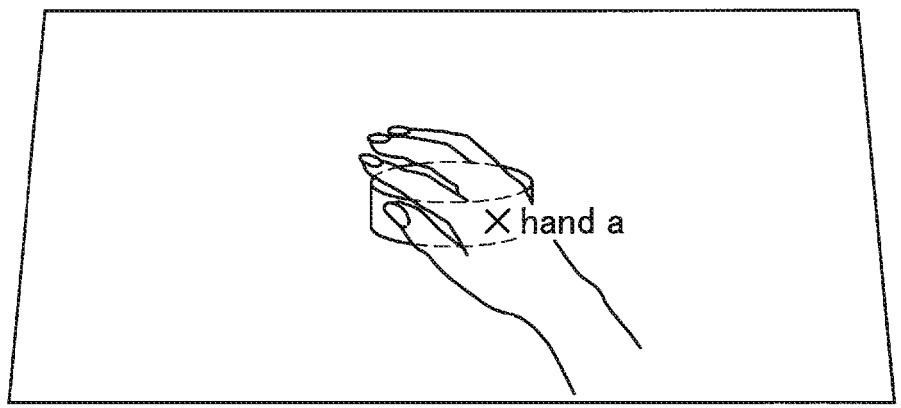
FIG. 21C is an explanatory diagram for explaining operations in a case in which an object is caused to move in the sensing-possible region.

FIG. 21C is a diagram illustrating a state in which the hand of the finger ID "a" holding the object with the recognition ID alignment "A" is moving over the table. At this timing, no information has been registered in the object management table, and possession of the object with the recognition ID alignment "A" in the hand with a finger ID "a" has been registered in the possession state management table.

Figure 21D:
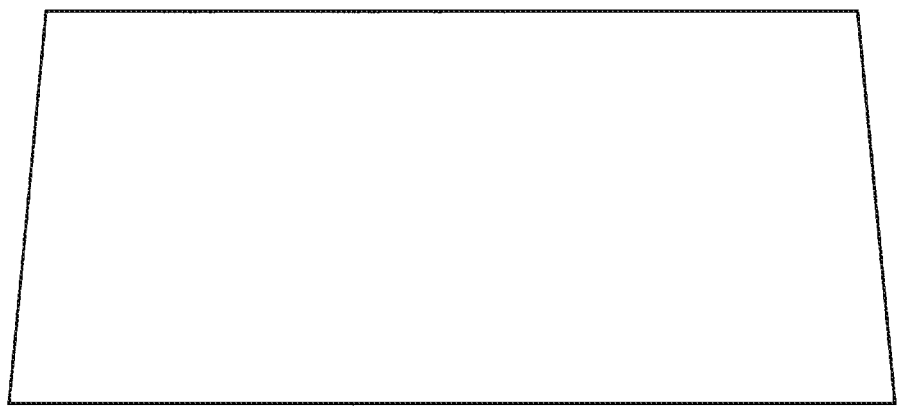
FIG. 21D is an explanatory diagram for explaining operations in a case in which an object is caused to move in the sensing-possible region.

FIG. 21D is a diagram illustrating a state in which the hand with the finger ID "a" has moved to the outside of the sensing-possible range. If the hand with the finger ID "a" moves to the outside of the sensing-possible region, and the input unit 110 cannot recognize the hand, the object information control unit 200 clears information in the possession state management table. Since no other bodies with the recognition ID "A" described in the recognition ID alignment are present in the sensing-possible region, the object information control unit 200 also clears information in the attribute management table.

Next, another example in which an object is moved to the outside of the sensing-possible region will be described. This is an example in which the object information control unit 200 maintains all items, applies a flag or the like to the finger ID in the possession state management table, and stores the information on the assumption that the hand appears again while holding the same object even if the hand disappears to the outside of the range. FIGS. 22A to 22F are explanatory diagrams for explaining operations in a case in which an object is placed in a sensing-possible region and is moved within the sensing-possible region. FIGS. 22A to 22F also illustrate states of the respective tables in a case in which a table corresponds to the sensing-possible region and the object is moved on the table.

Figure 22A:
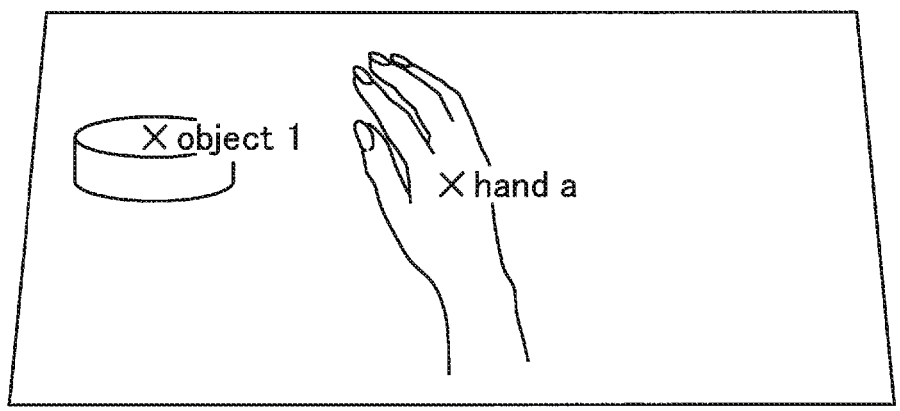
FIG. 22A is an explanatory diagram for explaining operations in a case in which an object is caused to move in the sensing-possible region.

FIG. 22A is a diagram illustrating a state in which the object with the object ID "1" is placed on the table. In this state, it is assumed that information as illustrated in FIG. 22A has been registered in the object management table, the possession state management table, and the attribute management table.

Figure 22B:
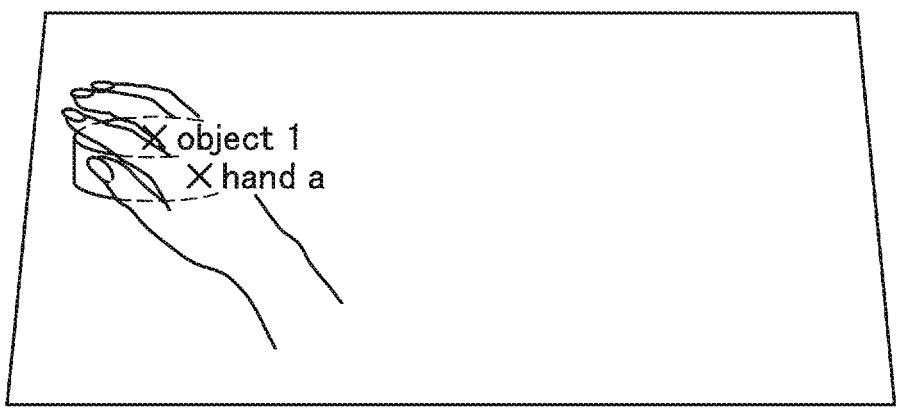
FIG. 22B is an explanatory diagram for explaining operations in a case in which an object is caused to move in the sensing-possible region.

FIG. 22B is a diagram illustrating a state in which the object with the object ID "i" is held in a hand (hand a). If covering of the object with the object ID "1" with the hand (hand a) is detected, the object information control unit 200 moves information of a recognition ID alignment corresponding to the object to the possession state management table. At this time, the object information control unit 200 registers the finger ID of the detected hand as "a". Also, the object information control unit 200 causes a processing flag in the object management table to change to false at this timing.

Figure 22C:
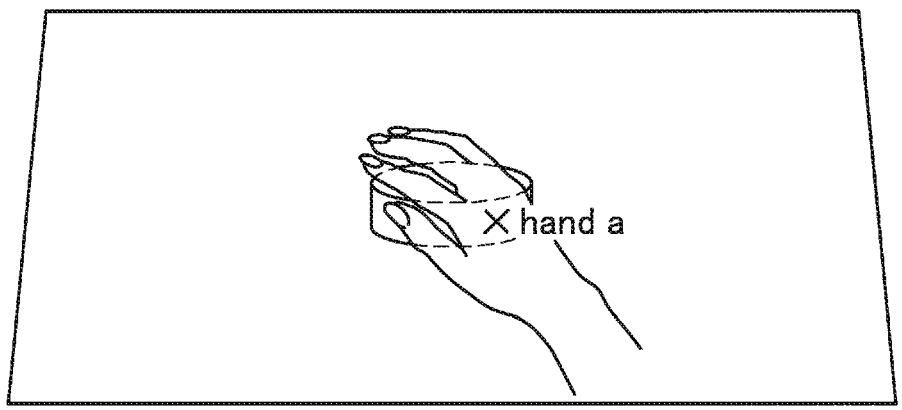
FIG. 22C is an explanatory diagram for explaining operations in a case in which an object is caused to move in the sensing-possible region.

FIG. 22C is a diagram illustrating a state in which the hand of the finger ID "a" holding the object with the recognition ID alignment "A" is moving over the table. At this timing, no information has been registered in the object management table, and possession of the object with the recognition ID alignment "A" in the hand with a finger ID "a" has been registered in the possession state management table.

Figure 22D:
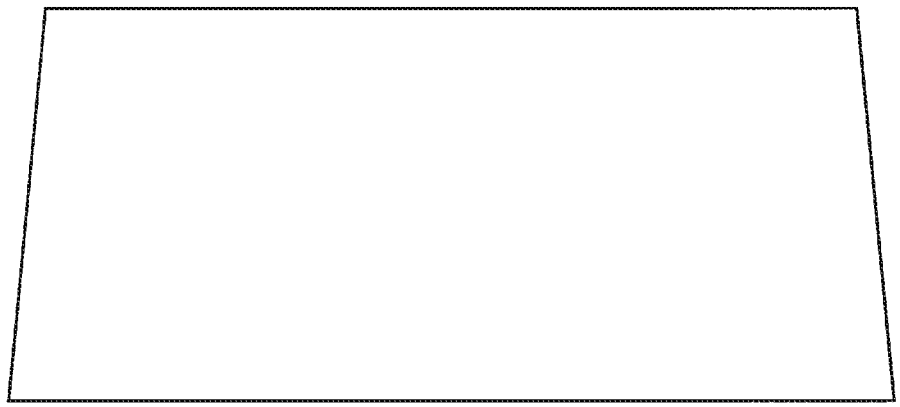
FIG. 22D is an explanatory diagram for explaining operations in a case in which an object is caused to move in the sensing-possible region.

FIG. 22D is a diagram illustrating a state in which the hand with the finger ID "a" has moved to the outside of the sensing-possible range. Even if the hand with the finger ID "a" moves to the outside of the sensing-possible region, and the input unit 110 cannot recognize the hand, the object information control unit 200 maintains information in the possession state management table and the attribute management table. At this time, the object information control unit 200 applies information indicating that the hand with the finger ID "a" has moved to the outside of the sensing-possible region. Here, the object information control unit 200 indicates that the hand has moved to the outside of the sensing-possible region by adding brackets to the finger ID.

Figure 22E:
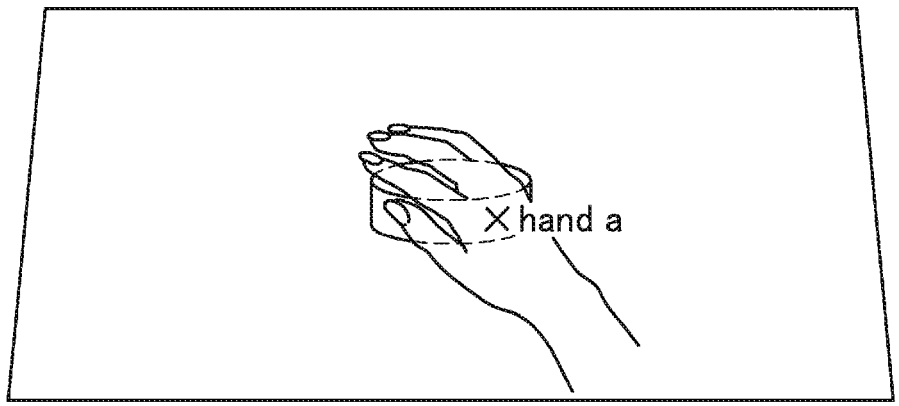
FIG. 22E is an explanatory diagram for explaining operations in a case in which an object is caused to move in the sensing-possible region.

FIG. 22E is a diagram illustrating a state in which the hand with the finger ID "a" has returned to the inside of the sensing-possible range. Here, the hand with the finger ID "a" is regarded as still possessing the object with the recognition ID alignment "A", and the object information control unit 200 removes the brackets applied to the finger ID in the possession state management table.

Figure 22F:
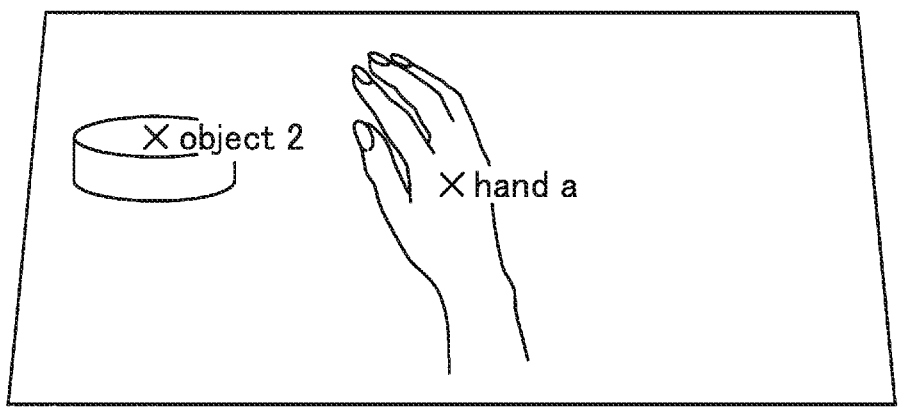
FIG. 22F is an explanatory diagram for explaining operations in a case in which an object is caused to move in the sensing-possible region.

FIG. 22F is a diagram illustrating a state in which the hand with the finger ID "a" places the object with the recognition ID alignment "A" on the table and is then separated from the object. If the object is placed on the table, and the hand is separated from the object, the object information control unit 200 recognizes the object placed on the table and registers information as illustrated in FIG. 22F for the object. The object information control unit 200 registers an object ID "2" for the object and registers "A" as a recognition ID in a recognition ID alignment.

Next, an exemplary case in which one of two bodies placed in an overlapping manner is held and moved with a hand into the sensing-possible region will be described. FIGS. 23A to 23D are exemplary diagrams for explaining operations in a case in which an object is placed in a sensing-possible region and the object is moved within the sensing-possible region. FIGS. 23A to 23D also illustrate states of the respective tables in a case in which a table corresponds to the sensing-possible region and the object is moved on the table.

Figure 23A:
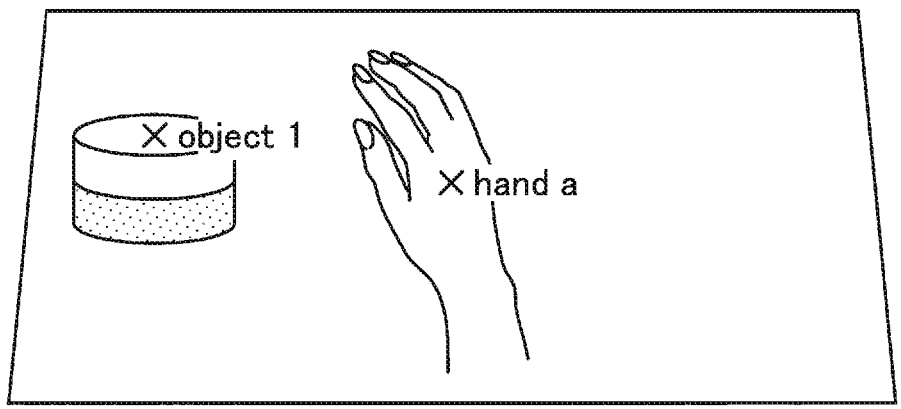
FIG. 23A is an explanatory diagram for explaining operations in a case in which an object is caused to move in the sensing-possible region.

FIG. 23A is a diagram illustrating a state in which an object with an object ID "1" is placed on a table. The object with the object ID "1" is two overlapping bodies with the height of 1 centimeter as a reference feature amount in the height direction. In this state, it is assumed that information as illustrated in FIG. 23A has been registered in the object management table, the possession state management table, and the attribute management table. The object information control unit 200 recognizes that the upper object has a recognition ID "A" but cannot recognize what object the lower object is among the two piled bodies. Therefore, the object information control unit 200 registers "?. A? In the recognition ID alignment in the object management table for the object with the object ID "1".

Figure 23B:
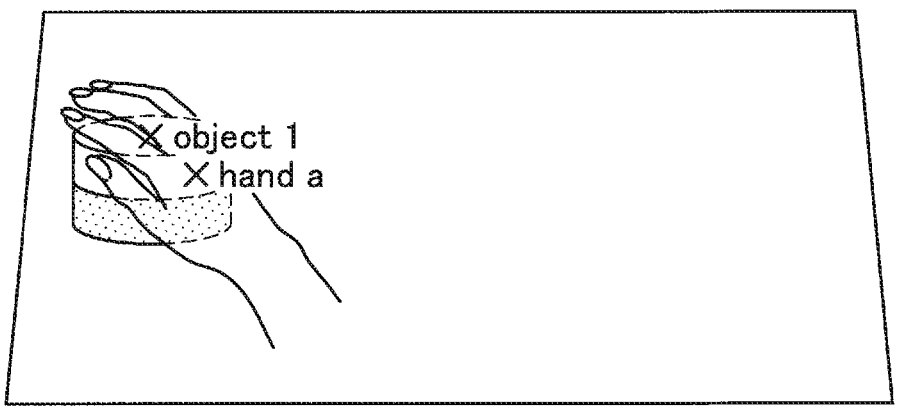
FIG. 23B is an explanatory diagram for explaining operations in a case in which an object is caused to move in the sensing-possible region.

FIG. 23B is a diagram illustrating a state in which the object with the object ID "1" is held in a hand (hand a). If covering of the object with the object ID "1" with the hand (hand a) is detected, the object information control unit 200 moves information of a recognition ID alignment corresponding to the object to the possession state management table. At this time, the object information control unit 200 registers the finger ID of the detected hand as "a".

Figure 23C:
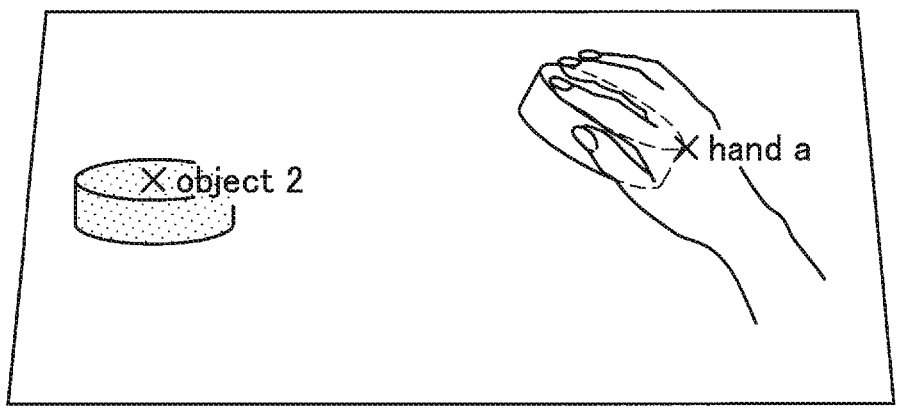
FIG. 23C is an explanatory diagram for explaining operations in a case in which an object is caused to move in the sensing-possible region.

FIG. 23C is a diagram illustrating a state in which the hand with the finger ID "a" holding the upper object among the bodies with the recognition ID alignment "A" is moving over the table. The object information control unit 200 registers the object ID of the remaining object as "2" in the object management table. At this time, the object information control unit 200 assigns "A" to the recognition ID alignment for the object with the object ID "2" that has not been obvious. This is on the basis of estimation that the bodies piled at the same location have the same attributes. Also, the object information control unit 200 registers possession of the object with the recognition ID alignment "A" by the hand with the finger ID "a" in the possession state management table.

Figure 23D:
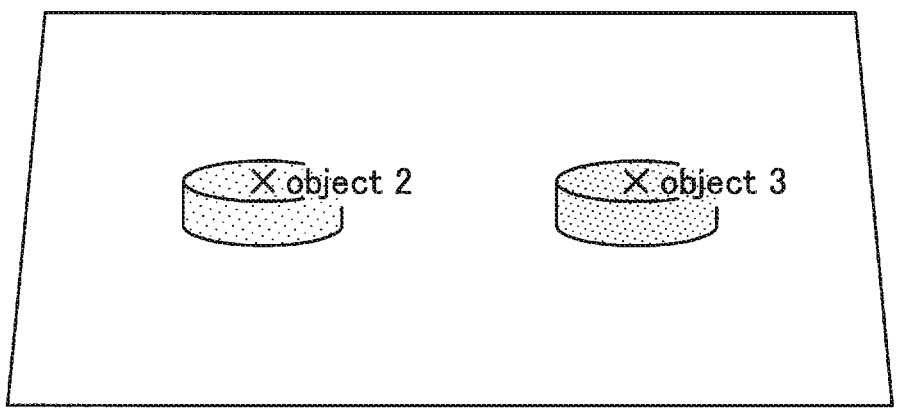
FIG. 23D is an explanatory diagram for explaining operations in a case in which an object is caused to move in the sensing-possible region.

FIG. 23D is a diagram illustrating a state in which the hand with the finger ID "a" has placed the object on the table. The object information control unit 200 registers the object ID of the object that has been separated from the hand as "3" in the object management table. At this time, since the hand with the finger ID "a" immediately previously possessed the object with the recognition ID alignment "A", the object information control unit 200 assigns "A" to the recognition ID alignment for the object with the object ID "3".

Next, an exemplary case in which bodies placed in a sensing-possible region are piled and then moved and one of them is further held and moved with a hand will be described. FIGS. 24A to 24F are exemplary diagrams for explaining operations in a case in which an object is placed in a sensing-possible region and the object is moved within the sensing-possible region. FIGS. 24A to 24F also illustrate states of the respective tables in a case in which a table corresponds to the sensing-possible region and the object is moved on the table.

Figure 24A:
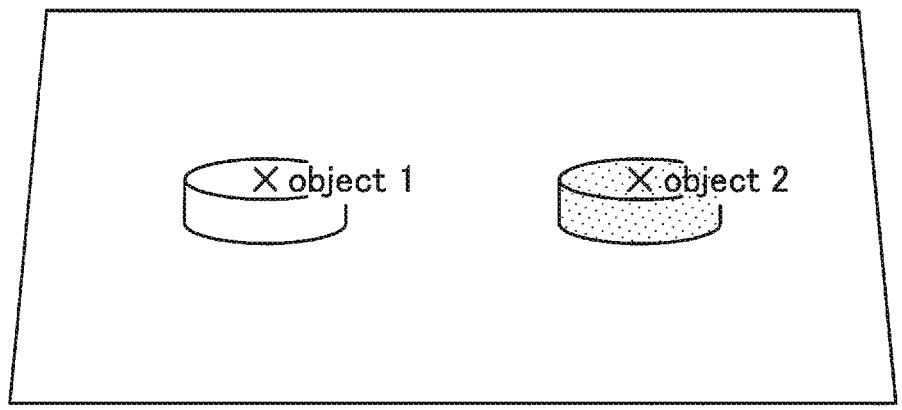
FIG. 24A is an explanatory diagram for explaining operations in a case in which an object is caused to move in the sensing-possible region.

FIG. 24A is a diagram illustrating a state in which bodies with object IDs "1" and "2" are placed on a table. The bodies with the object IDs "1" and "2" are bodies that respectively have the height of 1 centimeter. In this state, it is assumed that information as illustrated in FIG. 24A has been registered in the object management table, the possession state management table, and the attribute management table. The recognition ID alignment of the object with the object ID "1" is "A", and the recognition ID alignment of the object with the object ID "2" is "B".

Figure 24B:
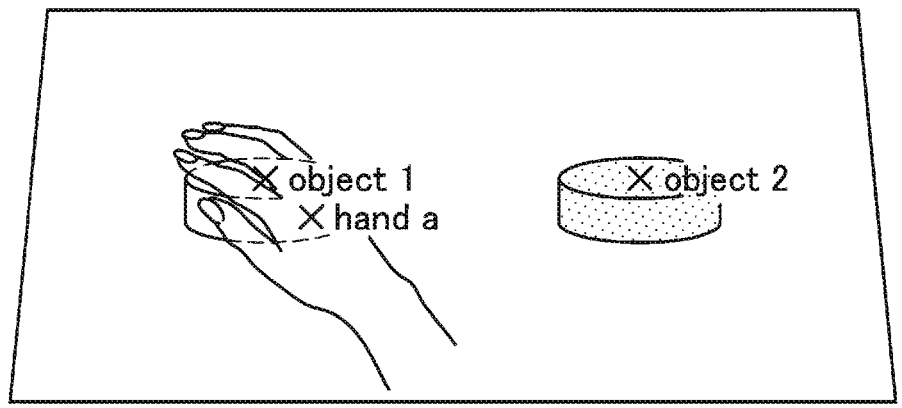
FIG. 24B is an explanatory diagram for explaining operations in a case in which an object is caused to move in the sensing-possible region.

FIG. 24B is a diagram illustrating a state in which the object with the object ID "1" is held in a hand (hand a). If covering of the object with the object ID "1" with the hand (hand a) is detected, the object information control unit 200 moves information of a recognition ID alignment corresponding to the object to the possession state management table. At this time, the object information control unit 200 registers the finger ID of the detected hand as "a".

Figure 24C:
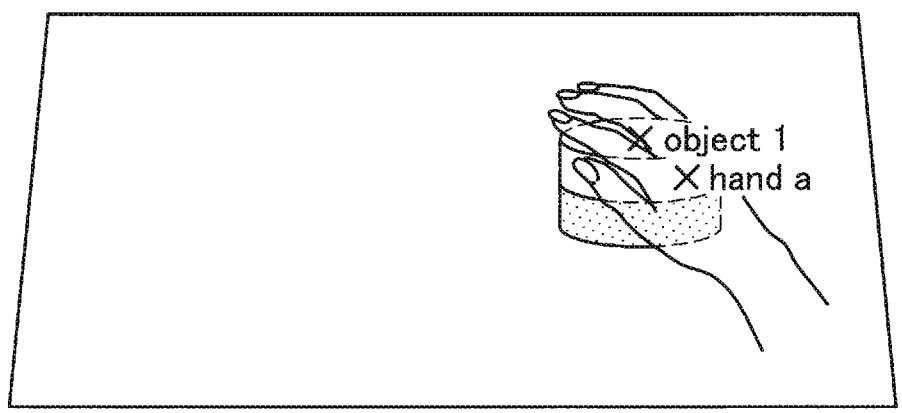
FIG. 24C is an explanatory diagram for explaining operations in a case in which an object is caused to move in the sensing-possible region.

FIG. 24C is a diagram illustrating a state in which an object with an object ID "1" is piled on the object "2" with a hand. If covering of the object with the object ID "2" with the hand (hand a) after the covering of the object with the object ID "1" is detected, the object information control unit 200 also moves information of a recognition ID alignment corresponding to the object with the object ID "2" to the possession state management table.

Figure 24D:
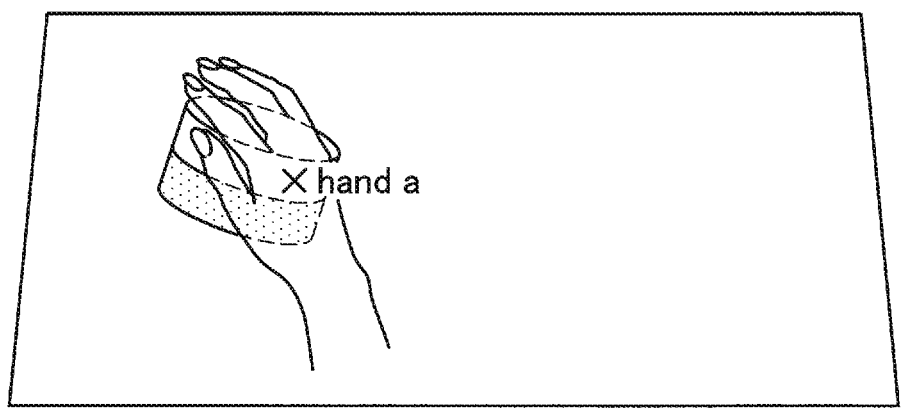
FIG. 24D is an explanatory diagram for explaining operations in a case in which an object is caused to move in the sensing-possible region.

FIG. 24D is a diagram illustrating a state in which overlapping bodies are lifted with a hand. The object information control unit 200 registers recognition ID alignment "A, B" in the row of the finger ID "a" in the possession state management table. The object information control unit 200 perceives that the hand with the finger ID "a" is holding the bodies with the recognition ID alignment "A, B".

Figure 24E:
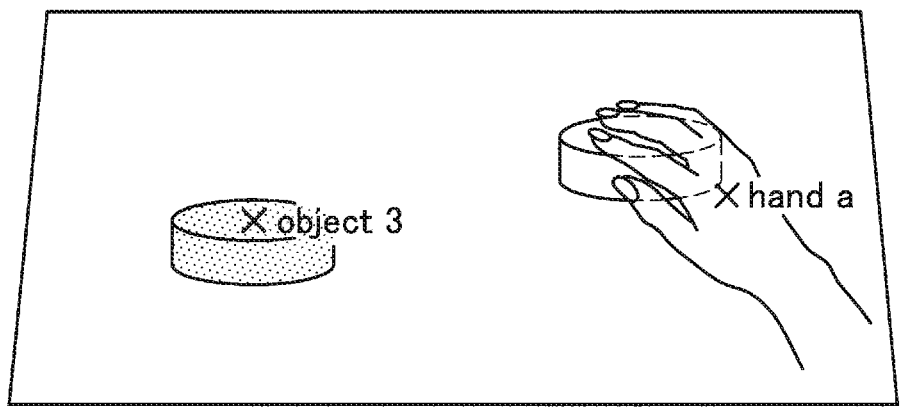
FIG. 24E is an explanatory diagram for explaining operations in a case in which an object is caused to move in the sensing-possible region.

FIG. 24E is a diagram illustrating a state in which a lower object among piled bodies is placed on a table. The object information control unit 200 registers the object ID of the object that has been separated from the hand as "3" in the object management table. At this time, since the hand with the finger ID "a" immediately previously possessed the object with the recognition ID alignment "A", the object information control unit 200 assigns "B" that is a recognition ID assigned to the lower object to the recognition ID alignment for the object with the object ID "3".

Figure 24F:
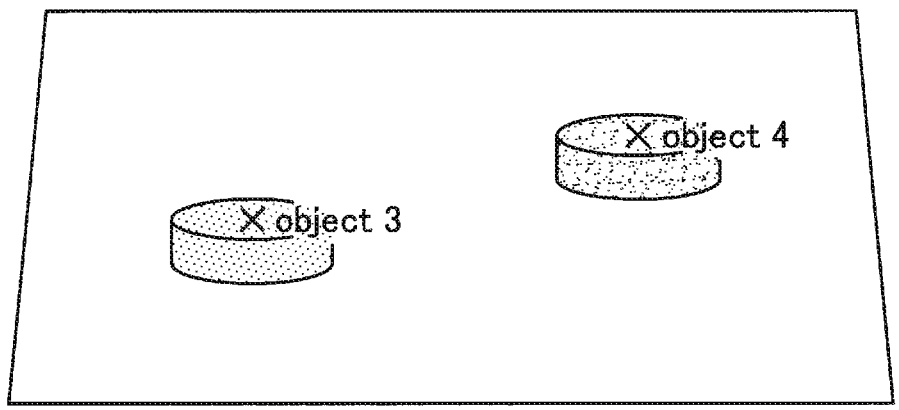
FIG. 24F is an explanatory diagram for explaining operations in a case in which an object is caused to move in the sensing-possible region.

FIG. 24F is a diagram illustrating a state in which the hand with the finger ID "a" has placed the object on the table. The object information control unit 200 registers the object ID of the object that has been separated from the hand as "4" in the object management table. At this time, since the hand with the finger ID "a" immediately previously possessed the object with the recognition ID alignment "A", the object information control unit 200 assigns "A" to the recognition ID alignment for the object with the object ID "4".

Next, an exemplary case in which another object is piled in one level on an object placed in a sensing-possible region will be described. FIGS. 25A to 25D are explanatory diagrams for explaining operations in a case in which another object is piled on an object placed in a sensing-possible region. FIGS. 25A to 25D also illustrate states of the respective tables in a case in which a table corresponds to the sensing-possible region and an object is moved on the table.

Figure 25A:
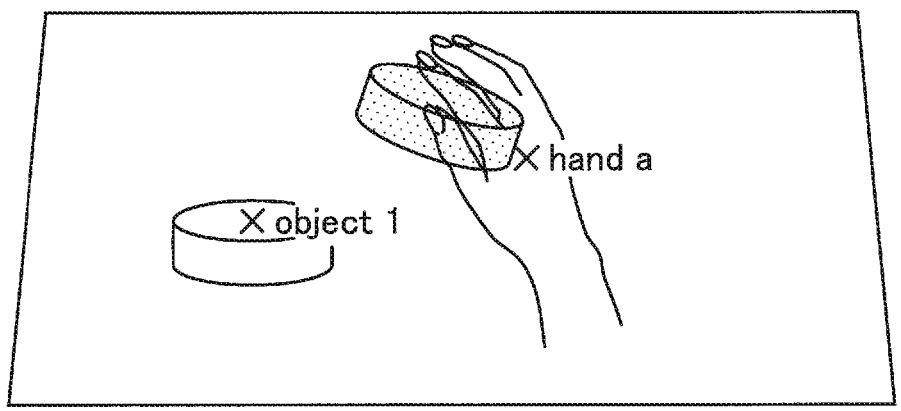
FIG. 25A is an explanatory diagram for explaining operations in a case in which an object is caused to move in the sensing-possible region.

FIG. 25A is a diagram illustrating a state in which object with object ID "1" is placed on a table. The object with the object ID "1" is an object that has the height of 1 centimeter. In this state, it is assumed that information as illustrated in FIG. 25A has been registered in the object management table, the possession state management table, and the attribute management table. The recognition ID alignment of the object with the object ID "1." is "A".

Figure 25B:
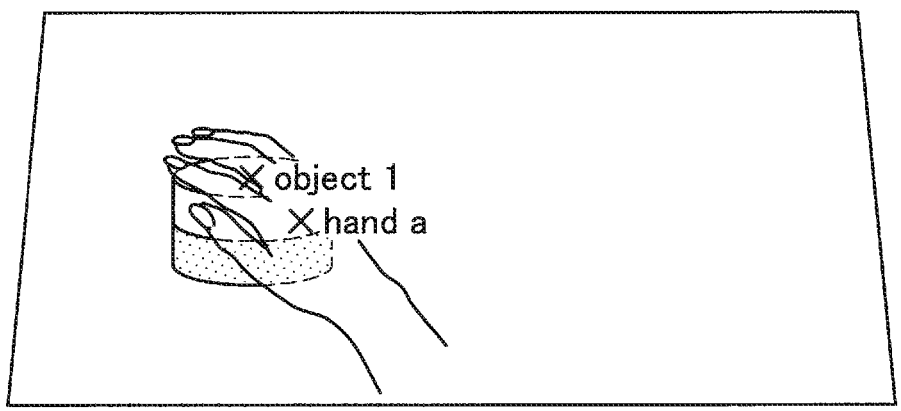
FIG. 25B is an explanatory diagram for explaining operations in a case in which an object is caused to move in the sensing-possible region.
Figure 25C:
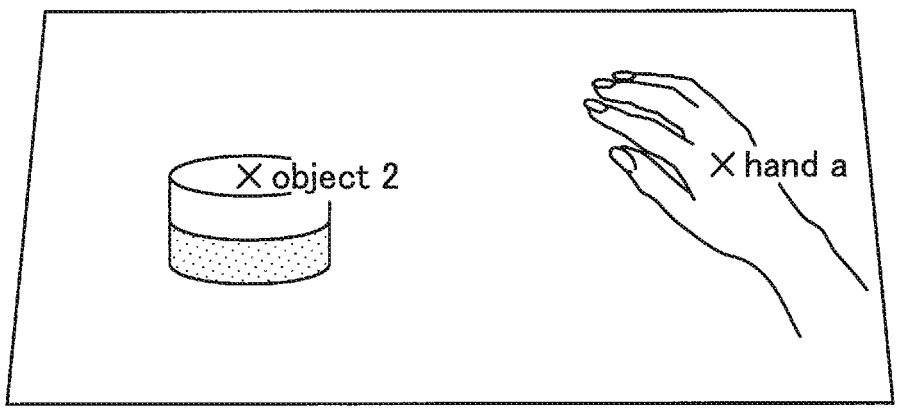
FIG. 25C is an explanatory diagram for explaining operations in a case in which an object is caused to move in the sensing-possible region.

FIG. 25B is a diagram illustrating an exemplary state in which another object is piled on an object with an object ID "1". In addition, FIG. 25C is a diagram illustrating a state in which a hand has been separated from an object. Since no information has been registered in the possession state management table, who held the object that has appeared (that has become able to be recognized) in FIG. 25C is not obvious. Therefore, it is also not obvious what kind of object the object is. Thus, the object information control unit 200 causes the object ID "1" to change "2" and registers a recognition ID alignment "?, A" in the object management table.

Figure 25D:
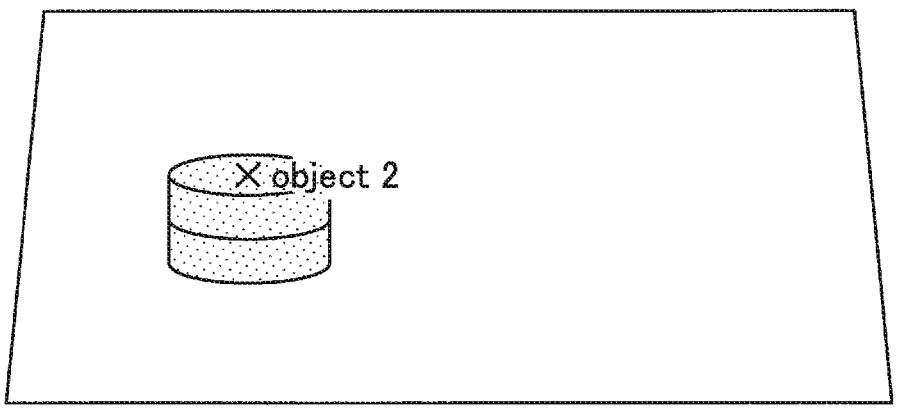
FIG. 25D is an explanatory diagram for explaining operations in a case in which an object is caused to move in the sensing-possible region.

FIG. 25D is a diagram illustrating an example in which a recognition ID of a piled object is estimated. The object information control unit 200 estimates that the piled object has a recognition ID that is the same as that of the object placed below and registers a recognition ID alignment of an object with an object ID "2" as "?, A" in the object management table.

Next, an exemplary case in which another object is piled in two levels on an object placed in a sensing-possible region will be described. FIGS. 26A to 26D are explanatory diagrams for explaining operations in a case in which two other bodies are piled on an object placed in a sensing-possible region. FIGS. 26A to 26D also illustrate states of the respective tables in a case in which a table corresponds to the sensing-possible region and an object is moved on the table.

FIG. 25A is a diagram illustrating a state in which object with object ID "1" is placed on a table. The object with the object ID "1" is an object that has the height of 1 centimeter. In this state, it is assumed that information as illustrated in FIG. 25A has been registered in the object management table, the possession state management table, and the attribute management table. The recognition ID alignment of the object with the object ID "1" is "A". Also, a recognition ID alignment "B" has been registered for a hand with a finger ID "a". That is, the object information control unit 200 perceives that only one object with a recognition ID "B" is being held by the hand with the finger ID "a" at this timing.

Figure 26A:
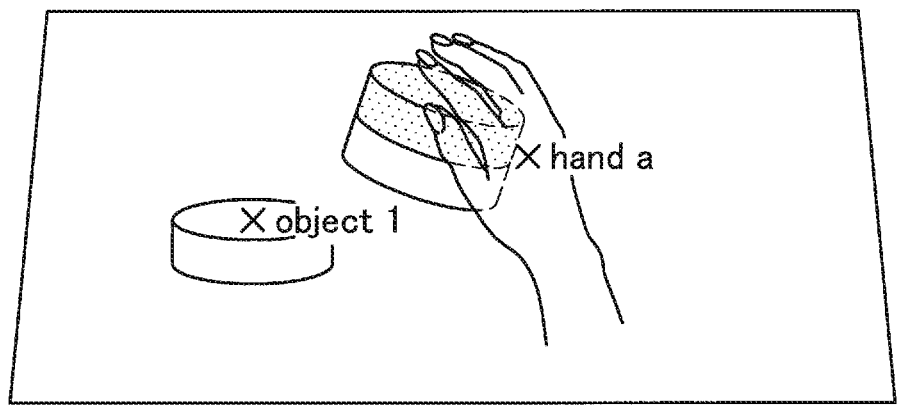
FIG. 26A is an explanatory diagram for explaining operations in a case in which an object is caused to move in the sensing-possible region.
Figure 26B:
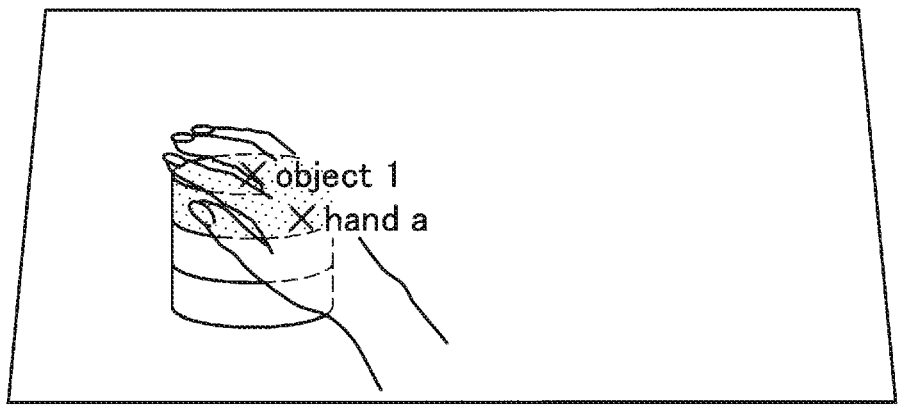
FIG. 26B is an explanatory diagram for explaining operations in a case in which an object is caused to move in the sensing-possible region.
Figure 26C:
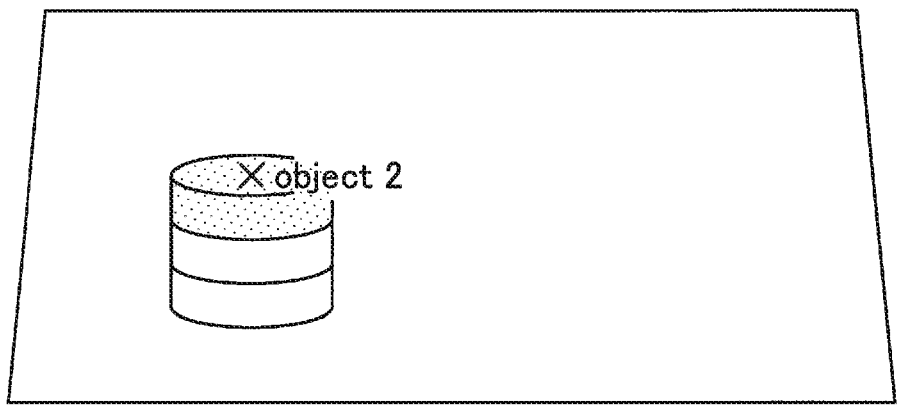
FIG. 26C is an explanatory diagram for explaining operations in a case in which an object is caused to move in the sensing-possible region.

FIG. 26B is a diagram illustrating an exemplary state in which another object is piled on an object with an object ID "1". Also, FIG. 26C is a diagram illustrating an exemplary state in which a hand has been separated from an object. Since the height has increased as a result of recognition performed by the input unit 110, the object information control unit 200 causes the object ID "1" to change to "2". Then, the object information control unit 200 moves information of the recognition ID alignment registered in the possession state management table to the object management table, and an increase in the height from 1 cm to 3 cm at that time indicates that two other bodies have been piled on the object with the object ID "1". However, the object information control unit 200 perceives that only one object with the recognition ID "B" is being held with the hand with the finger ID "a". That is, although the recognition ID of the lowermost object is "A", and the recognition ID of the uppermost object is "B", it is not known what the recognition ID of the intermediate object is. Therefore, the object information control unit 200 registers a recognition ID alignment of the object ID "2" as "A, ?, B".

Figure 26D:
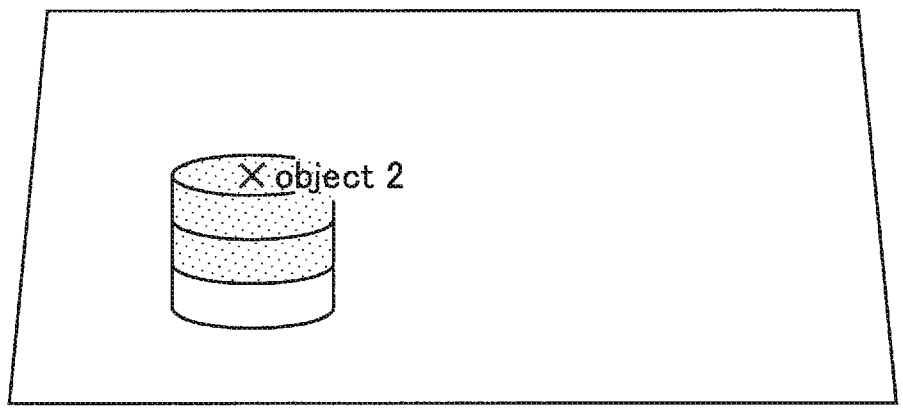
FIG. 26D is an explanatory diagram for explaining operations in a case in which an object is caused to move in the sensing-possible region.

FIG. 26D is a diagram illustrating an example in which a recognition ID of a piled object is estimated. The object information control unit 200 estimates that the object with an unknown recognition ID has a recognition ID that is the same as that of the object held together and registers the recognition ID alignment of the object with the object ID "2" as "A, B, B" in the object management table.

Application Example 1

Next, an operation example of an application that is operated by the information processing system 100 to which the embodiment is applied will be described. First, an operation example of a chemical simulation application using an object will be described. This application enables simulation of a chemical reaction on a table using coin-shaped cylinders (hereinafter referred to as tokens) that have the same characteristics.

Figure 27A:
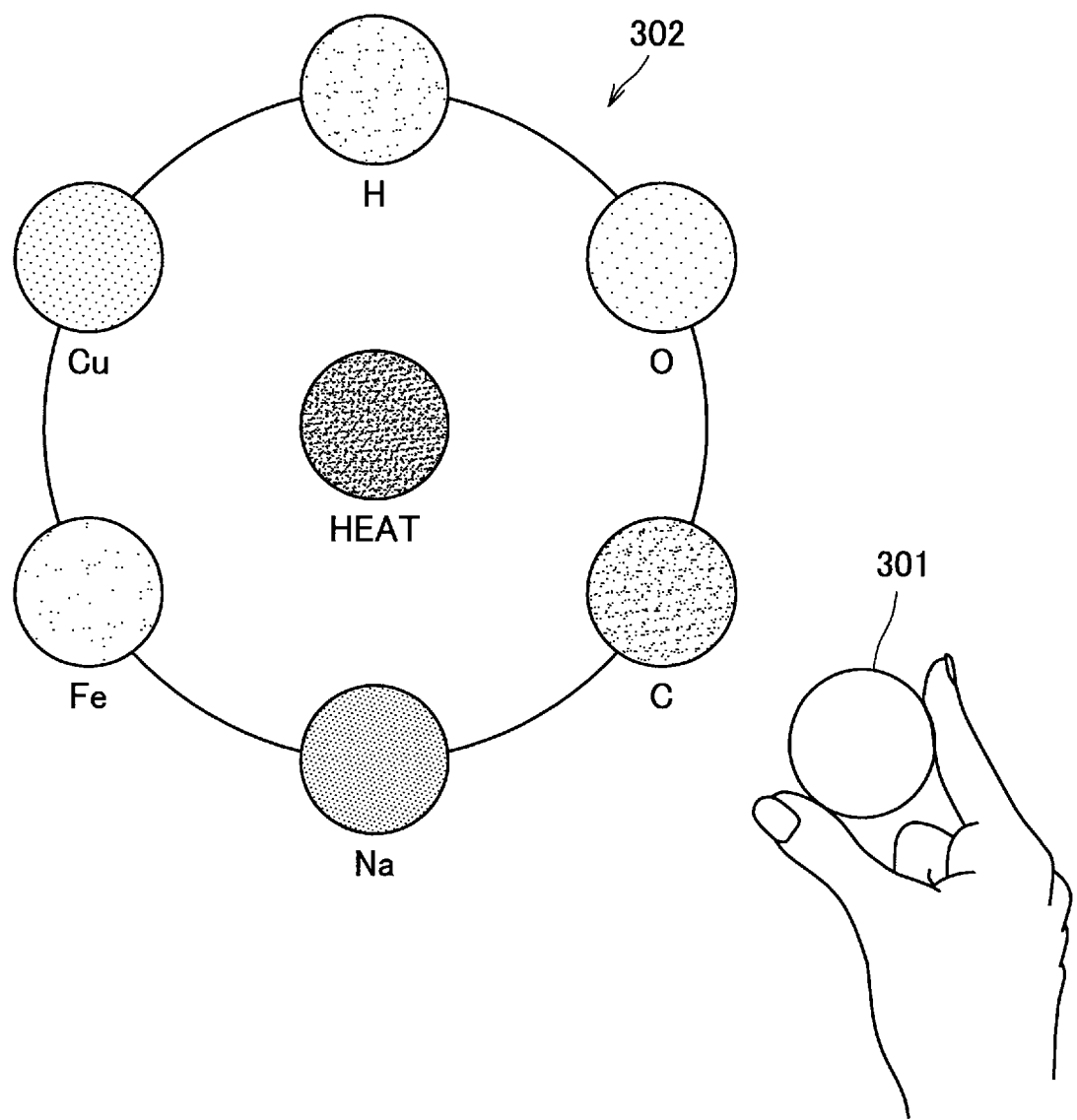
FIG. 27A is an explanatory diagram illustrating an operation example of a chemical simulation application.
Figure 27B:
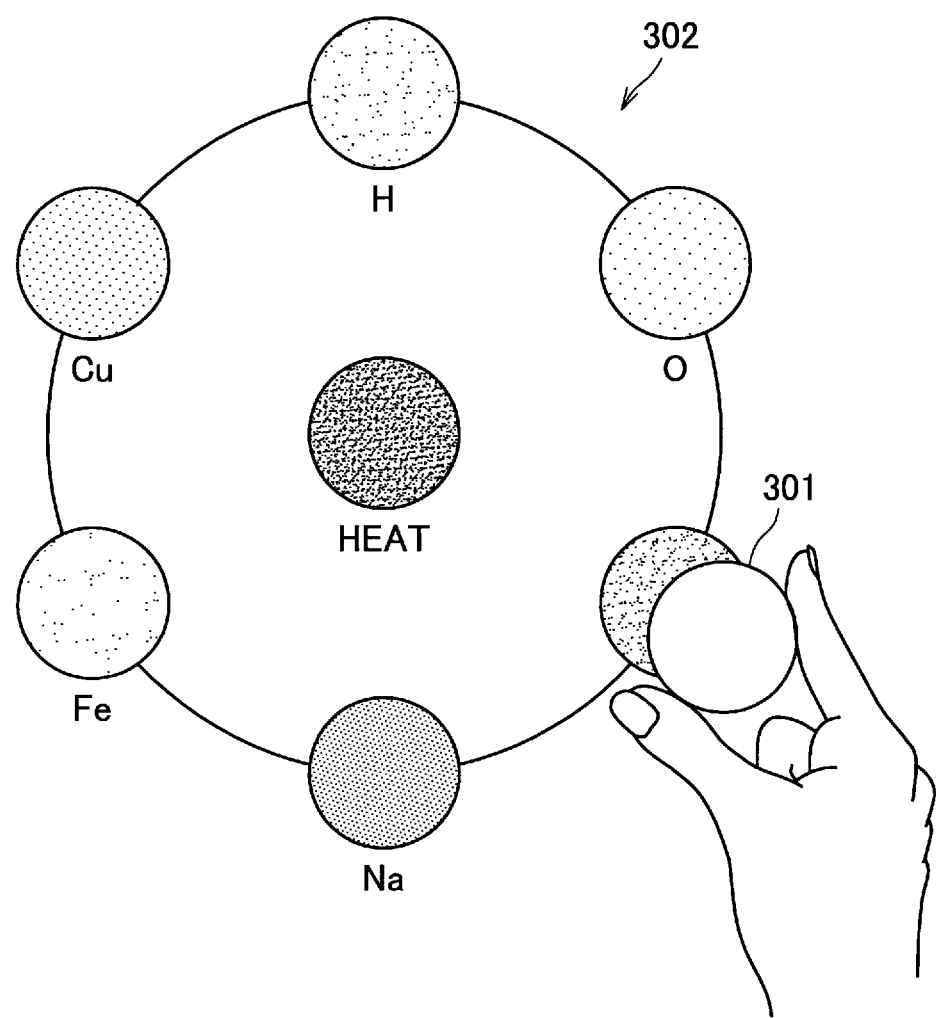
FIG. 27B is an explanatory diagram illustrating an operation example of a chemical simulation application.
Figure 27C:
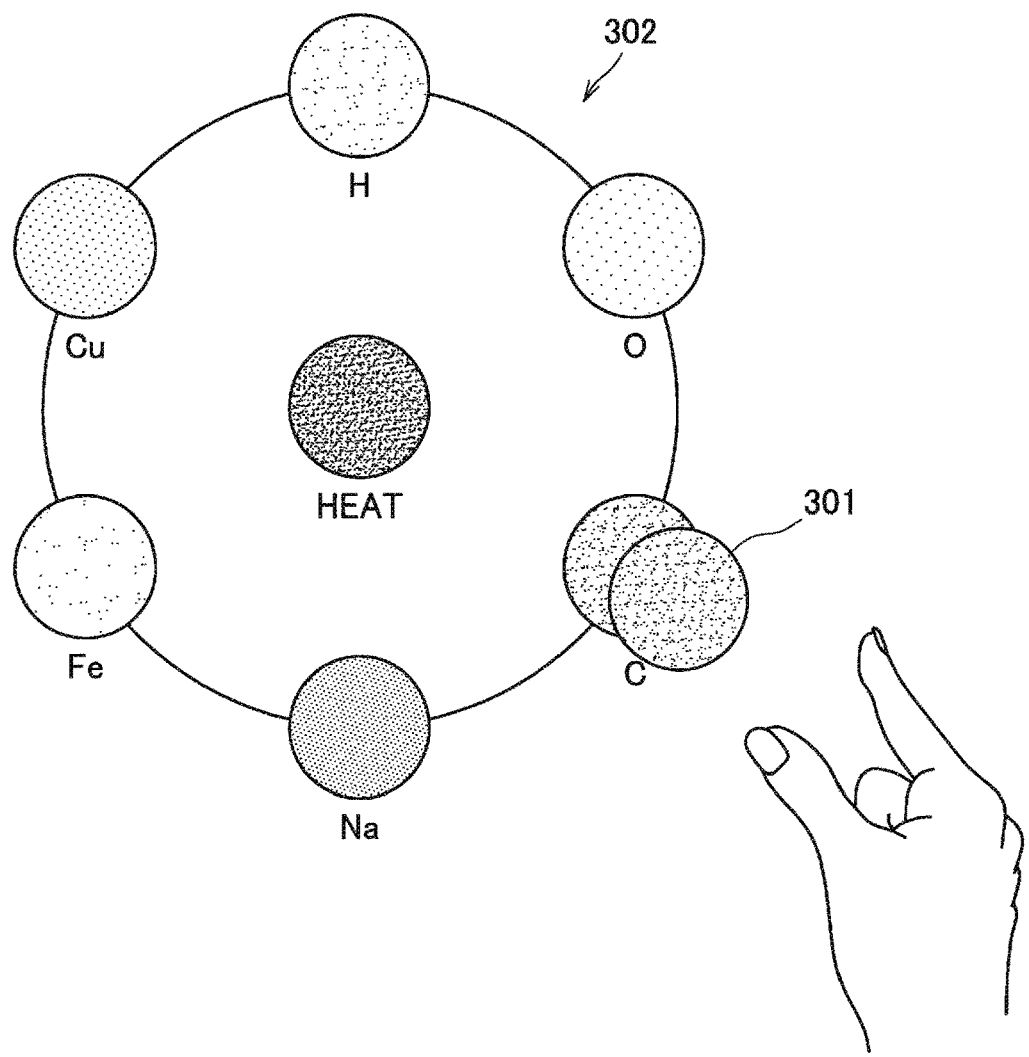
FIG. 27C is an explanatory diagram illustrating an operation example of a chemical simulation application.

FIGS. 27A to 27C are explanatory diagrams illustrating an operation example of a chemical simulation application. FIG. 27A is a diagram illustrating a state in which a user holds a token 301 and causes the token 301 to approach to an image 302 in which images of atoms are drawn. Also, FIG. 27B is a diagram illustrating a state in which the user has placed the token 301 on a carbon atom (C) in the image 302. The object information control unit 200 applies attributes of carbon to the token 301 in response to placement of the token 301 on the carbon atom. The information processing system 100 may irradiate the surface of the token 301 with a color corresponding to carbon if the attributes of carbon are applied to the token 301.

Information accumulated in the information accumulation processing unit 230 when the chemical simulation application operates is illustrated. Tables 4 and 5 below illustrate information accumulated in the information accumulation processing unit 230 when the chemical simulation application operates. Table 4 is an object management table, and Table 5 is an attribute management table. The respective tables are realized, for example, in the form of relational databases or the like.

TABLE 4

Object management table

| Object ID | Recognition ID alignment | Feature amount | Processing flag |
|---|---|---|---|
| 1 | A | 1 cm | true |
| 2 | B, B | 2 cm | true |

TABLE 5

Attribute management table

| Recognition ID | Attribute |
|---|---|
| A | C (carbon) |
| B | O (oxygen) |

Figure 28A:
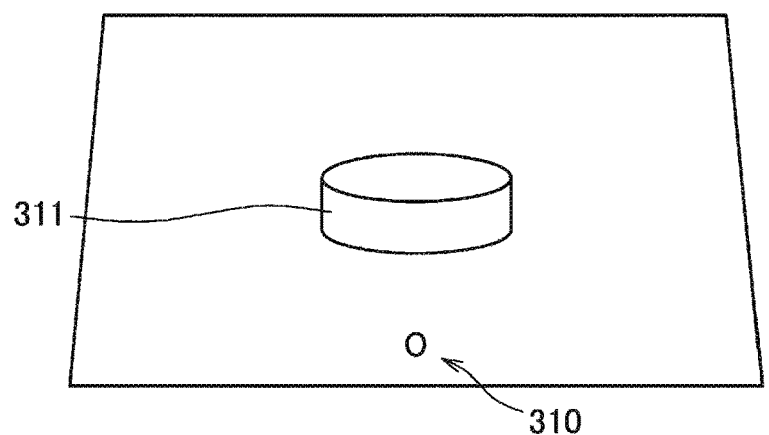
FIG. 28A is an explanatory diagram illustrating an operation example of a chemical simulation application.
Figure 28B:
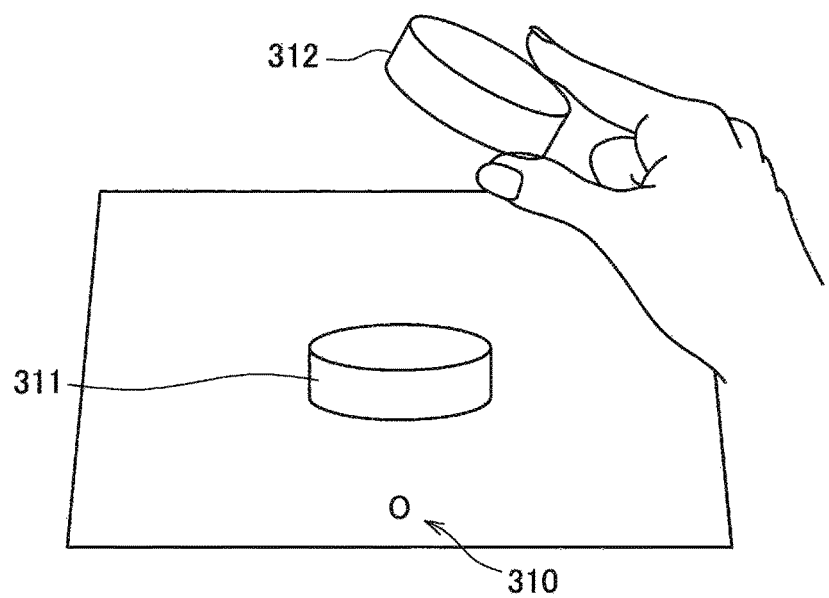
FIG. 28B is an explanatory diagram illustrating an operation example of a chemical simulation application.
Figure 28C:
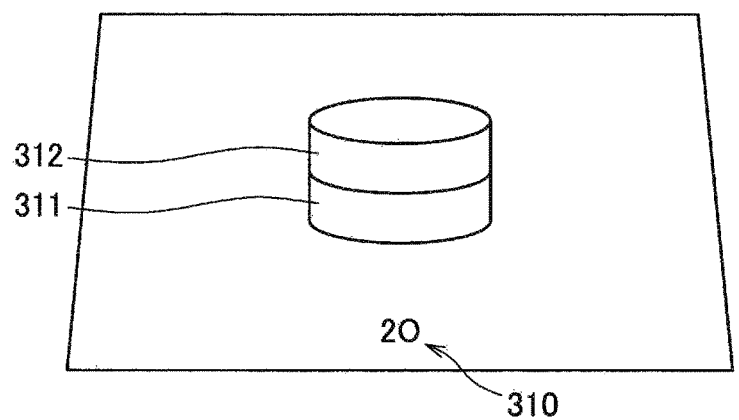
FIG. 28C is an explanatory diagram illustrating an operation example of a chemical simulation application.

FIGS. 28A to 28C are explanatory diagrams illustrating an operation example of the chemical simulation application. FIG. 28A is a diagram illustrating a state in which a token 311 with attributes of oxygen (O) is placed. In this state, information 310 indicating an atom of oxygen is displayed. FIG. 28B is a diagram illustrating a state in which a token 312 with unknown attributes is to be placed on the token 311 with the attributes of oxygen. In addition, FIG. 28C is a diagram illustrating that the attributes of oxygen have also been applied to the token 312 with unknown attributes. Since the amount of atoms increases, the information displayed as the information 310 is changed from "O" to "2O."

Figure 29A:
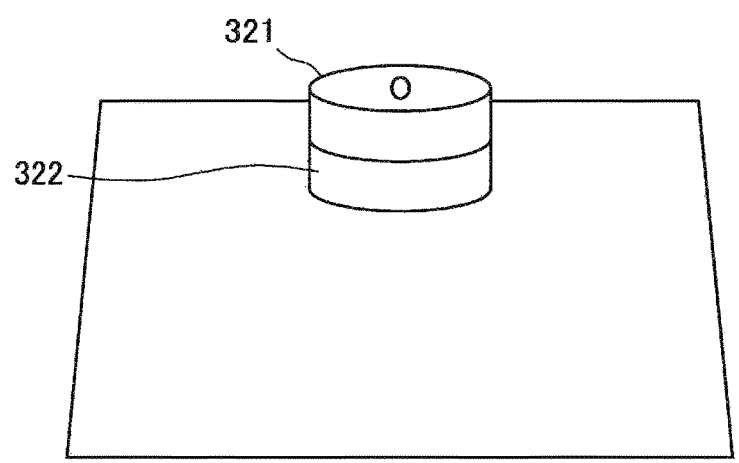
FIG. 29A is an explanatory diagram illustrating an operation example of a chemical simulation application.
Figure 29B:
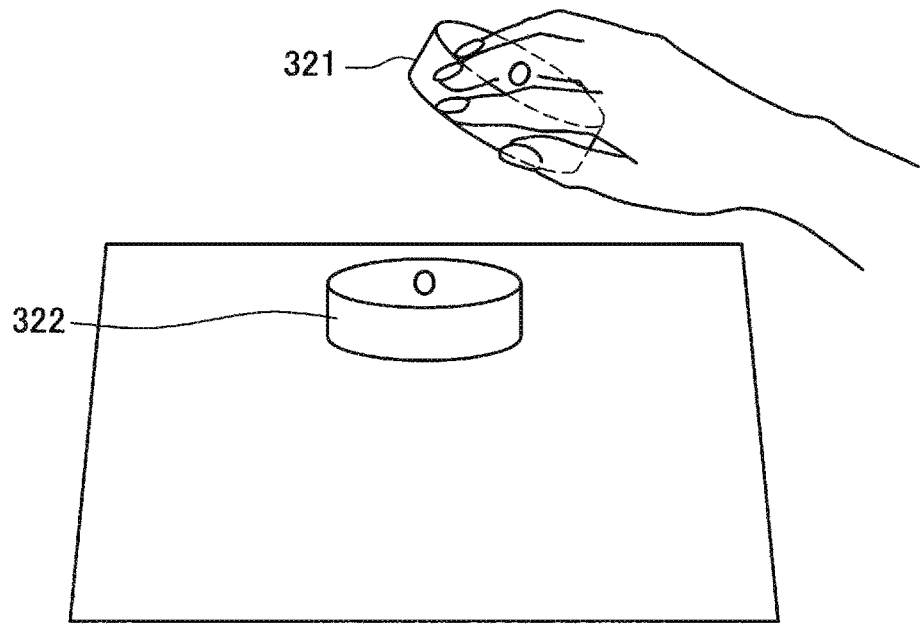
FIG. 29B is an explanatory diagram illustrating an operation example of a chemical simulation application.
Figure 29C:
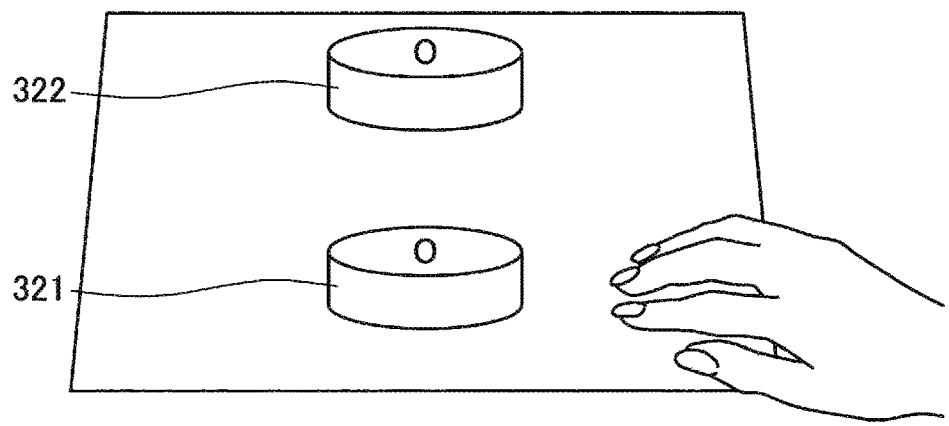
FIG. 29C is an explanatory diagram illustrating an operation example of a chemical simulation application.

FIGS. 29A to 29C are explanatory diagrams illustrating an operation example of the chemical simulation application. FIG. 29A is a diagram illustrating a state in which two tokens 321 and 322 are piled up. It is assumed that the upper token 321 has attributes of oxygen and the attributes the lower token 322 are not known in this state. FIG. 29B is a diagram illustrating a state in which the user has picked up the upper token 321, Also, FIG. 29C is a diagram illustrating a state in which the user has placed the token 321 on a table. The object information control unit 200 estimates that the token 322 has attributes that are the same as the attributes of the token 321 piled above it, that is, the attributes of oxygen, and applies the attributes of oxygen to the token 322. The information processing system 100 may irradiate the surface of the token 322 with a color corresponding to oxygen if the attributes of oxygen are applied to the token 322.

Figure 30A:
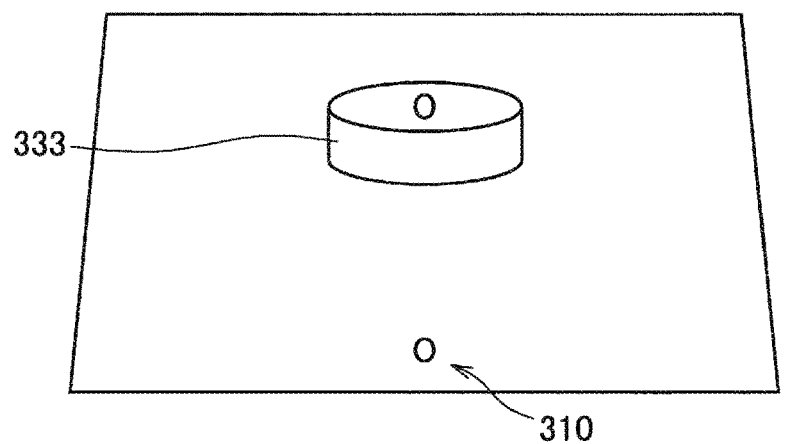
FIG. 30A is an explanatory diagram illustrating an operation example of a chemical simulation application.
Figure 30B:
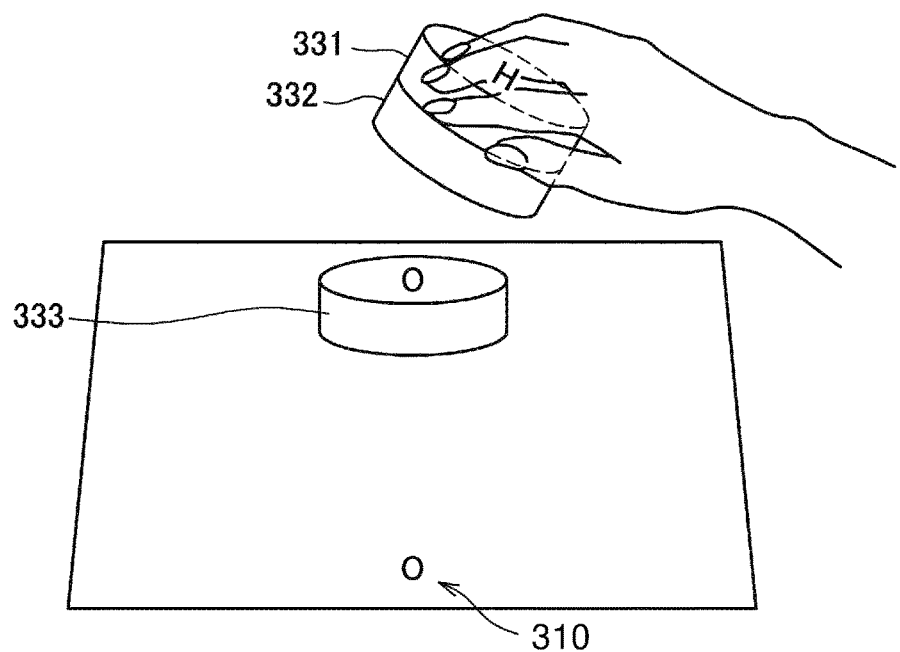
FIG. 30B is an explanatory diagram illustrating an operation example of a chemical simulation application.
Figure 30C:
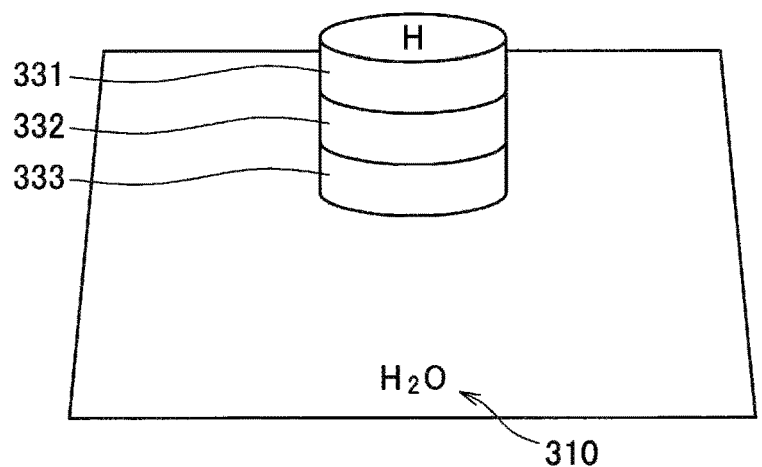
FIG. 30C is an explanatory diagram illustrating an operation example of a chemical simulation application.

FIGS. 30A to 30C are explanatory diagrams illustrating an operation example of the chemical simulation application. FIG. 30A is a diagram illustrating a state in which a token 333 with attributes of oxygen is placed on a table. In this state, information 330 that means that the token 333 is an atom of oxygen is displayed. FIG. 30B is a diagram illustrating a state in which two tokens 331 and 332 are to be piled on the token 333 by a user. It is assumed that the token 331 has attributes of hydrogen (H) and attributes of the token 332 that the user is holding together with it are not known. FIG. 30C is a diagram illustrating a state in which the tokens 331 and 332 have been piled on the token 333. Although the attributes of the token 332 are not known, the object information control unit 200 estimates that the token 332 has attributes that are the same as the attributes of the token 331, that is, the attributes of hydrogen, and applies the attributes of hydrogen to the token 332. By the attributes of hydrogen being applied to the token 332, a molecule of water ($H_2O$) is represented by the tokens 331, 332, and 333. The information 330 indicates that the molecule of water is represented by the tokens 331, 332, and 333.

Figure 31A:
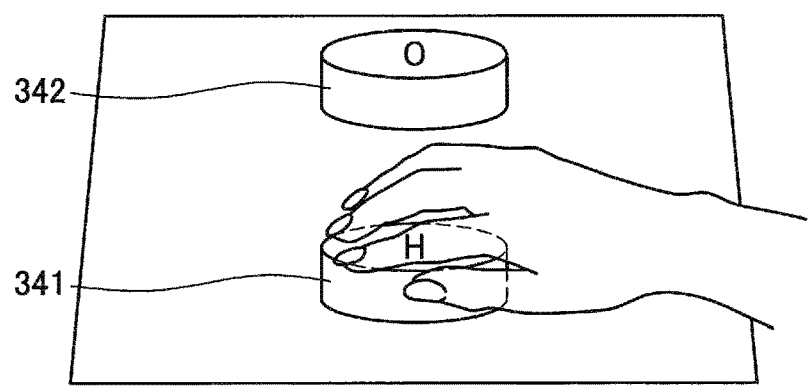
FIG. 31A is an explanatory diagram illustrating an operation example of a chemical simulation application.
Figure 31B:
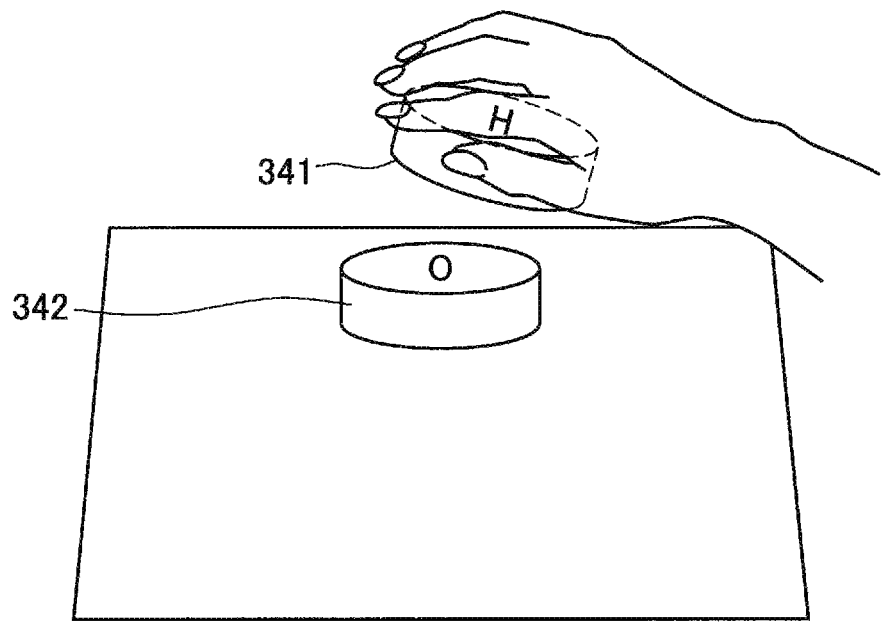
FIG. 31B is an explanatory diagram illustrating an operation example of a chemical simulation application.
Figure 31C:
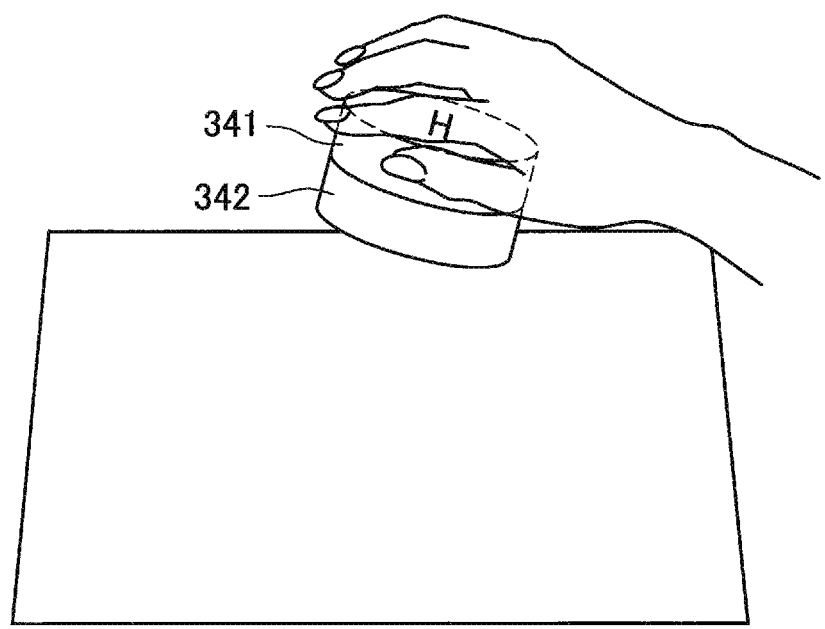
FIG. 31C is an explanatory diagram illustrating an operation example of a chemical simulation application.
Figure 31D:
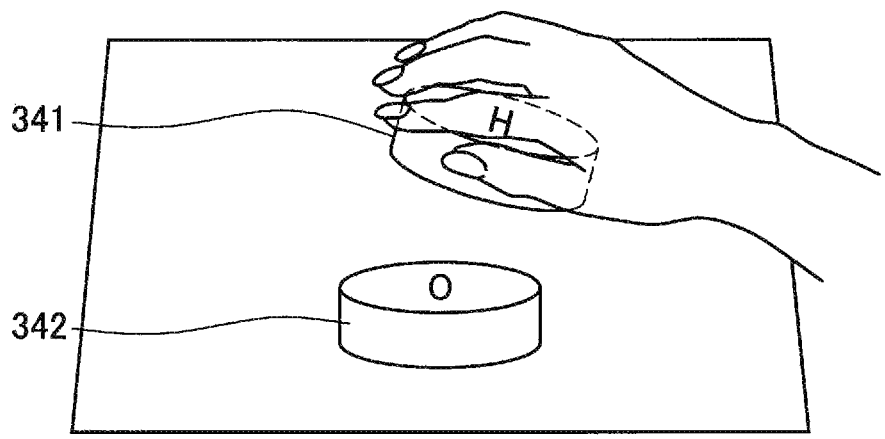
FIG. 31D is an explanatory diagram illustrating an operation example of a chemical simulation application.
Figure 31E:
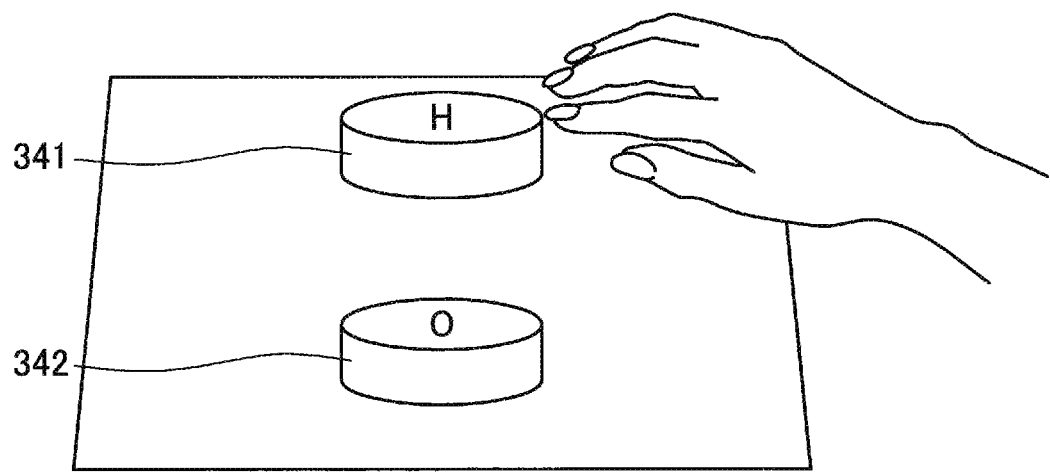
FIG. 31E is an explanatory diagram illustrating an operation example of a chemical simulation application.

FIGS. 31A to 31E are explanatory diagrams illustrating an operation example of the chemical simulation application. FIG. 31A is a diagram illustrating a state in which a token 341 with attributes of hydrogen and a token 342 with attributes of oxygen are placed on a table and a user is holding the token 341. FIG. 31B is a diagram illustrating a state in which the user is about to pick up the token 342 in the state in which the user is holding the token 341. While the user is holding the token 341 and the token 341 cannot be recognized by the input unit 110, the object information control unit 200 can recognize that the user is holding the token 341 with the attributes of hydrogen. In addition, FIG. 31C is a diagram illustrating that the user is holding the tokens 341 and 342. While the tokens 341 and 342 cannot be recognized by the input unit 110, the object information control unit 200 can recognize that the user is holding the token 341 with the attributes of hydrogen and the token 342 with the attributes of oxygen. FIG. 31D is a diagram illustrating a state in which the user has placed only the token 342 on the table. Since the object information control unit 200 can recognize that the user is holding the token 342 with the attributes of oxygen, it is possible to apply the attributes of oxygen to the token 342 again at the timing at which the token 342 is placed. FIG. 31E is a diagram illustrating a state in which the user has placed the token 341 on the table. Since the object information control unit 200 can recognize that the user is holding the token 341 with the attributes of hydrogen, it is possible to apply the attributes of hydrogen to the token 341 again at the timing at which the token 341 is placed.

Figure 32A:
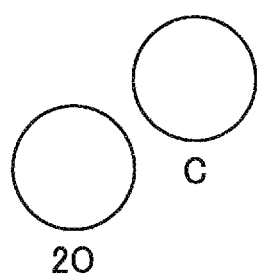
FIG. 32A is an explanatory diagram illustrating an operation example of a chemical simulation application.
Figure 32B:
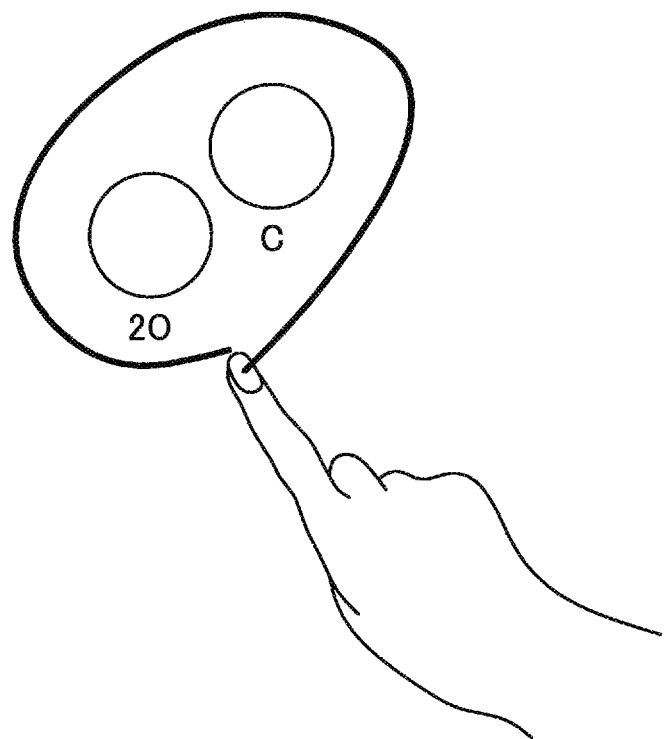
FIG. 32B is an explanatory diagram illustrating an operation example of a chemical simulation application.
Figure 32C:
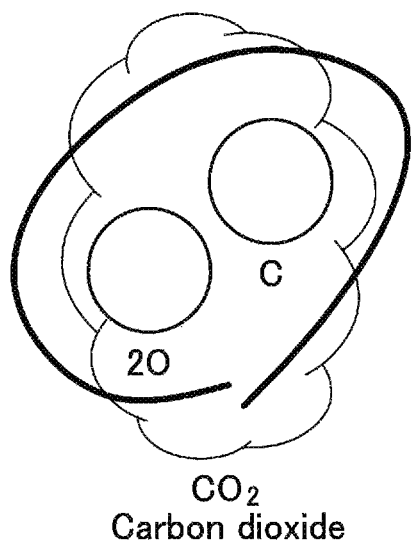
FIG. 32C is an explanatory diagram illustrating an operation example of a chemical simulation application.
Figure 32D:
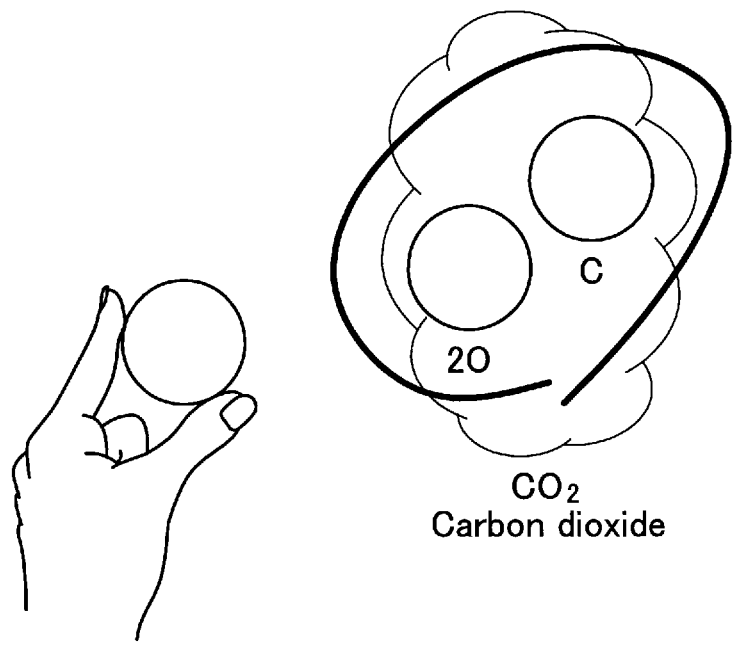
FIG. 32D is an explanatory diagram illustrating an operation example of a chemical simulation application.
Figure 32E:
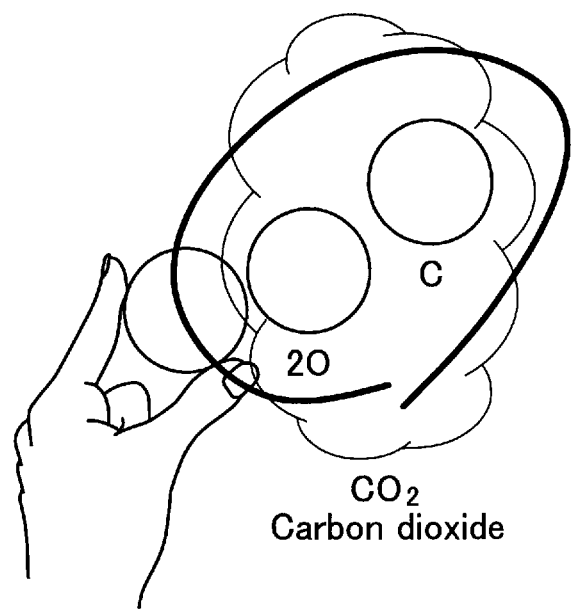
FIG. 32E is an explanatory diagram illustrating an operation example of a chemical simulation application.
Figure 32F:
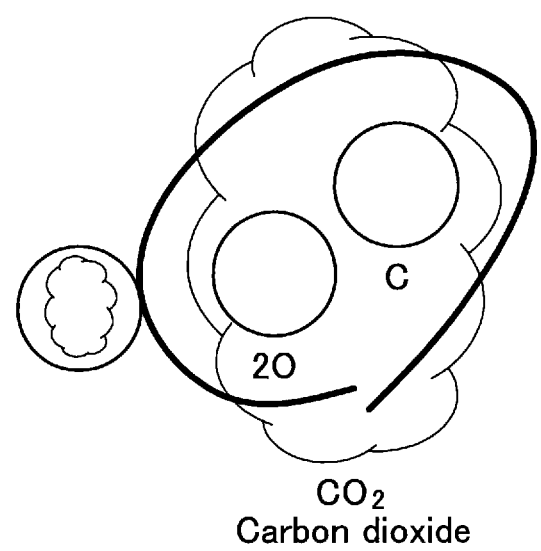
FIG. 32F is an explanatory diagram illustrating an operation example of a chemical simulation application.

The chemical simulation application that the information processing system 100 executes can produce different attributes in accordance with an operation of connecting tokens with the same or different attributes. Here, an example in which a user draws a trajectory around a token with a finger as the operation of connecting tokens will be described. FIGS. 32A to 32F are explanatory diagrams illustrating an operation example of the chemical simulation application. FIG. 32A is a diagram illustrating a state in which a token with attributes of carbon and two tokens with attributes of oxygen are placed on a table. FIG. 32B is a diagram illustrating a state in which a user has performed a gesture of circling the token with the attributes of carbon and the two tokens with the attributes of oxygen with a finger. Here, the trajectory that the user has drawn with the finger may be displayed on the table or may not be displayed. FIG. 32C is a diagram illustrating a state in which an effect as if carbon dioxide ($CO_2$) had been produced has occurred from the token with the attributes of carbon and the two tokens with the attributes of oxygen. FIG. 32D is a diagram illustrating a state in which the user causes a token to approach the effect in which carbon dioxide is produced, and FIG. 32E is a diagram illustrating a state in which the user has placed a token on the effect in which carbon dioxide is produced. FIG. 32F is a diagram illustrating a state in which attributes of carbon dioxide have been applied to the token that the user has placed.

Figure 33:
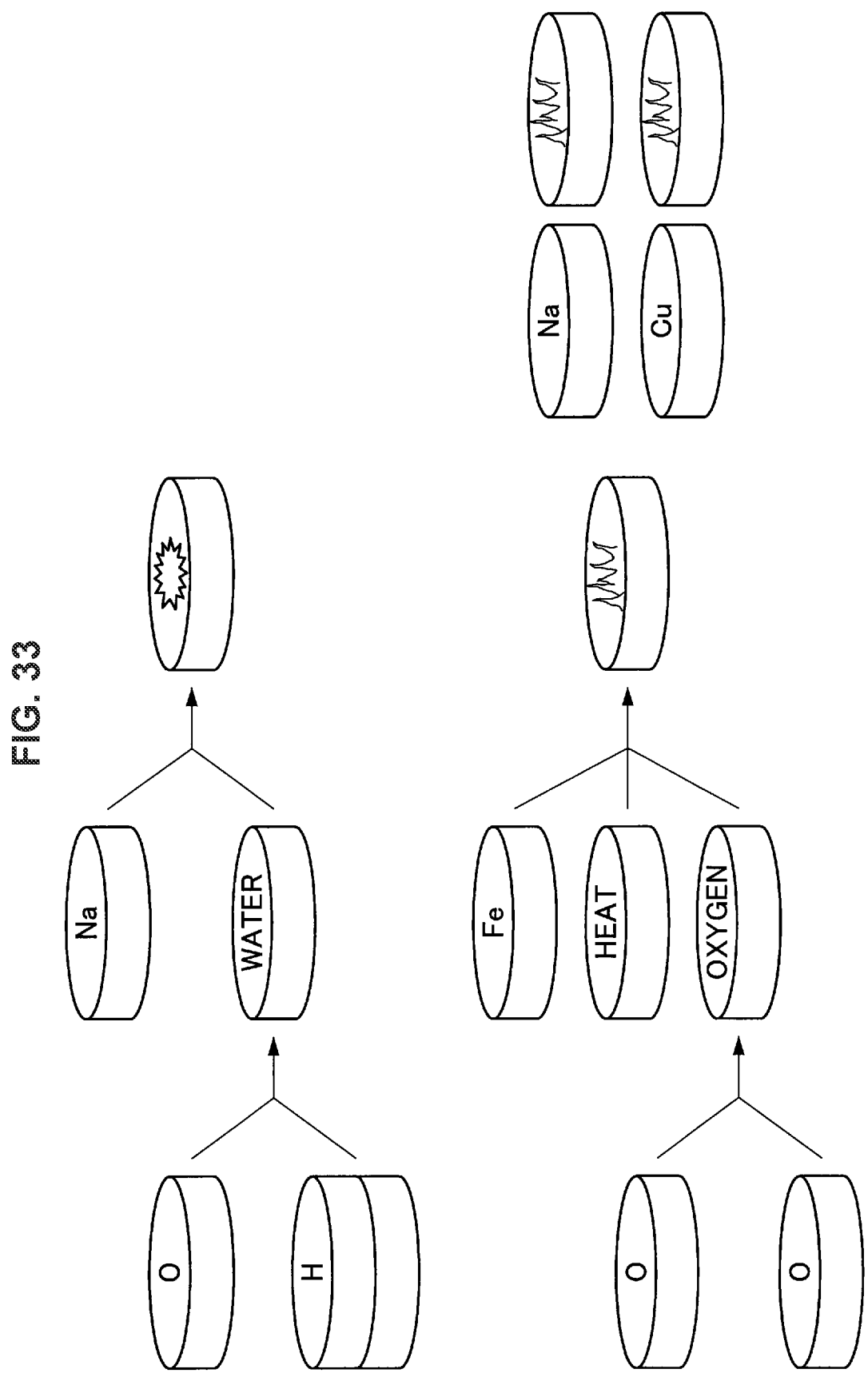
FIG. 33 is an explanatory diagram illustrating an operation example of a chemical simulation application.

FIG. 33 is an explanatory diagram illustrating an operation example of the chemical simulation application and illustrates a state in which different attributes are produced by connecting tokens with different attributes. The chemical simulation application can produce attributes of water in response to an operation of connecting two tokens with attributes of hydrogen and one token with attributes of oxygen, for example. In addition, the chemical simulation application can produce an effect like an explosion in response to an operation of connecting two tokens with attributes of water and one token with attributes of sodium (Na).

The chemical simulation application can produce attributes of an oxygen molecule in response to an operation of connecting tokens with attributes of oxygen, for example. In addition, the chemical simulation application can produce an effect of a red flame reaction in response to an operation of connecting a token with attributes of iron (Fe), a token with attributes of an oxygen molecule, and a token with attributes of a combustion reaction. The chemical simulation application can similarly produce an effect of a yellow flame reaction in response to an operation of connecting a token with attributes of sodium, a token with attributes of an oxygen molecule, and a token with attributes of a combustion reaction. The chemical simulation application can similarly produce an effect of a green flame reaction in response to an operation of connecting a token with attributes of copper (Cu), a token with attributes of an oxygen molecule, and a token with attributes of a combustion reaction.

Figure 34:
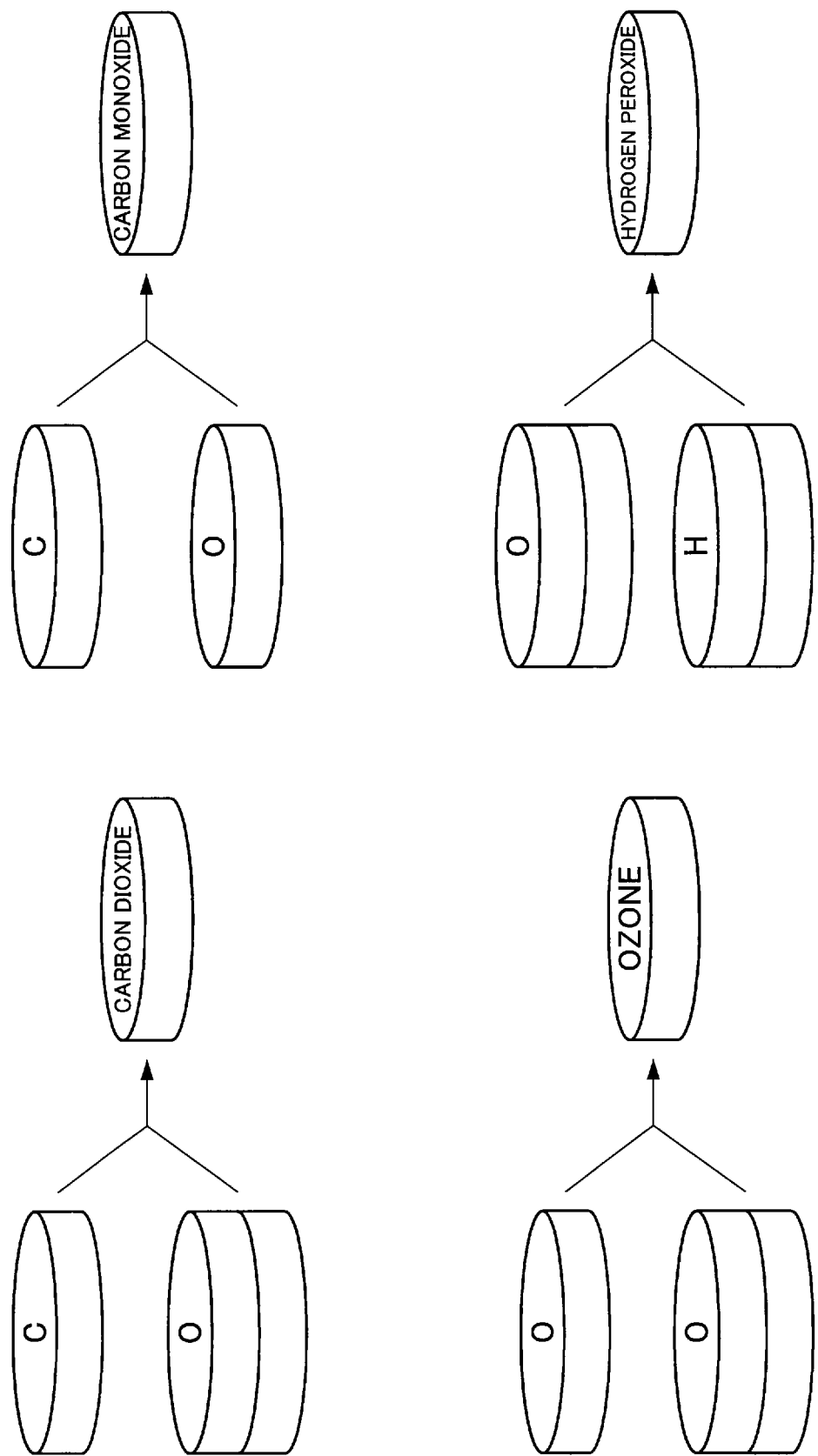
FIG. 34 is an explanatory diagram illustrating an operation example of a chemical simulation application.

FIG. 34 is an explanatory diagram illustrating an operation example of the chemical simulation application and illustrates a state in which different attributes are produce by connecting tokens with different attributes. The chemical simulation application can produce attributes of carbon dioxide using a token with attributes of carbon and two tokens with attributes of oxygen, for example. The chemical simulation application can produce attributes of carbon monoxide using a token with attributes of carbon and a token with attributes of oxygen, for example. The chemical simulation application can produce attributes of ozone using a token with attributes of oxygen and two tokens with attributes of oxygen, for example. The chemical simulation application can produce attributes of hydrogen peroxide ($H_2O_2$) using two tokens with attributes of hydrogen and two tokens with attributes of oxygen, for example.

Figure 35:
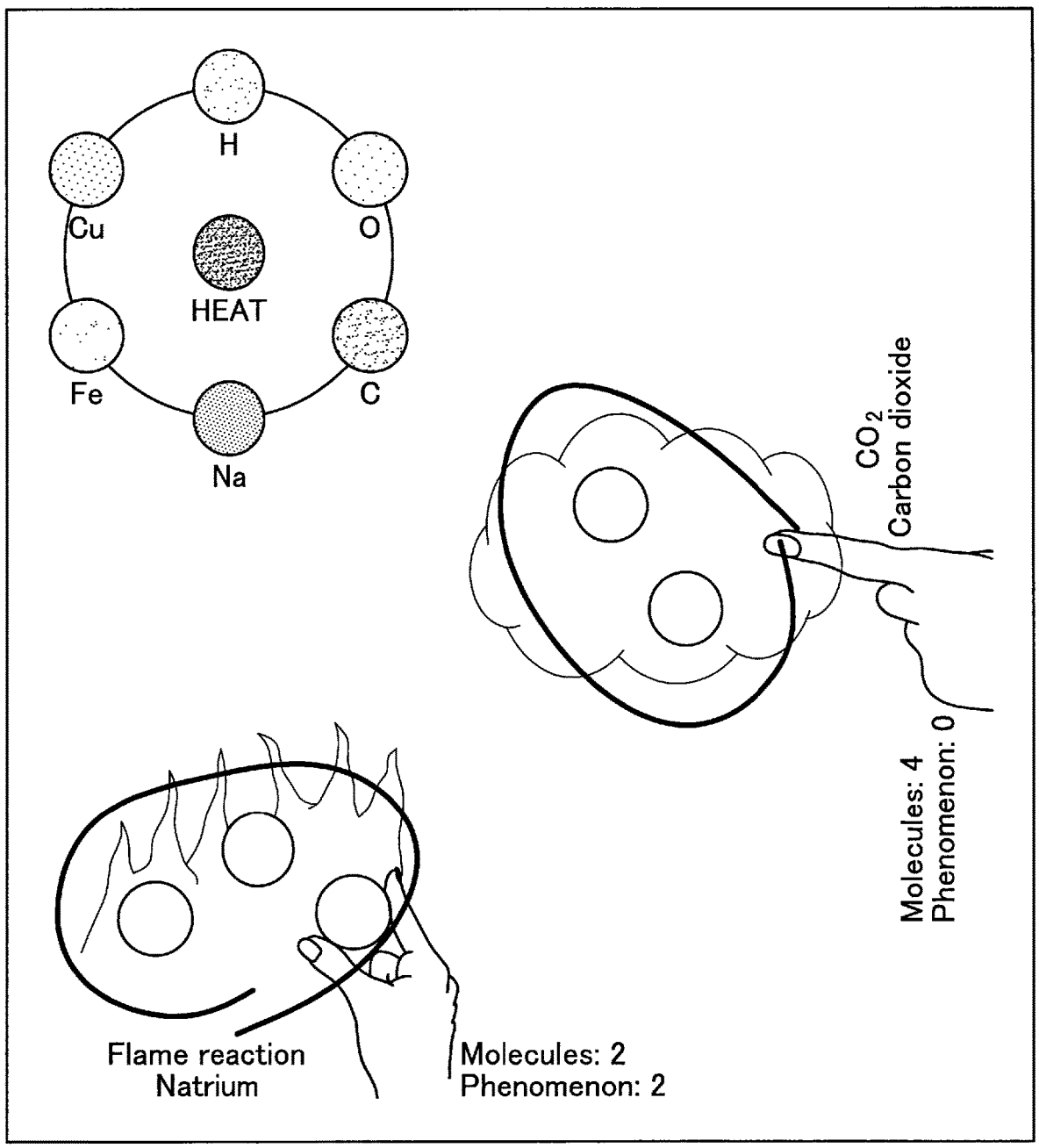
FIG. 35 is an explanatory diagram illustrating an operation example of a chemical simulation application.

FIG. 35 is an explanatory diagram illustrating an example of a user interface displayed by the chemical simulation application. The chemical simulation application can display the number of synthesized compounds and the number of phenomena produced for each user.

Application Example 2

An operation example of another application that is operated by the information processing system will be described. As the next example, an operation example of a cocktail ordering application for ordering a cocktail will be described. The application enables an order of a cocktail on a table using a token.

Figure 36A:
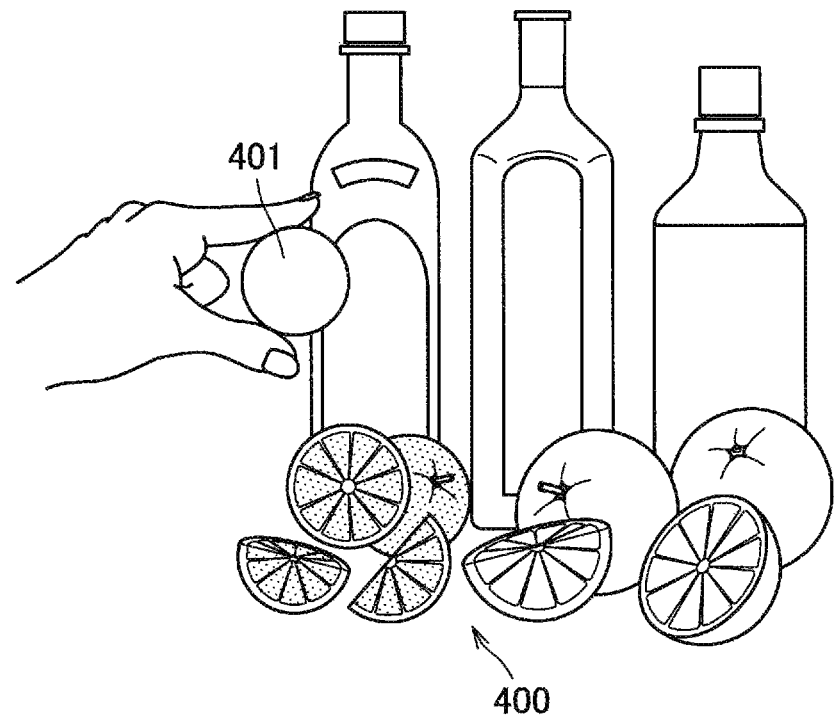
FIG. 36A is an explanatory diagram illustrating an operation example of a cocktail ordering application.
Figure 36B:
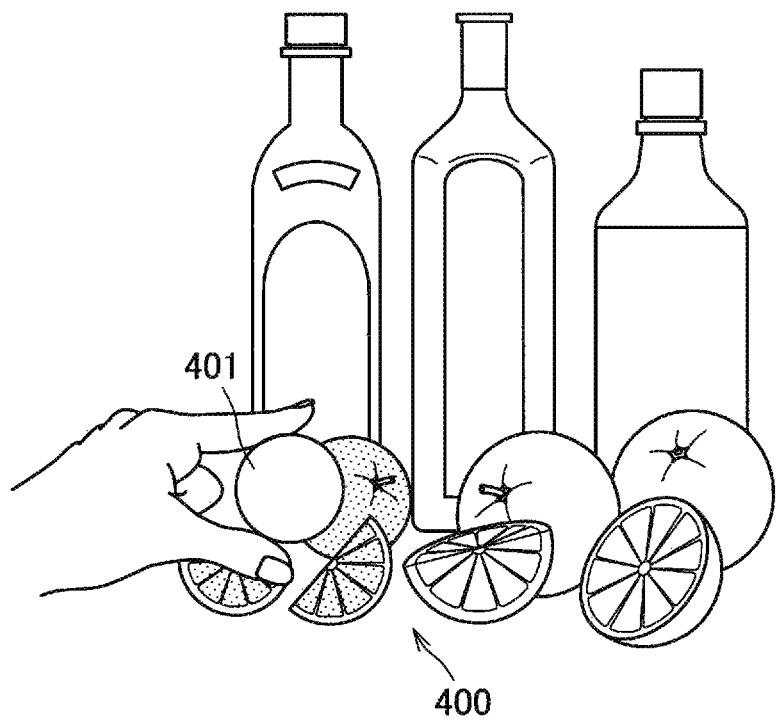
FIG. 36B is an explanatory diagram illustrating an operation example of a cocktail ordering application.
Figure 36C:
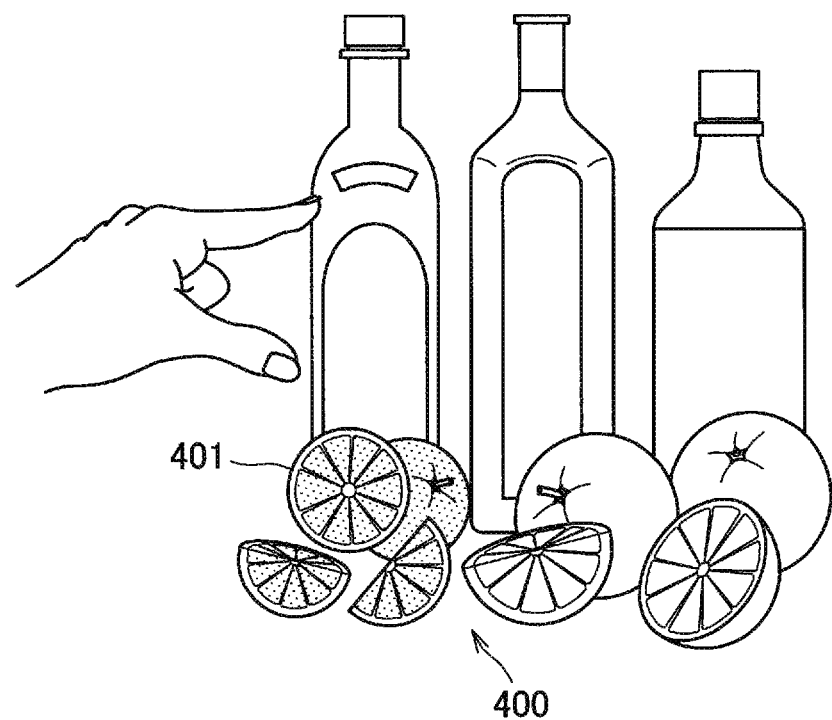
FIG. 36C is an explanatory diagram illustrating an operation example of a cocktail ordering application.

FIGS. 36A to 36C are explanatory diagrams illustrating an operation example of the cocktail ordering application.

FIG. 36A is a diagram illustrating a state in which a user causes a token 401 to approach an image 400 depicting fruits. FIG. 36B is a diagram illustrating a state in which the user has placed the token 401 on an image of a lime in the image 400. If the token 401 is placed on the image of the lime, the object information control unit 200 applies attributes of the lime to the token 401. At this time, the cocktail ordering application may project the image of the lime to the token 401 to which the attributes of the lime have been applied.

Figure 37A:
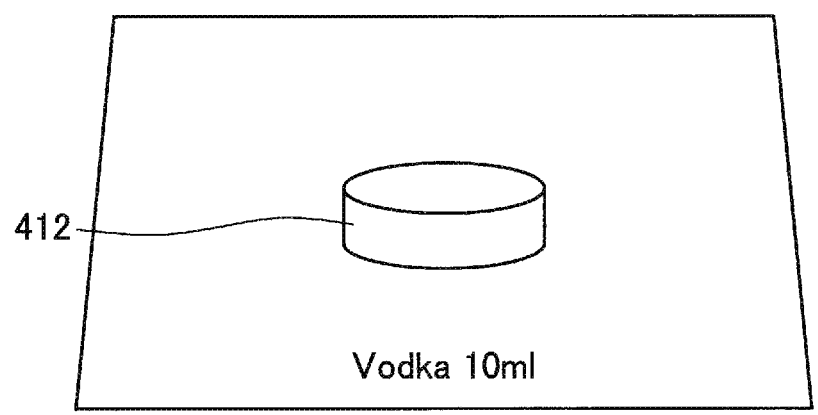
FIG. 37A is an explanatory diagram illustrating an operation example of a cocktail ordering application.
Figure 37B:
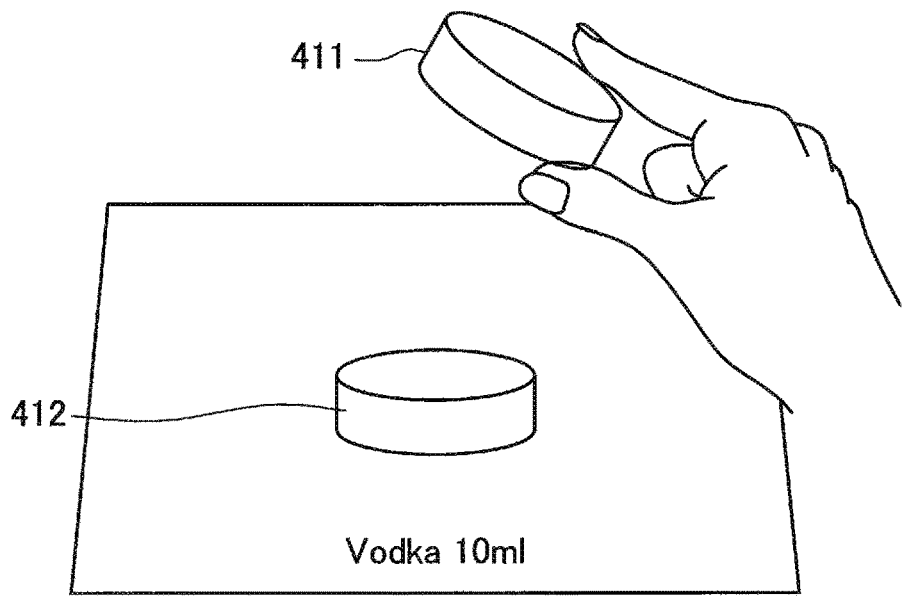
FIG. 37B is an explanatory diagram illustrating an operation example of a cocktail ordering application.
Figure 37C:
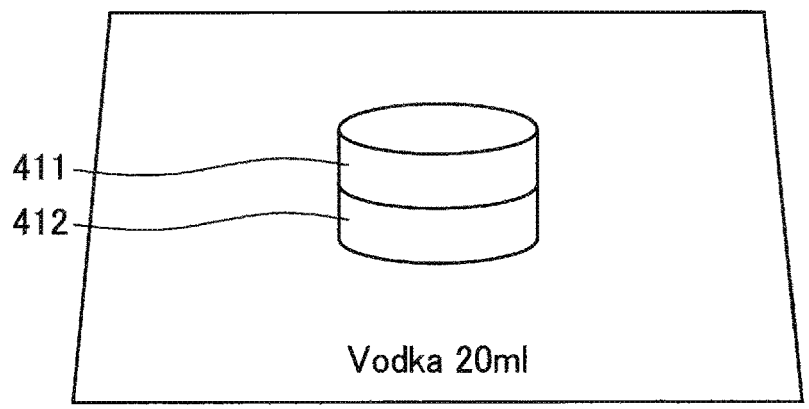
FIG. 37C is an explanatory diagram illustrating an operation example of a cocktail ordering application.

FIGS. 37A to 37C are explanatory diagrams illustrating an operation example of the cocktail ordering application. FIG. 37A is a diagram illustrating a state in which a token 412 with attributes of 10 ml of vodka applied thereto is placed on a table. FIG. 37B is a diagram illustrating a state in which a user is about to place a token 411 with no attributes assigned thereto on the token 412. FIG. 37C is a diagram illustrating a state in which the token 411 is piled on the token 412. The object information control unit 200 also applies attributes of 10 ml of vodka to the token 411 piled on the token 412 to which the attributes of 10 ml of vodka have been applied. Therefore, attributes of 20 ml of vodka are applied using the tokens 411 and 412.

Figure 38A:
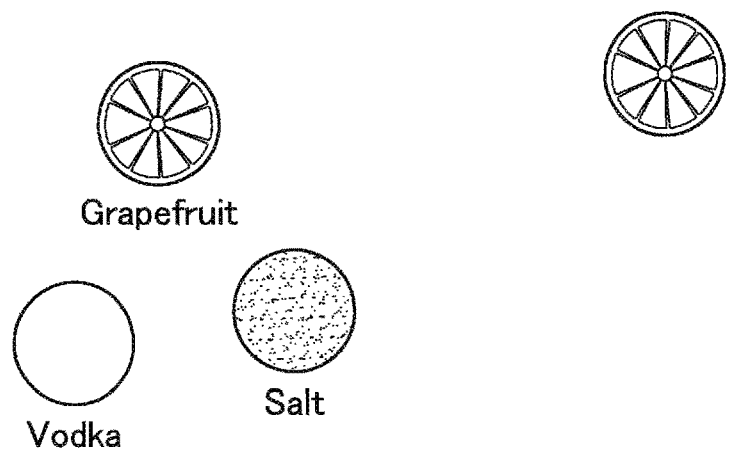
FIG. 38A is an explanatory diagram illustrating an operation example of a cocktail ordering application.
Figure 38B:
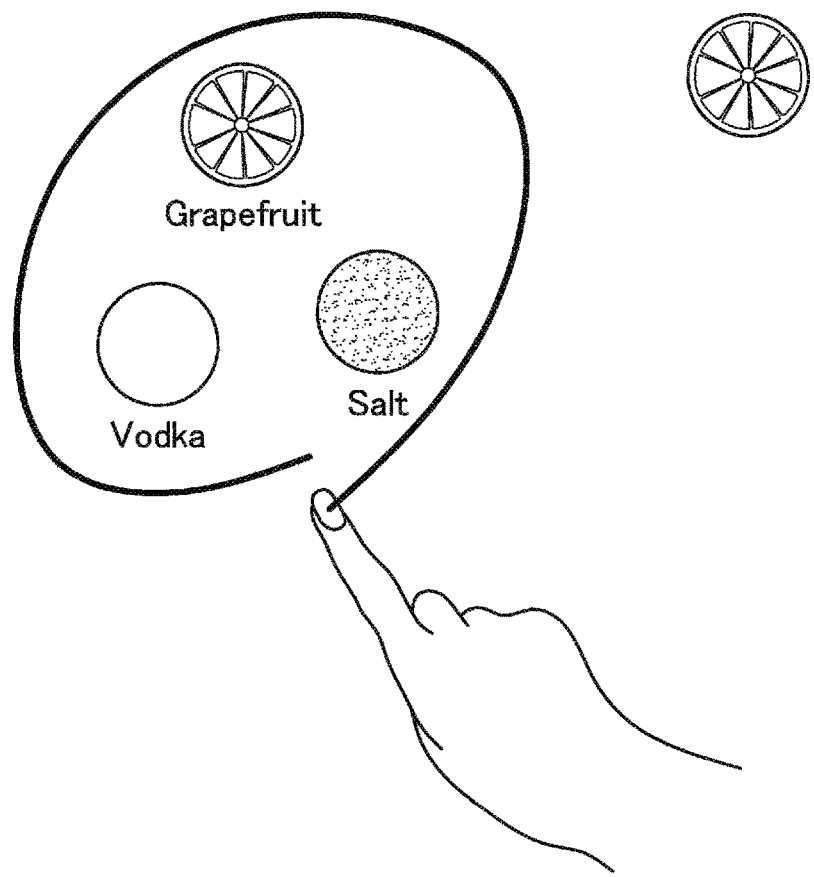
FIG. 38B is an explanatory diagram illustrating an operation example of a cocktail ordering application.
Figure 38C:
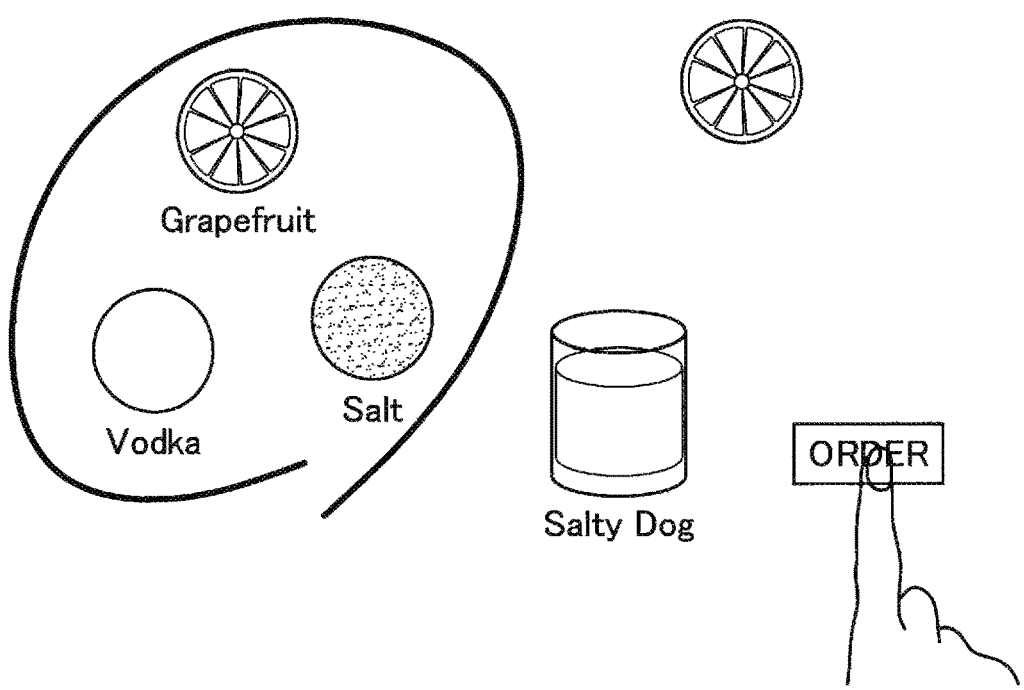
FIG. 38C is an explanatory diagram illustrating an operation example of a cocktail ordering application.

FIGS. 38A to 38D are explanatory diagrams illustrating an operation example of the cocktail ordering application. FIG. 38A is a diagram illustrating tokens to which attributes of vodka, a grapefruit, and salt have been applied are placed on a table. FIG. 38B is a diagram illustrating a state in which a user has performed a gesture of circling tokens to which attributes of vodka, a grapefruit, and salt have been applied with a finger. FIG. 38C is a diagram illustrating a state in which a user interface for ordering a salty dog is displayed by the user performing the gesture of circling the tokens to which attributes of vodka, a grapefruit, and salt have been applied with the finger. The cocktail ordering application may display information regarding a cocktail during a waiting time if the user orders the cocktail. FIG. 38D is a diagram illustrating a state in which information regarding a salty dog is displayed.

FIGS. 39A and 39B are explanatory diagrams illustrating an operation example of the cocktail ordering application. FIG. 39A is a diagram illustrating a state in which information regarding a screwdriver is displayed. In a case in which the user has selected an unknown combination, the cocktail ordering application may display a user interface that displays that the combination is a new combination. FIG. 39B is a diagram illustrating a state in which information when the user has selected the unknown combination is displayed.

Figure 40A:
FIG. 40A is an explanatory diagram illustrating an operation example of a cocktail ordering application.
Figure 40B:
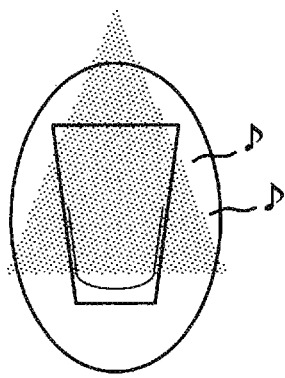
FIG. 40B is an explanatory diagram illustrating an operation example of a cocktail ordering application.

If the ordered cocktail has been completed, a bartender places the glass on the table. The cocktail ordering application may detect the placement of the glass and may provide light or sound performance. FIG. 40A is a diagram illustrating a state in which a glass with a screwdriver is placed on the table. Also, FIG. 40B is a diagram illustrating a state in which a spotlight is directed to the glass with the screwdriver or sound is played.

Information accumulated in the information accumulation processing unit 230 during the operations of the cocktail ordering application will be illustrated. Tables 6 and 7 below illustrate information accumulated in the information accumulation processing unit 230 during operations of the cocktail ordering application. Table 6 is an object management table, and Table 7 is an attribute management table. The respective tables are realized, for example, in the form of relational databases or the like.

TABLE 6

Object management table

| Object ID | Recognition ID alignment | Feature amount | Processing flag |
|---|---|---|---|
| 1 | A | 1 cm | true |
| 2 | B, B | 2 cm | true |
| 3 | C | 1 cm | true |
| 4 | D | 1 cm | true |

TABLE 7

Attribute management table

| Recognition ID | Attribute |
|---|---|
| A | Lime |
| B | Vodka |
| C | Grapefruit |
| D | Salt |

Application Example 3

An operation example of another application that is operated by the information processing system 100 will be described. As the next example, an operation example of a music playing application for playing instruments will be described. The application enables playing of instruments on a table using tokens.

Figure 41A:
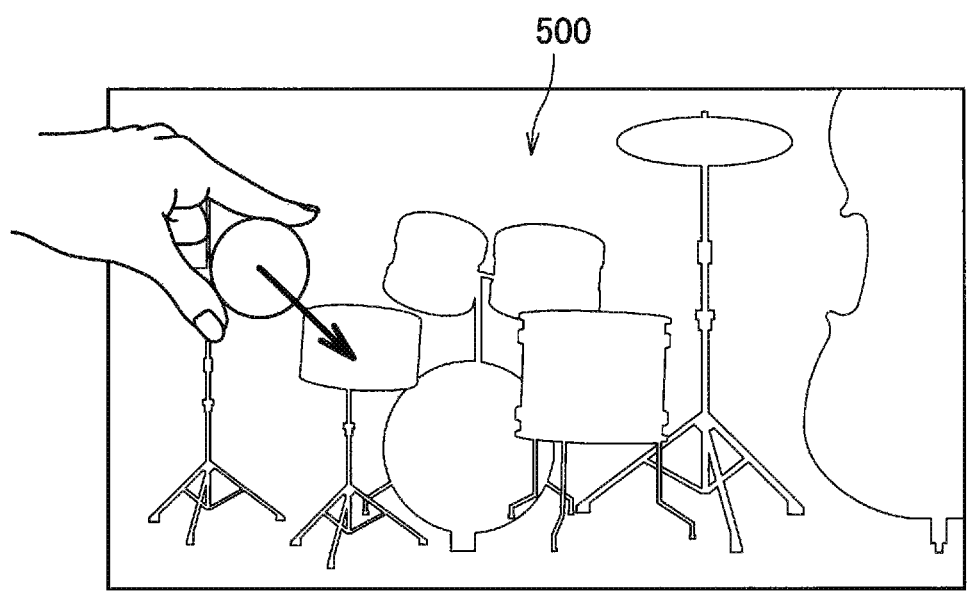
FIG. 41A is an explanatory diagram illustrating an operation example of a music playing application.
Figure 41B:
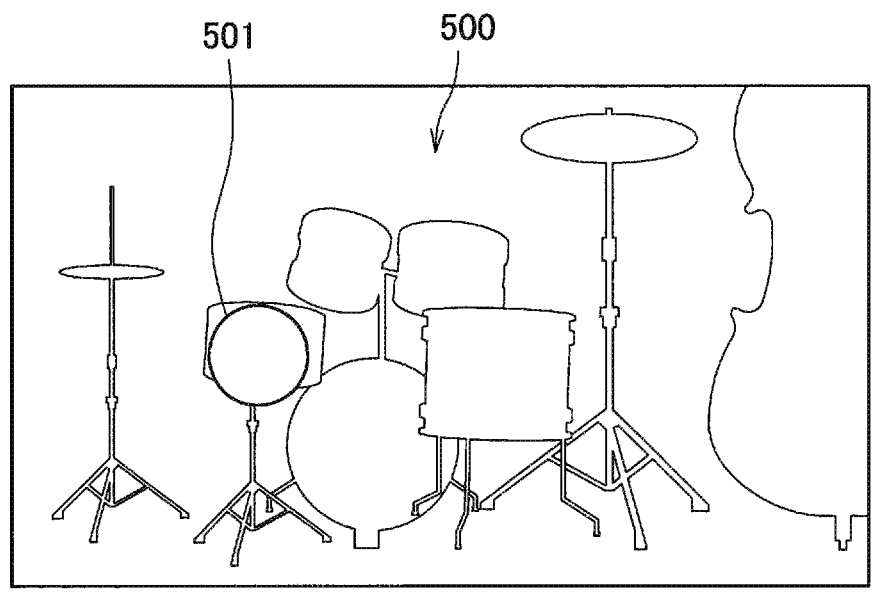
FIG. 41B is an explanatory diagram illustrating an operation example of a music playing application.
Figure 41C:
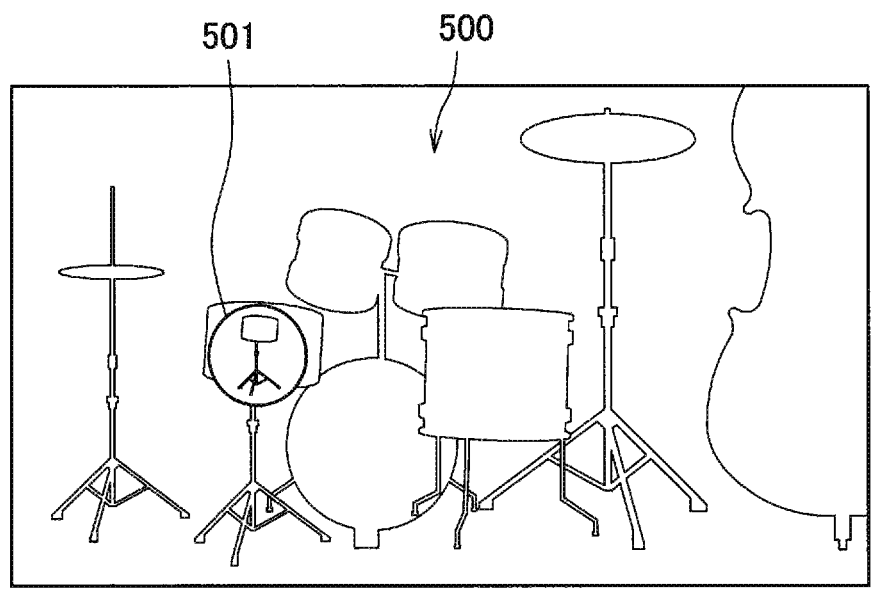
FIG. 41C is an explanatory diagram illustrating an operation example of a music playing application.
Figure 41D:
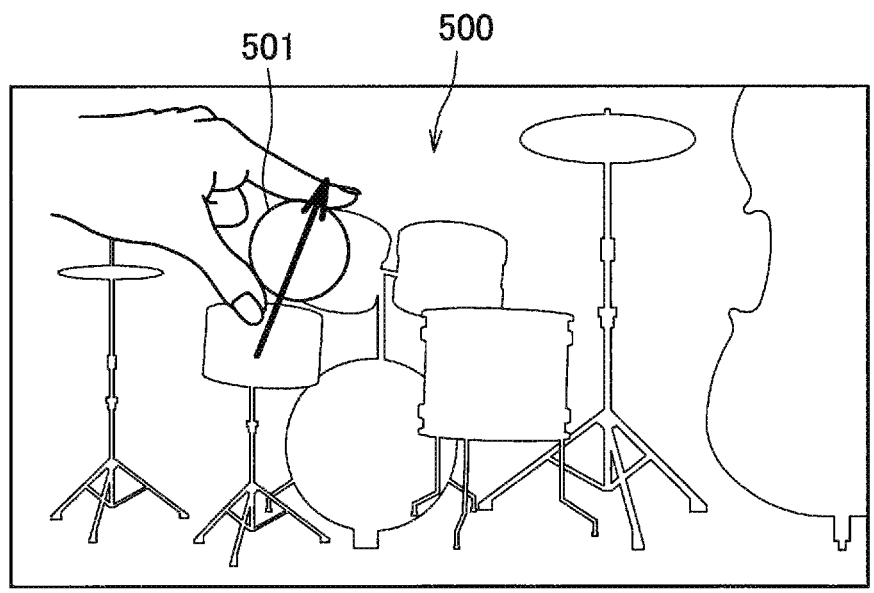
FIG. 41D is an explanatory diagram illustrating an operation example of a music playing application.
Figure 41E:
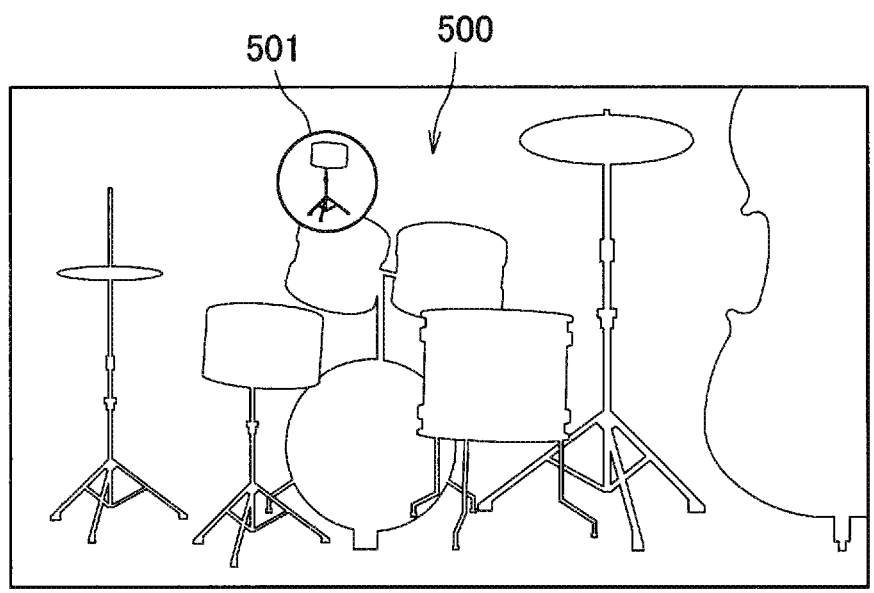
FIG. 41E is an explanatory diagram illustrating an operation example of a music playing application.

FIGS. 41A to 41F are explanatory diagrams illustrating an operation example of the music playing application. FIG. 41A is a diagram illustrating a state in which a user causes a token 501 to approach an image 500 depicting instruments. FIG. 41B is a diagram illustrating a state in which the user has placed the token 501 on an image of a snare drum in the image 500. If the token 501 is placed on the image of the snare drum, the object information control unit 200 applies attributes of the snare drum to the token 501. At this time, the music playing application may project the image of the snare drum to the token 501 to which the attributes of the snare drum have been applied. FIG. 41D is a diagram illustrating an example in which the user holds the token 501 to which the attributes of the snare drum have been applied in the user's hand and causes the token 501 to move. FIG. 41E is a diagram illustrating an example in which the user has released the token 501 to which the attributes of the snare drum have been applied from the user's hand. In this manner, since the object information control unit 200 has recognized that the token 501 has the attributes of the snare drum even if the user has held the token 501 in the user's hand once, it is possible to apply the attributes of the snare drum to the token 501 when the user releases the token 501 from the user's hand.

Figure 41F:
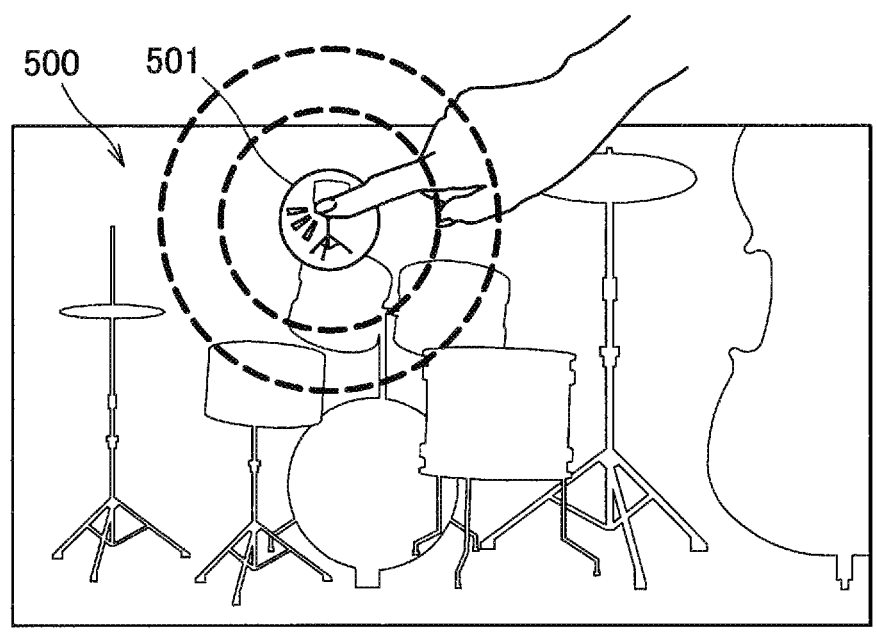
FIG. 41F is an explanatory diagram illustrating an operation example of a music playing application.

If the user taps the token 501 to which the attributes of the snare drum have been applied with the user's finger, the music playing application outputs sound of the snare drum in response to the tapping. FIG. 41F is a diagram illustrating an example in which the user taps the token 501 to which the attributes of the snare drum have been applied with the user's finger.

If tokens with the same attributes are piled up and the tokens are tapped, the music playing application may cause the sound that is output to change on the basis of the weights of the tokens.

Figure 42A:
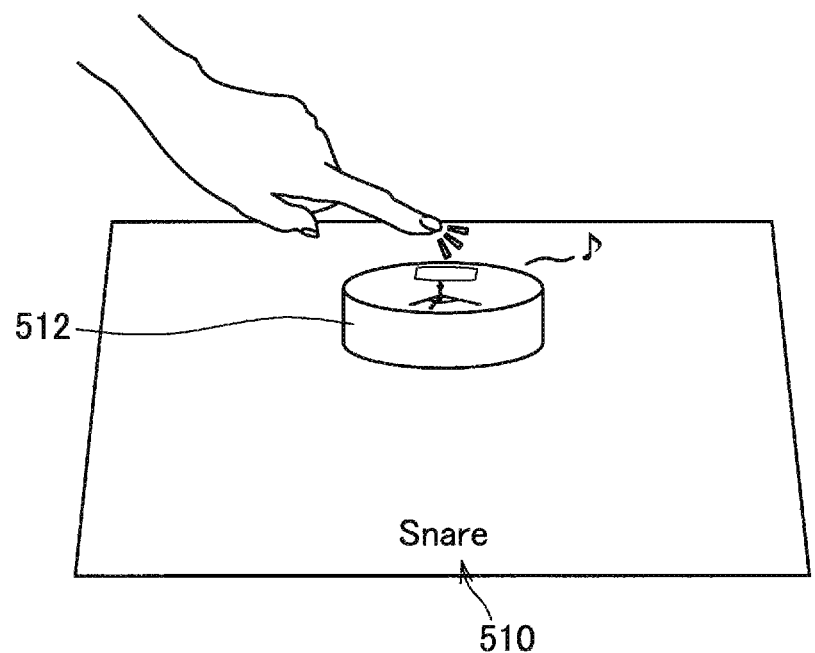
FIG. 42A is an explanatory diagram illustrating an operation example of a music playing application.
Figure 42B:
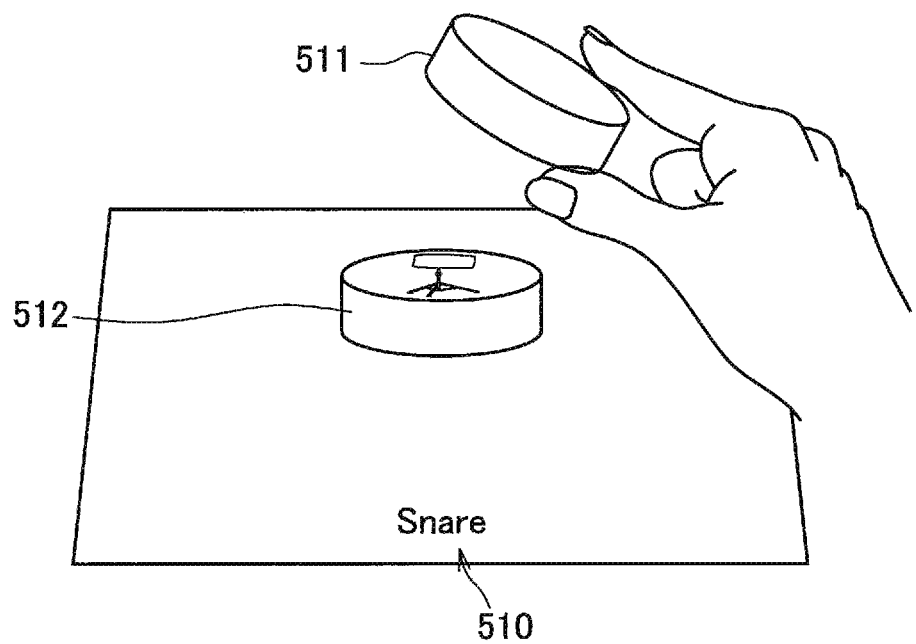
FIG. 42B is an explanatory diagram illustrating an operation example of a music playing application.
Figure 42C:
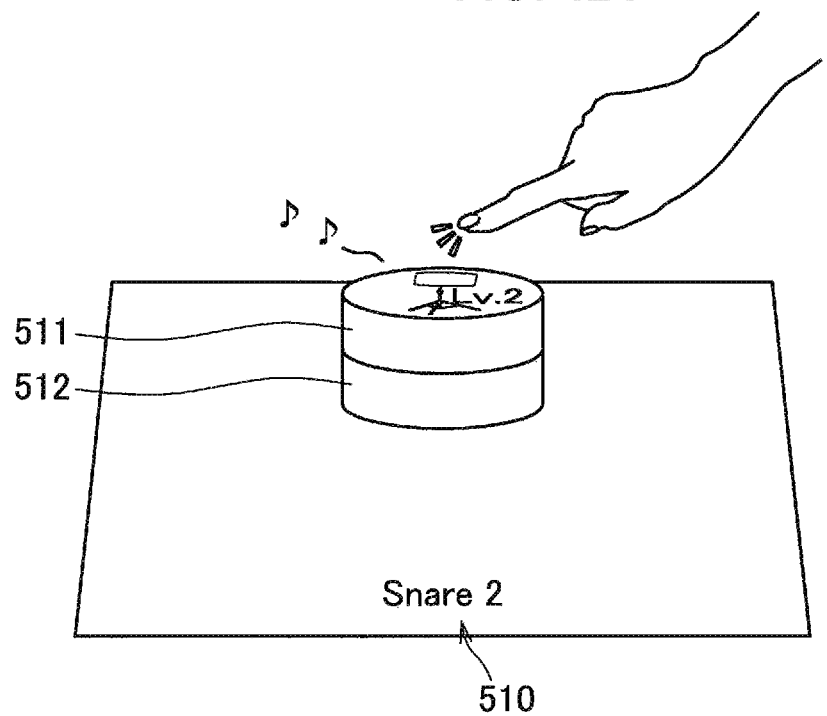
FIG. 42C is an explanatory diagram illustrating an operation example of a music playing application.

FIGS. 42A to 42C are explanatory diagrams illustrating an operation example of the music playing application. FIG.

42A is a diagram illustrating a state in which a token 512 to which the attributes of the snare drum have been applied is placed on the table. FIG. 42B is a diagram illustrating a state in which the user is about to place a token 511 to which no attributes have been applied on the token 512. FIG. 42C is a diagram illustrating a state in which the token 511 is piled on the token 512. The object information control unit 200 also applies the attributes of the snare drum to the token 511 piled on the token 512 to which the attributes of the snare drum have been applied. In addition, if the user taps the token 511, the music playing application outputs sound that is different from that in a case in which there is only one token with the attributes of the snare drum applied thereto.

If tokens with different attributes are piled and the tokens are tapped, the music playing application may synthesize sound to be output on the basis of the weights of the tokens.

Figure 42D:
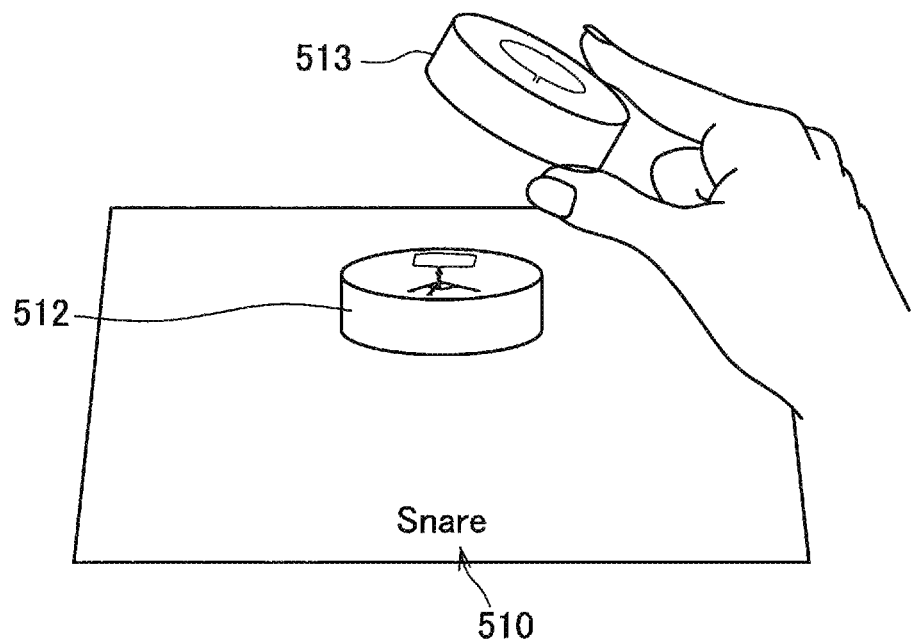
FIG. 42D is an explanatory diagram illustrating an operation example of a music playing application.
Figure 42E:
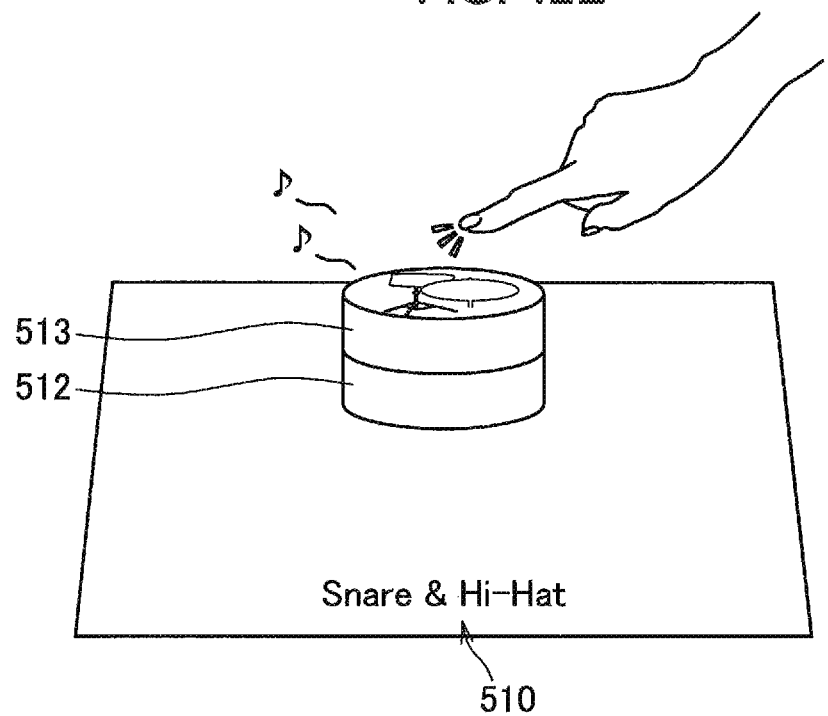
FIG. 42E is an explanatory diagram illustrating an operation example of a music playing application.

FIGS. 42D and 42E are explanatory diagrams illustrating an operation example of the music playing application. FIG. 42D is a diagram illustrating a state in which the user is about to place a token 513 to which attributes of a high-hat have been applied on the token 512. FIG. 42E is a diagram illustrating a state in which the token 513 is piled on the token 512. The object information control unit 200 recognizes that the token 513 to which the attributes of the high-hat have been applied has been piled on the token 512 to which the attributes of the snare drum have been applied. If the user taps the token 513, then the music playing application outputs sound obtained by synthesizing sound of the snare drum and sound of the high-hat.

FIG. 43 is an explanatory diagram illustrating an operation example of the music playing application. FIG. 43 illustrates a state in which tokens 521 to 525 are placed on a table. Also, a state in which an image 520 of instruments is displayed by the music playing application is also illustrated in FIG. 43. The music playing application outputs sound in accordance with the tokens by the user tapping the tokens 521 to 525 with the user's finger. That is, the user can enjoy an ensemble of different instruments by tapping the tokens 521 to 525.

The music playing application may produce an object in response not only to tapping of the tokens but also to the user's tapping of the table and may produce sounds of instruments assigned to the tokens if the object collides with the tokens.

Figure 44:
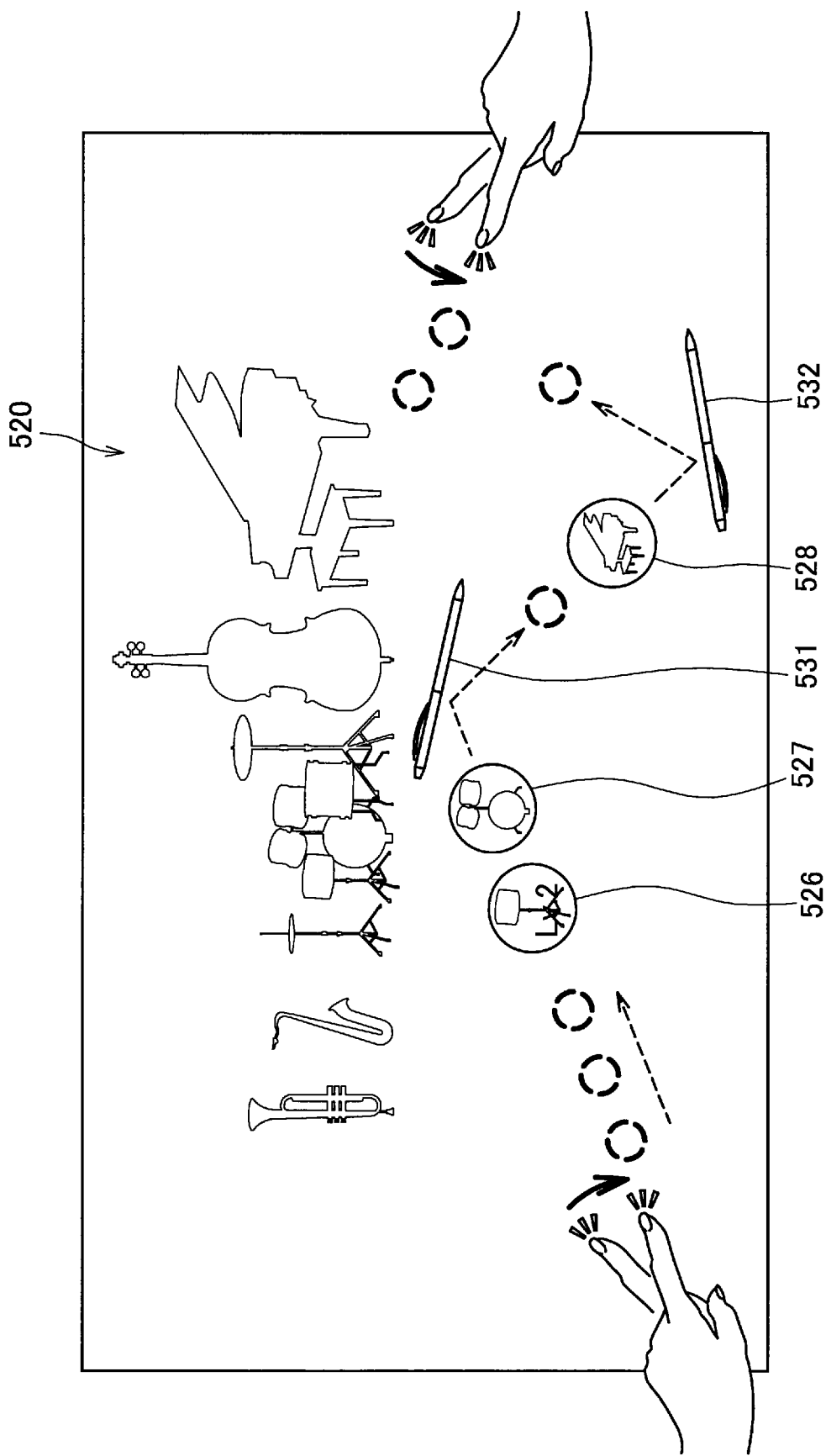
FIG. 44 is an explanatory diagram illustrating an operation example of a music playing application.

FIG. 44 is an explanatory diagram illustrating an operation example of the music playing application. A state in which tokens 526 to 528 are placed on a table is illustrated in FIG. 44. Also, a state in which the image 520 of the instruments is displayed by the music playing application is also illustrated in FIG. 44. Further, pens 531 and 532 placed on the table are also illustrated in FIG. 44.

If the user taps the table, the music playing application causes an object like a ball to be displayed and causes the object to move in the direction of the user's finger. If the object collides with the tokens 526 to 528, the music playing application produces sounds of instruments assigned to the tokens with which the object has collided. Also, the music playing application reflects the object that the user has caused to be produced after it is brought into contact with the pens 531 and 532. In this manner, the music playing application can produce an object in response not only to tapping of the tokens but also to the user's tapping of the table and produce sounds of the instruments assigned to the tokens if the object collides with the tokens.

Information accumulated in the information accumulation processing unit 230 during operations of the music playing application will be illustrated. Tables 8 and 9 below illustrate information accumulated in the information accumulation processing unit 230 during operations of the music playing application. Table 8 is an object management table, and Table 9 is an attribute management table. The respective tables are realized, for example, in the form of relational databases or the like.

TABLE 8

Object management table

| Object ID | Recognition ID alignment | Feature amount | Processing flag |
|---|---|---|---|
| 1 | A | 1 cm | true |
| 2 | B, B, B | 3 cm | true |
| 3 | C, C | 2 cm | true |
| 4 | D | 1 cm | true |
| 5 | E, F | 2 cm | true |

TABLE 9

Attribute management table

| Recognition ID | Attribute |
|---|---|
| A | Sax |
| B | Trumpet |
| C | Snare drum |
| D | Bass drum |
| E | Piano |
| F | Double bass |

2. HARDWARE CONFIGURATION EXAMPLE

Next, a hardware configuration of the information processing system 100 according to an embodiment of the present disclosure will be described with reference to FIG. 45. FIG. 45 is a block diagram illustrating a hardware configuration example of the information processing system 100 according to an embodiment of the present disclosure.

As illustrated in FIG. 45, the information processing system 100 includes a central processing unit (CPU) 901, a read only memory (ROM) 903, and a random access memory (RAM) 905. In addition, the information processing system 100 may include a host bus 907, a bridge 909, an external bus 911, an interface 913, an input device 915, an output device 917, a storage device 919, a drive 921, a connection port 923, and a communication device 925. Further, the information processing system 100 may include an imaging device 933 and a sensor 935 as necessary. The information processing system 100 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing system 100 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is, for example, a device manipulated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the manipulation of the information processing system 100X). The input device 915 includes an input control circuit that generates an input signal on the basis of the information input by a user and outputs the input signal to the CPU 901. By manipulating the input device 915, a user can input various types of data to the information processing system 100 or issue instructions for causing the information processing system 100 to perform a processing operation. In addition, the imaging device 933 to be described below can function as an input device by imaging a motion or the like of a hand of the user.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing system 100) in a form of video such as text or an image and in a form of voice such as voice or sound. In addition, the output device 917 may include a light or the like to brighten the surroundings.

The storage device 919 is a device for data storage configured as an example of a storage unit of the information processing system 100. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing system 100 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing system 100. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the information processing system 100 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images.

The sensor 935 is any of various sensors such as an acceleration sensor, a gyro sensor, a geomagnetic sensor, an optical sensor, or a sound sensor, for example. The sensor 935 acquires information regarding the state of the information processing system 100, such as the attitude of the case of the information processing system 10X), as well as information regarding the environment surrounding the information processing system 100, such as brightness or noise surrounding the information processing system 100, for example. The sensor 935 may also include a global positioning system (GPS) sensor that receives GPS signals and measures the latitude, longitude, and altitude of the device.

The foregoing thus illustrates an exemplary hardware configuration of the information processing system 100. Each of the above components may be realized with general-purpose members or hardware specialized in the function of each component. Such a configuration may also be modified as appropriate in accordance with the technological level at the time of the implementation.

3. CONCLUSION

As described above, according to embodiments of the present disclosure, the information processing system 100 capable of tracking an object even in a case in which a state of the object has changed for some reason such as piling-up of bodies and a state in which the object cannot be recognized is provided. The information processing system 100 according to the embodiment of the present disclosure provides tables for managing states of the object and assigns attribute information of the bodies assigned to the object before the change to the object after the change in a case in which bodies are piled up. The information processing system 100 according to embodiments of the present disclosure can successively track the object even if a state of the object has changed for some reason such as piling-up of bodies and a state in which the object cannot be recognized.

Steps in the process executed by each apparatus of the present specification need not always be chronologically processed in accordance with the order described as a sequence diagram or a flow chart. For example, steps in the process executed by each apparatus may be processed in an order different from the order described as a flow chart, or may be concurrently processed.

In addition, a computer program for causing hardware such as a CPU, a ROM, and a RAM that is incorporated in each apparatus, to execute a function equivalent to the above-described configuration of each apparatus can also be created. In addition, a storage medium storing the computer program can also be provided. In addition, by forming each functional block illustrated in a functional block diagram, by hardware or a hardware circuit, a series of processes can also be implemented by hardware or a hardware circuit.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a detection unit that detects a feature amount of an object and an operation object in a sensing-possible region; and an attribute processing unit that decides, on the basis of the detection unit having detected a change in the feature amount of the object in a depth direction of sensing using the operation object, an attribute to be associated with the object after the change in the future amount using an attribute associated with the object before the change.

(2)

The information processing device according to (1), in which the object is an object that has a feature amount in the depth direction of the sensing.

(3)

The information processing device according to (2), in which the attribute processing unit decides, on the basis of the detection unit having detected the change in the feature amount, an attribute to be associated with the object after the change using an attribute associated with the object in an uppermost level before the change in the feature amount.

(4)

The information processing device according to (2), in which, in a case in which no attribute has been associated with the object after a decrease in the feature amount, the attribute processing unit sets an attribute assigned to the object in an uppermost level before the decrease in the feature amount as an attribute to be associated with the object after the decrease.

(5)

The information processing device according to (2), in which, in a case in which an attribute has been associated with the object after a decrease in the feature amount, the attribute processing unit sets the attribute as an attribute to be associated with the object after the decrease in the feature amount.

(6)

The information processing device according to (2), in which, in a case in which no attribute has been associated with the object after an increase in the feature amount, the attribute processing unit sets an attribute associated with the object in an uppermost level before the increase in the feature amount as an attribute to be associated with the object after the increase in the feature amount.

(7)

The information processing device according to (2), in which, in a case in which an attribute has been associated with the object in an uppermost level after an increase in the feature amount while no attribute has been associated with an object below the object in the uppermost level, the attribute processing unit sets the attribute associated with the object in the uppermost level as an attribute to be associated with the object with which no attribute has been associated.

(8)

The information processing device according to any of (2) to (7), in which the depth direction of the sensing is a height direction, and the feature amount in the depth direction of the sensing is height.

(9)

The information processing device according to any of (1) to (8), further including:

an output control unit that causes information to be output in accordance with an attribute associated with an operated object if an operation performed on the object with which the attribute has been associated through processing performed by the attribute processing unit is detected by the detection unit.

(10)

The information processing device according to (9), in which in a case in which a plurality of the bodies that is superimposed is associated with same attributes, the output control unit outputs information that is different from information in accordance with the attributes in response to operations performed on the plurality of the bodies.

(11)

The information processing device according to (9), in which, in a case in which a plurality of the superimposed bodies is each associated with different attributes, the output control unit outputs information with which the information in accordance with the attributes has been synthesized, in response to operations performed on the plurality of the bodies.

(12)

The information processing device according to (11), in which the information that is caused to be output by the output control unit is a color.

(13)

The information processing device according to (11), in which the information that is caused to be output by the output control unit is sound.

(14)

An information processing method including, by a processor:

detecting a feature amount of an object and an operation object in a sensing-possible region; and deciding, on the basis of a change in the feature amount of the object having been detected in the sensing-possible region, an attribute to be associated with the object after the change using an attribute associated with the object before the change.

(15)

A computer program that causes a computer to execute:

detecting a feature amount of an object and an operation object in a sensing-possible region; and deciding, on the basis of a change in the feature amount of the object having been detected in the sensing-possible region, an attribute to be associated with the object after the change using an attribute associated with the object before the change.

REFERENCE SIGNS LIST 100 information processing system
200 object information control unit

The invention claimed is:

1. An information processing device comprising:
   a detection unit that detects a feature amount of an object in a depth direction of sensing and an operation object in a sensing-possible region; and
   an attribute processing unit that decides, based on the detection unit detecting a change in the feature amount of the object in the depth direction of sensing according to movement of the object using the operation object, an attribute that is associated with the object after the detected change in the feature amount using an attribute associated with another object in the sensing-possible region before the detected change,
   wherein the attribute processing unit decides the attribute that is associated with the object after the change using an attribute associated with the object in an uppermost level before the change in the feature amount, and
   wherein the detection unit and the attribute processing unit are each implemented via at least one processor.

2. The information processing device according to claim 1, wherein, in a case in which no attribute has been associated with the object after a decrease in the feature amount, the attribute processing unit sets an attribute assigned to the object in an uppermost level before the decrease in the feature amount as an attribute that is associated with the object after the decrease.

3. The information processing device according to claim 1, wherein, in a case in which an attribute has been associated with the object after a decrease in the feature amount, the attribute processing unit sets the attribute as an attribute that is associated with the object after the decrease in the feature amount.

4. The information processing device according to claim 1, wherein, in a case in which no attribute has been associated with the object after an increase in the feature amount, the attribute processing unit sets an attribute associated with the object in an uppermost level before the increase in the feature amount as an attribute that is associated with the object after the increase in the feature amount.

5. The information processing device according to claim 1, wherein, in a case in which an attribute has been associated with the object in an uppermost level after an increase in the feature amount while no attribute has been associated with an object below the object in the uppermost level, the attribute processing unit sets the attribute associated with the object in the uppermost level as an attribute that is associated with the object with which no attribute has been associated.

6. The information processing device according to claim 1, wherein the depth direction of the sensing is a height direction, and the feature amount in the depth direction of the sensing is height.

7. The information processing device according to claim 1, further comprising:
   an output control unit that causes information to be output in accordance with an attribute associated with an operated object if an operation performed on the object with which the attribute has been associated through processing performed by the attribute processing unit is detected by the detection unit,
   wherein the output control unit is implemented via at least one processor.

8. The information processing device according to claim 7, wherein in a case in which a plurality of the bodies that is superimposed is associated with same attributes, the output control unit outputs information that is different from information in accordance with the attributes in response to operations performed on the plurality of the bodies.

9. The information processing device according to claim 7, wherein, in a case in which a plurality of the superimposed bodies is each associated with different attributes, the output control unit outputs information with which the information in accordance with the attributes has been synthesized, in response to operations performed on the plurality of the bodies.

10. The information processing device according to claim 9, wherein the information that is caused to be output by the output control unit is a color.

11. The information processing device according to claim 9, wherein the information that is caused to be output by the output control unit is sound.

12. The information processing device according to claim 1, wherein the detected change in the feature amount according to the movement of the object is based on the object being added to or removed from the other object using the operation object.

13. An information processing method comprising, by a processor:
   detecting a feature amount of an object in a depth direction of sensing and an operation object in a sensing-possible region; and
   deciding, based on a change in the feature amount of the object in the depth direction of sensing having been detected in the sensing-possible region according to movement of the object using the operation object, an attribute that is associated with the object after the detected change in the feature amount using an attribute associated with another object in the sensing-possible region before the detected change,
   wherein the attribute that is associated with the object is decided after the change using an attribute associated with the object in an uppermost level before the change in the feature amount.

14. A computer program that causes a computer to execute:
   detecting a feature amount of an object in a depth direction of sensing and an operation object in a sensing-possible region; and
   deciding, based on a change in the feature amount of the object in the depth direction of sensing having been detected in the sensing-possible region according to movement of the object using the operation object, an attribute that is associated with the object after the detected change in the feature amount using an attribute associated with another object in the sensing-possible region before the detected change,
   wherein the attribute that is associated with the object is decided after the change using an attribute associated with the object in an uppermost level before the change in the feature amount.

* * * * *